(12) United States Patent
Cheng et al.

(10) Patent No.: US 11,910,255 B2
(45) Date of Patent: Feb. 20, 2024

(54) BEAM MEASUREMENT FOR A CELL SUBSET

(71) Applicants: Qualcomm Incorporated, San Diego, CA (US); Peng Cheng, Beijing (CN); Huichun Liu, Beijing (CN)

(72) Inventors: Peng Cheng, Beijing (CN); Huichun Liu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 402 days.

(21) Appl. No.: 17/273,334

(22) PCT Filed: Sep. 27, 2019

(86) PCT No.: PCT/CN2019/108382
§ 371 (c)(1),
(2) Date: Mar. 4, 2021

(87) PCT Pub. No.: WO2020/063808
PCT Pub. Date: Apr. 2, 2020

(65) Prior Publication Data
US 2021/0345201 A1    Nov. 4, 2021

(30) Foreign Application Priority Data

Sep. 29, 2018  (WO) ................ PCT/CN2018/108573
Sep. 29, 2018  (WO) ................ PCT/CN2018/108665

(51) Int. Cl.
*H04W 72/04*    (2023.01)
*H04W 36/00*    (2009.01)
*H04W 24/10*    (2009.01)

(52) U.S. Cl.
CPC ....... *H04W 36/0085* (2018.08); *H04W 24/10* (2013.01); *H04W 36/0058* (2018.08)

(58) Field of Classification Search
CPC ......... H04W 36/0085; H04W 36/0058; H04W 36/0083; H04W 24/10; H04W 48/16
See application file for complete search history.

(56) References Cited

U.S. PATENT DOCUMENTS

2009/0197555 A1 * 8/2009 Lindoff ................ H04B 17/336
455/226.2
2012/0113837 A1 * 5/2012 Siomina ................ H04W 24/10
370/252
(Continued)

FOREIGN PATENT DOCUMENTS

CN         106576265 A      4/2017
WO    WO-2018083377 A1     5/2018
(Continued)

OTHER PUBLICATIONS

Ericsson: "Remaining Open Issues on Measurement Reporting in NR," 3GPP Draft, 3GPP TSG-RAN WG2 #Ad Hoc, Tdoc R2-1707286, Remaining Open Issues On Measurement Reporting In NR, 3rd Generation Partnership Project (3GPP), Mobile Competence Centre, 650, Route Des Lucioles, F-06921, Sophia-Antipolis Cedex, France, vol. RAN WG2, No. Qingdao, China, Jun. 27, 2017-Jun. 29, 2017, Jun. 26, 2017 (Jun. 26, 2017), XP051301774, 8 Pages, Retrieved from the Internet: URL: http://www.3gpp.org/ftp/Meetings_3GPP_SYNC/RAN2/Docs/ [retrieved on Jun. 26, 2017] Paragraph [0002], p. 3, Section 2.2 Beam Level Information in Measurement Reporting—p. 8, Section Conclusion.
(Continued)

*Primary Examiner* — Mahbubul Bar Chowdhury
(74) *Attorney, Agent, or Firm* — QUALCOMM Incorporated

(57) ABSTRACT

Methods, systems, and devices for wireless communications are described. A user equipment (UE) measure and report cell measurements for neighboring cells to assist the wireless network with handover decisions. In some cases, the UE (Continued)

may be configured to report beam-level measurements for just a subset of neighboring cells instead of each neighboring cell. For example, the UE may measure, or report beam measurements for a subset of the neighboring cells which meet configured criteria or are included in a subset of cells configured by the serving cell. Techniques for configuring and maintaining the subset of cells are described herein. For example, the cells in the subset may be configured by the UE or the serving cell of UE. A cell may also be removed from the subset if the cell does not continue to meet criteria for being included in the subset.

28 Claims, 25 Drawing Sheets

(56) References Cited

U.S. PATENT DOCUMENTS

| | | | | |
|---|---|---|---|---|
| 2014/0200001 | A1* | 7/2014 | Song | H04W 36/0094 455/436 |
| 2017/0214444 | A1 | 7/2017 | Nigam et al. | |
| 2018/0279143 | A1* | 9/2018 | Bhattad | H04W 48/12 |
| 2019/0327630 | A1* | 10/2019 | Lin | H04W 36/08 |
| 2020/0022040 | A1* | 1/2020 | Chen | H04W 56/001 |
| 2020/0107235 | A1* | 4/2020 | Peisa | H04B 7/0617 |

FOREIGN PATENT DOCUMENTS

| | | |
|---|---|---|
| WO | WO-2018126420 A1 | 7/2018 |
| WO | WO-2018175891 A1 | 9/2018 |

OTHER PUBLICATIONS

Spreadtrum Communications: "Consideration on NR RRM for UE Power Saving", 3GPP Draft, 3GPP TSG RAN WG1 Meeting #96, R1-1902731 Consideration on NR RRM for UE Power Saving, 3rd Generation Partnership Project (3GPP), Mobile Competence Centre, 650, Route Des Lucioles, F-06921 Sophia-Antipolis Cedex, Fra, vol. RAN WG1, No. Athens, Greece, Feb. 25, 2019-Mar. 1, 2019 Feb. 16, 2019 (Feb. 16, 2019), XP051600426, 11 Pages, Retrieved from the Internet: URL: http://www.3gpp.org/ftp/tsg%5Fran/WG1% 5FRL1/TSGR1%5F96/Docs/R1%2D1902731%2Ezip [retrieved on Feb. 16, 2019], p. 6, Section 4 Reducing The Number of Measured Beams.
Supplementary European Search Report—EP19868125—Search Authority—Munich—dated May 25, 2022.
Vivo: "Summary#3 of UE Power Consumption Reduction in RRM Measurements", 3GPP Draft, 3GPP TSG RAN WG1 Meeting #19AH1, R1-1901409_7.2.9.3_Summary_1901Adhoc_RRM_UE_ Power-Afterwedonline3, 3rd Generation Partnership Project (3GPP), Mobile Competence Centre, 650, Route Des Lucioles, F-06921 Sophia-Antipolis, vol. RAN WG1, No. Jan. 21, 2019-Jan. 25, 2019 Jan. 24, 2019 (Jan. 24, 2019), XP051601323, 43 Pages, Retrieved from the Internet: URL: http://www.3gpp.org/ftp/tsg%5Fran/WG1% 5FRL1/TSGR1%5FAH/NR%5FAH%5F1901/Docs/R1%2D1901409% 2Ezip [retrieved on Jan. 24, 2019] p. 24-25, Section 4.3, Reducing The Number of Measured Beams by Considering Spatial Information Aspects.
International Search Report and Written Opinion—PCT/CN2018/ 108573—ISA/EPO—dated Jul. 8, 2019.
International Search Report and Written Opinion—PCT/CN2019/ 108382—ISA/EPO—dated Dec. 27, 2019.
Samsung "NR Measurement Report Contents", R2-1709592, 3GPP TSG-RAN WG2 2017, RAN2#99 Meeting, Aug. 25, 2017(Aug. 25, 2019), 7 Pages.

* cited by examiner

SSB

CSI-RS

1800

BEAM MEASUREMENT FOR A CELL SUBSET

CROSS REFERENCE TO RELATED APPLICATIONS

The present Application is a 371 national phase filing of International Patent Application No. PCT/CN2019/108382 by Cheng et. al., entitled "BEAM MEASUREMENT FOR A CELL SUBSET," filed Sep. 27, 2019; and to International Patent Application No. PCT/CN2018/108573 by Cheng et. al., entitled "BEAM MEASUREMENT FOR A CELL SUBSET," filed Sep. 29, 2018, and to International Patent Application No. PCT/CN2018/108665 by Cheng et. al., entitled "QUASI CO-LOCATED REFERENCE SIGNALS FOR MEASUREMENT REPORTING," filed Sep. 29, 2018, which are assigned to the assignee hereof, and which are each incorporated by reference herein in their entirety.

BACKGROUND

The following relates generally to wireless communications, and more specifically to beam measurement for a cell subset.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A UE may perform measurements for a cell and the beams of a cell to assist the network in handover procedure. In some cases, the measurements may use a significant amount of power at the UE. In some examples, the UE may allocate a large amount of overhead for transmitting a measurement report.

SUMMARY

The described techniques relate to improved methods, systems, devices, and apparatuses that support beam measurement for a cell subset. Generally, the described techniques provide for configuring and maintaining a subset of neighboring cells for which a user equipment (UE) performs beam-level measurements. The UE may measure signal strength from its serving cell as well as neighboring cells to detect if a neighboring cell has better signal strength and may be able to provide a stronger connection. If a measurement triggers a measurement event based on a threshold or other criteria, the UE may provide its serving cell with a measurement report. The UE may take measurements for a candidate cell on average, and the UE may take measurements for each beam of the candidate cell. These different measurements may respectively be referred to as cell measurements, or cell-level measurements, and beam measurements, or beam-level measurements.

A UE described herein may be configured to report beam measurements for just a subset of neighboring cells. For example, the UE may report cell measurements for each of the neighboring cells, but the UE may measure, or in some cases report, beam measurements for a subset of the neighboring cells which meet configured criteria or are included in a subset of cells configured by the serving cell. By measuring for just the subset of neighboring cells, the UE may reduce an amount of power used to take beam measurements and reduce an amount of overhead allocated for a measuring report.

In some cases, a serving cell may configure the UE with a set of thresholds, and the UE may identify which cells are included in the subset based on whether the cells satisfy the thresholds. For example, the threshold may include one or more of a neighboring cell's signal strength, the signal strength of the serving cell, or a difference between the serving cell and the neighboring cell. Additionally, or alternatively, the serving cell may select the cells in the cell subset based on measurements reported by the UE. In some cases, the UE may be configured to periodically transmit measurement reports. In some examples, the serving cell may configure a set of measurement events based on cell measurements taken at the UE. The serving cell may transmit thresholds to the UE, and if a neighboring cell satisfies one of the thresholds, the UE may indicate that the neighboring cell is valid for the subset of neighboring cells. The serving cell may then update the subset of neighboring cells based on the measurement or indication. In some cases, a neighboring cell may be removed from the subset of cells. For example, if a signal strength of a neighboring cell dips below a threshold, the UE may transmit an indication to remove the neighboring cell from the subset of cells. Additionally, or alternatively, the serving cell may remove a cell from the subset based on a measurement report transmitted by the UE.

A method of wireless communication at a UE is described. The method may include receiving, from a serving cell, indicators of a configuration for measurement reporting, performing cell measurements for a set of neighboring cells based on the configuration, reporting the cell measurements for the set of neighboring cells to the serving cell, identifying a subset of the neighboring cells based on one or more of the configuration or the cell measurements, performing beam measurements for the subset of the neighboring cells based on the configuration, and reporting the beam measurements for the subset of the neighboring cells to the serving cell.

An apparatus for wireless communication at a UE is described. The apparatus may include a processor, memory in electronic communication with the processor, and instructions stored in the memory. The instructions may be executable by the processor to cause the apparatus to receive, from a serving cell, indicators of a configuration for measurement reporting, perform cell measurements for a set of neighboring cells based on the configuration, report the cell measurements for the set of neighboring cells to the serving cell, identify a subset of the neighboring cells based on one or more of the configuration or the cell measurements, perform beam measurements for the subset of the neighboring cells based on the configuration, and report the beam measurements for the subset of the neighboring cells to the serving cell.

Another apparatus for wireless communication at a UE is described. The apparatus may include means for receiving, from a serving cell, indicators of a configuration for measurement reporting, performing cell measurements for a set of neighboring cells based on the configuration, reporting the cell measurements for the set of neighboring cells to the serving cell, identifying a subset of the neighboring cells based on one or more of the configuration or the cell measurements, performing beam measurements for the subset of the neighboring cells based on the configuration, and reporting the beam measurements for the subset of the neighboring cells to the serving cell.

A non-transitory computer-readable medium storing code for wireless communication at a UE is described. The code may include instructions executable by a processor to receive, from a serving cell, indicators of a configuration for measurement reporting, perform cell measurements for a set of neighboring cells based on the configuration, report the cell measurements for the set of neighboring cells to the serving cell, identify a subset of the neighboring cells based on one or more of the configuration or the cell measurements, perform beam measurements for the subset of the neighboring cells based on the configuration, and report the beam measurements for the subset of the neighboring cells to the serving cell.

Some examples of the method, apparatuses, and non-transitory computer-readable medium described herein may further include operations, features, means, or instructions for receiving one or more thresholds from the serving cell and identifying the subset of the neighboring cells based on the one or more thresholds.

Some examples of the method, apparatuses, and non-transitory computer-readable medium described herein may further include operations, features, means, or instructions for identifying the subset of the neighboring cells based on a signal strength of the subset of the neighboring cells satisfying the one or more thresholds.

Some examples of the method, apparatuses, and non-transitory computer-readable medium described herein may further include operations, features, means, or instructions for identifying the subset of the neighboring cells based on a signal strength of the subset of the neighboring cells satisfying a first threshold and a signal strength of the serving cell satisfying a second threshold.

Some examples of the method, apparatuses, and non-transitory computer-readable medium described herein may further include operations, features, means, or instructions for identifying the subset of the neighboring cells based on a standard deviation of beam level quality satisfying the one or more thresholds.

Some examples of the method, apparatuses, and non-transitory computer-readable medium described herein may further include operations, features, means, or instructions for receiving an indicator that identifies the subset of the neighboring cells based on the cell measurements.

Some examples of the method, apparatuses, and non-transitory computer-readable medium described herein may further include operations, features, means, or instructions for periodically reporting the cell measurements for the set of neighboring cells to the serving cell and receiving an indicator that identifies the subset of the neighboring cells based on the periodic reporting.

Some examples of the method, apparatuses, and non-transitory computer-readable medium described herein may further include operations, features, means, or instructions for identifying an order for the subset of the neighboring cells based on one or more of a cell level quality or a cell load.

Some examples of the method, apparatuses, and non-transitory computer-readable medium described herein may further include operations, features, means, or instructions for determining a priority of a cell of the subset of the neighboring cells based on the order and performing the beam measurements for the cell based on the priority of the cell.

Some examples of the method, apparatuses, and non-transitory computer-readable medium described herein may further include operations, features, means, or instructions for receiving a threshold from the serving cell and identifying a trigger for reporting the cell measurements based on a difference between a neighbor cell signal quality and a serving cell signal quality satisfying the threshold.

Some examples of the method, apparatuses, and non-transitory computer-readable medium described herein may further include operations, features, means, or instructions for receiving a threshold from the serving cell and identifying a trigger for reporting the cell measurements based on a neighbor cell signal quality satisfying the threshold.

Some examples of the method, apparatuses, and non-transitory computer-readable medium described herein may further include operations, features, means, or instructions for receiving one or more thresholds from the serving cell and identifying a trigger for reporting the cell measurements based on a neighbor cell signal quality satisfying a first threshold and a serving cell signal quality satisfying a second threshold.

Some examples of the method, apparatuses, and non-transitory computer-readable medium described herein may further include operations, features, means, or instructions for receiving a threshold from the serving cell and identifying a trigger for reporting the cell measurements based on a neighbor cell signal quality not satisfying the threshold, where a neighbor cell may be removed from the subset of neighboring cells based on reporting the cell measurements.

Some examples of the method, apparatuses, and non-transitory computer-readable medium described herein may further include operations, features, means, or instructions for receiving a threshold from the serving cell and identifying a trigger for reporting the cell measurements based on a difference between a neighbor cell signal quality and a serving cell signal quality not satisfying the threshold, where a neighbor cell may be removed from the subset of neighboring cells based on reporting the cell measurements.

Some examples of the method, apparatuses, and non-transitory computer-readable medium described herein may further include operations, features, means, or instructions for receiving one or more thresholds from the serving cell and identifying a trigger for reporting the cell measurements based on a neighbor cell signal quality not satisfying a first threshold or a serving cell signal quality not satisfying a second threshold, where a neighbor cell may be removed from the subset of neighboring cells based on reporting the cell measurements.

In some examples of the method, apparatuses, and non-transitory computer-readable medium described herein, performing the cell measurements for the set of neighboring cells may include operations, features, means, or instructions for measuring one or more of a synchronization signal block (SSB) or a channel state information reference signal (CSI-RS) for each cell of the set of neighboring cells.

Some examples of the method, apparatuses, and non-transitory computer-readable medium described herein may further include operations, features, means, or instructions for filtering the beam measurements by a Level 3 filter, where the Level 3 filter may be configured by Radio Resource Control (RRC) signaling.

In some examples of the method, apparatuses, and non-transitory computer-readable medium described herein, the indicators of the configuration may be received by RRC signaling.

A method of wireless communication at a base station is described. The method may include transmitting, to a UE, indicators of a configuration for measurement reporting, receiving cell measurements for a set of neighboring cells from the UE based on the configuration, identifying a subset of the neighboring cells based on one or more of the configuration or the cell measurements, and receiving beam measurements for the subset of the neighboring cells from the UE based on the configuration.

An apparatus for wireless communication at a base station is described. The apparatus may include a processor, memory in electronic communication with the processor, and instructions stored in the memory. The instructions may be executable by the processor to cause the apparatus to transmit, to a UE, indicators of a configuration for measurement reporting, receive cell measurements for a set of neighboring cells from the UE based on the configuration, identify a subset of the neighboring cells based on one or more of the configuration or the cell measurements, and receive beam measurements for the subset of the neighboring cells from the UE based on the configuration.

Another apparatus for wireless communication at a base station is described. The apparatus may include means for transmitting, to a UE, indicators of a configuration for measurement reporting, receiving cell measurements for a set of neighboring cells from the UE based on the configuration, identifying a subset of the neighboring cells based on one or more of the configuration or the cell measurements, and receiving beam measurements for the subset of the neighboring cells from the UE based on the configuration.

A non-transitory computer-readable medium storing code for wireless communication at a base station is described. The code may include instructions executable by a processor to transmit, to a UE, indicators of a configuration for measurement reporting, receive cell measurements for a set of neighboring cells from the UE based on the configuration, identify a subset of the neighboring cells based on one or more of the configuration or the cell measurements, and receive beam measurements for the subset of the neighboring cells from the UE based on the configuration.

Some examples of the method, apparatuses, and non-transitory computer-readable medium described herein may further include operations, features, means, or instructions for configuring the UE with one or more thresholds and identifying the subset of the neighboring cells based on the one or more thresholds.

Some examples of the method, apparatuses, and non-transitory computer-readable medium described herein may further include operations, features, means, or instructions for identifying the subset of the neighboring cells based on a signal strength of the subset of the neighboring cells satisfying the one or more thresholds.

Some examples of the method, apparatuses, and non-transitory computer-readable medium described herein may further include operations, features, means, or instructions for identifying the subset of the neighboring cells based on a signal strength of the subset of the neighboring cells satisfying a first threshold and a signal strength of the base station satisfying a second threshold.

Some examples of the method, apparatuses, and non-transitory computer-readable medium described herein may further include operations, features, means, or instructions for identifying the subset of the neighboring cells based on a standard deviation of beam level quality satisfying the one or more thresholds.

Some examples of the method, apparatuses, and non-transitory computer-readable medium described herein may further include operations, features, means, or instructions for selecting the subset of the neighboring cells based on the cell measurements for the set of neighboring cells and transmitting an indicator that identifies the subset of the neighboring cells to the UE.

Some examples of the method, apparatuses, and non-transitory computer-readable medium described herein may further include operations, features, means, or instructions for periodically receiving the cell measurements for the set of neighboring cells, selecting the subset of the neighboring cells based on the cell measurements and transmitting an indicator that identifies the subset of the neighboring cells.

Some examples of the method, apparatuses, and non-transitory computer-readable medium described herein may further include operations, features, means, or instructions for indicating an order for the subset of the neighboring cells based on one or more of a cell level quality or a cell load.

In some examples of the method, apparatuses, and non-transitory computer-readable medium described herein, the beam measurements reported for the subset may be based on the order of the subset.

Some examples of the method, apparatuses, and non-transitory computer-readable medium described herein may further include operations, features, means, or instructions for transmitting a threshold to the UE and configuring the UE with a trigger for reporting the cell measurements based on a difference between a neighbor cell signal quality and a serving cell signal quality satisfying the threshold.

Some examples of the method, apparatuses, and non-transitory computer-readable medium described herein may further include operations, features, means, or instructions for transmitting a threshold to the UE and configuring the UE with a trigger for reporting the cell measurements based on a neighbor cell signal quality satisfying the threshold.

Some examples of the method, apparatuses, and non-transitory computer-readable medium described herein may further include operations, features, means, or instructions for transmitting one or more thresholds to the UE and configuring the UE with a trigger for reporting the cell measurements based on a neighbor cell signal quality satisfying a first threshold and a serving cell signal quality satisfying a second threshold.

Some examples of the method, apparatuses, and non-transitory computer-readable medium described herein may further include operations, features, means, or instructions for transmitting a threshold to the UE, configuring the UE with a trigger for reporting the cell measurements based on a neighbor cell signal quality not satisfying the threshold and removing a neighbor cell from the subset of neighboring cells based on the reported cell measurements.

Some examples of the method, apparatuses, and non-transitory computer-readable medium described herein may further include operations, features, means, or instructions for transmitting a threshold to the UE, configuring the UE with a trigger for reporting the cell measurements based at least in part on a difference between a neighbor cell signal quality and a serving cell signal quality not satisfying the threshold and removing a neighbor cell from the subset of neighboring cells based on the reported cell measurements.

Some examples of the method, apparatuses, and non-transitory computer-readable medium described herein may further include operations, features, means, or instructions for transmitting one or more thresholds to the UE, configuring the UE with a trigger for reporting the cell measurements based on a neighbor cell signal quality not satisfying a first threshold or a serving cell signal quality not satisfying a second threshold and removing a neighbor cell from the subset of neighboring cells based on the reported cell measurements.

In some examples of the method, apparatuses, and non-transitory computer-readable medium described herein, receiving the cell measurements for the set of neighboring cells may include operations, features, means, or instructions for receiving measurements for one or more of an SSB or a CSI-RS for each cell of the set of neighboring cells.

Some examples of the method, apparatuses, and non-transitory computer-readable medium described herein may further include operations, features, means, or instructions for configuring a Level 3 filter at the UE by RRC signaling, where the beam measurements may be filtered by the Level 3 filter.

In some examples of the method, apparatuses, and non-transitory computer-readable medium described herein, the indicators of the configuration may be transmitted by RRC signaling.

A method for wireless communication at a UE is described. The method may include receiving a control message indicating that a first group of reference signals is quasi co-located with a second group of reference signals for measurement reporting, receiving the first group of reference signals and the second group of reference signals, performing measurements on the first group of reference signals, or the second group of reference signals, or both based on the first group of reference signals being quasi co-located with the second group of reference signals, and reporting measurements on the first group of reference signals, or measurements on the second group of reference signals, or group measurements on the first group of reference signals and the second group of reference signals based on the first group of reference signals being quasi co-located with the second group of reference signals.

An apparatus for wireless communication at a UE is described. The apparatus may include a processor, memory in electronic communication with the processor, and instructions stored in the memory. The instructions may be executable by the processor to cause the apparatus to receive a control message indicating that a first group of reference signals is quasi co-located with a second group of reference signals for measurement reporting, receive the first group of reference signals and the second group of reference signals, perform measurements on the first group of reference signals, or the second group of reference signals, or both based on the first group of reference signals being quasi co-located with the second group of reference signals, and report measurements on the first group of reference signals, or measurements on the second group of reference signals, or group measurements on the first group of reference signals and the second group of reference signals based on the first group of reference signals being quasi co-located with the second group of reference signals.

Another apparatus for wireless communication at a UE is described. The apparatus may include means for receiving a control message indicating that a first group of reference signals is quasi co-located with a second group of reference signals for measurement reporting, receiving the first group of reference signals and the second group of reference signals, performing measurements on the first group of reference signals, or the second group of reference signals, or both based on the first group of reference signals being quasi co-located with the second group of reference signals, and reporting measurements on the first group of reference signals, or measurements on the second group of reference signals, or group measurements on the first group of reference signals and the second group of reference signals based on the first group of reference signals being quasi co-located with the second group of reference signals.

A non-transitory computer-readable medium storing code for wireless communication at a UE is described. The code may include instructions executable by a processor to receive a control message indicating that a first group of reference signals is quasi co-located with a second group of reference signals for measurement reporting, receive the first group of reference signals and the second group of reference signals, perform measurements on the first group of reference signals, or the second group of reference signals, or both based on the first group of reference signals being quasi co-located with the second group of reference signals, and report measurements on the first group of reference signals, or measurements on the second group of reference signals, or group measurements on the first group of reference signals and the second group of reference signals based on the first group of reference signals being quasi co-located with the second group of reference signals.

Some examples of the method, apparatuses, and non-transitory computer-readable medium described herein may further include operations, features, means, or instructions for receiving the first group of reference signals from a first serving cell and the second group of reference signals from a second serving cell, performing measurements on the first group of reference signals and reporting measurements for the first group of reference signals, where measurements for the second group of reference signals may be indicated by the reported measurements for the first group of reference signals based on the first group of reference signals being quasi co-located with the second group of reference signals.

In some examples of the method, apparatuses, and non-transitory computer-readable medium described herein, performing measurements on the first group of reference signals may include operations, features, means, or instructions for performing cell measurements or beam measurements on the first group of reference signals in accordance with the control message. In some examples of the method, apparatuses, and non-transitory computer-readable medium described herein, the beam measurements may be filtered by RRC configured layer3 (L3) filters. In some examples of the method, apparatuses, and non-transitory computer-readable medium described herein, the cell measurements may be filtered by RRC configured L3 filters.

In some examples of the method, apparatuses, and non-transitory computer-readable medium described herein, the control message indicates a first physical cell identifier (PCI) of the first serving cell, a second PCI of the second serving cell, a bandwidth part (BWP) used to transmit the first and second groups of reference signals, measurement quantities for the measurement reporting, a type of reference signals on which to perform measurements, whether to perform and report cell measurements or beam measurements, or indexes of beams used to transmit the first and second groups of reference signals. In some examples of the method, apparatuses, and non-transitory computer-readable medium described herein, the measurement quantities for measurement reporting include reference signal received power (RSRP), reference signal received quality (RSRQ), or signal-to-interference-plus-noise ratio (SINR). In some examples of the method, apparatuses, and non-transitory computer-readable medium described herein, the first serving cell and the second serving cell are configured to transmit on different frequencies.

In some examples of the method, apparatuses, and non-transitory computer-readable medium described herein, the first group of reference signals includes a synchronization signal block (SSB) and the second group of reference signals includes channel state information reference signals (CSI-RSs). Some examples of the method, apparatuses, and non-transitory computer-readable medium described herein may further include operations, features, means, or instructions for performing measurements on the SSB and reporting measurements for the SSB, where measurements for the CSI-RSs may be indicated by the reported measurements for the SSB based on the SSB being quasi co-located with the CSI-RSs.

In some examples of the method, apparatuses, and non-transitory computer-readable medium described herein, the control message indicates an index of the SSB, a list of indexes of the CSI-RSs, and measurement quantities for the measurement reporting. In some examples of the method, apparatuses, and non-transitory computer-readable medium described herein, the measurement quantities for measurement reporting include RSRP, RSRQ, or SINR. Some examples of the method, apparatuses, and non-transitory computer-readable medium described herein may further include operations, features, means, or instructions for failing to detect the SSB and performing and reporting measurements for one or more of the CSI-RSs.

In some examples of the method, apparatuses, and non-transitory computer-readable medium described herein, performing and reporting measurements for one or more of the CSI-RSs may include operations, features, means, or instructions for identifying a CSI-RS of the CSI-RSs associated with a highest quality and transmitting an indication of the CSI-RS associated with the highest quality. In some examples of the method, apparatuses, and non-transitory computer-readable medium described herein, performing and reporting measurements for one or more of the CSI-RSs may include operations, features, means, or instructions for determining a linear average power of the CSI-RSs and transmitting an indication of the linear average power of the CSI-RSs. In some examples of the method, apparatuses, and non-transitory computer-readable medium described herein, performing and reporting measurements for one or more of the CSI-RSs may include operations, features, means, or instructions for performing and reporting measurements for each of the CSI-RSs. In some examples of the method, apparatuses, and non-transitory computer-readable medium described herein, the first group of reference signals includes a first SSB or a first set of CSI-RSs and the second group of reference signals includes a second SSB or a second set of CSI-RSs, the first group of reference signals and the second group of reference signals forming a QCL group of reference signals.

Some examples of the method, apparatuses, and non-transitory computer-readable medium described herein may further include operations, features, means, or instructions for performing group measurements on reference signals in the QCL group and reporting the group measurements for reference signals in the QCL group. Some examples of the method, apparatuses, and non-transitory computer-readable medium described herein may further include operations, features, means, or instructions for identifying a set of QCL groups of reference signals, receiving an indication of a subset of the QCL groups for which to perform and report measurements and performing and reporting group measurements for each QCL group of the subset of the QCL groups. In some examples of the method, apparatuses, and non-transitory computer-readable medium described herein, the control message includes an RRC message. In some examples of the method, apparatuses, and non-transitory computer-readable medium described herein, each of the first group of reference signals and the second group of reference signals includes one or more reference signals.

A method for wireless communication is described. The method may include transmitting a control message, to a UE, indicating that a first group of reference signals is quasi co-located with a second group of reference signals for measurement reporting, transmitting, to the UE, the first group of reference signals, the second group of reference signals, or both, and receiving measurements for the first group of reference signals, or measurements on the second group of reference signals, or group measurements for the first group of reference signals and the second group of reference signals based on the first group of reference signals being quasi co-located with the second group of reference signals.

An apparatus for wireless communication is described. The apparatus may include a processor, memory in electronic communication with the processor, and instructions stored in the memory. The instructions may be executable by the processor to cause the apparatus to transmit a control message, to a UE, indicating that a first group of reference signals is quasi co-located with a second group of reference signals for measurement reporting, transmit, to the UE, the first group of reference signals, the second group of reference signals, or both, and receive measurements for the first group of reference signals, or measurements on the second group of reference signals, or group measurements for the first group of reference signals and the second group of reference signals based on the first group of reference signals being quasi co-located with the second group of reference signals.

Another apparatus for wireless communication is described. The apparatus may include means for transmitting a control message, to a UE, indicating that a first group of reference signals is quasi co-located with a second group of reference signals for measurement reporting, transmitting, to the UE, the first group of reference signals, the second group of reference signals, or both, and receiving measurements for the first group of reference signals, or measurements on the second group of reference signals, or group measurements for the first group of reference signals and the second group of reference signals based on the first group of reference signals being quasi co-located with the second group of reference signals.

A non-transitory computer-readable medium storing code for wireless communication is described. The code may include instructions executable by a processor to transmit a control message, to a UE, indicating that a first group of reference signals is quasi co-located with a second group of reference signals for measurement reporting, transmit, to the UE, the first group of reference signals, the second group of reference signals, or both, and receive measurements for the first group of reference signals, or measurements on the second group of reference signals, or group measurements for the first group of reference signals and the second group of reference signals based on the first group of reference signals being quasi co-located with the second group of reference signals.

In some examples of the method, apparatuses, and non-transitory computer-readable medium described herein, the first group of reference signals may be transmitted by a first serving cell and the second group of reference signals may be transmitted by a second serving cell. Some examples of the method, apparatuses, and non-transitory computer-readable medium described herein may further include operations, features, means, or instructions for receiving measurements for the first group of reference signals and determining that measurements for the second group of reference signals may be indicated by the measurements for the first group of reference signals based on the first group of reference signals being quasi co-located with the second group of reference signals.

In some examples of the method, apparatuses, and non-transitory computer-readable medium described herein, the control message indicates a first PCI of the first serving cell, a second PCI of the second serving cell, a BWP used to transmit the first and second groups of reference signals, measurement quantities for the measurement reporting, a type of reference signals on which to perform measurements, whether to perform and report cell measurements or beam measurements, or indexes of beams used to transmit the first and second groups of reference signals. In some examples of the method, apparatuses, and non-transitory computer-readable medium described herein, the measurement quantities for measurement reporting include RSRP, RSRQ, or SINR. In some examples of the method, apparatuses, and non-transitory computer-readable medium described herein, the first group of reference signals includes a SSB, and the second group of reference signals includes CSI-RSs.

Some examples of the method, apparatuses, and non-transitory computer-readable medium described herein may further include operations, features, means, or instructions for receiving measurements for the SSB and determining that measurements for the CSI-RSs may be indicated by the measurements for the SSB based on the SSB being quasi co-located with the CSI-RSs. In some examples of the method, apparatuses, and non-transitory computer-readable medium described herein, the control message indicates an index of the SSB, a list of indexes of the CSI-RSs, and measurement quantities for the measurement reporting. In some examples of the method, apparatuses, and non-transitory computer-readable medium described herein, the measurement quantities for measurement reporting include RSRP, RSRQ, or SINR.

In some examples of the method, apparatuses, and non-transitory computer-readable medium described herein, the first group of reference signals includes a first SSB or a first set of CSI-RSs and the second group of reference signals includes a second SSB or a second set of CSI-RSs, the first group of reference signals and the second group of reference signals forming a QCL group of reference signals. Some examples of the method, apparatuses, and non-transitory computer-readable medium described herein may further include operations, features, means, or instructions for receiving group measurements for reference signals in the QCL group. In some examples of the method, apparatuses, and non-transitory computer-readable medium described herein, the control message includes an RRC message. In some examples of the method, apparatuses, and non-transitory computer-readable medium described herein, each of the first group of reference signals and the second group of reference signals includes one or more reference signals.

DETAILED DESCRIPTION

Figure 1:
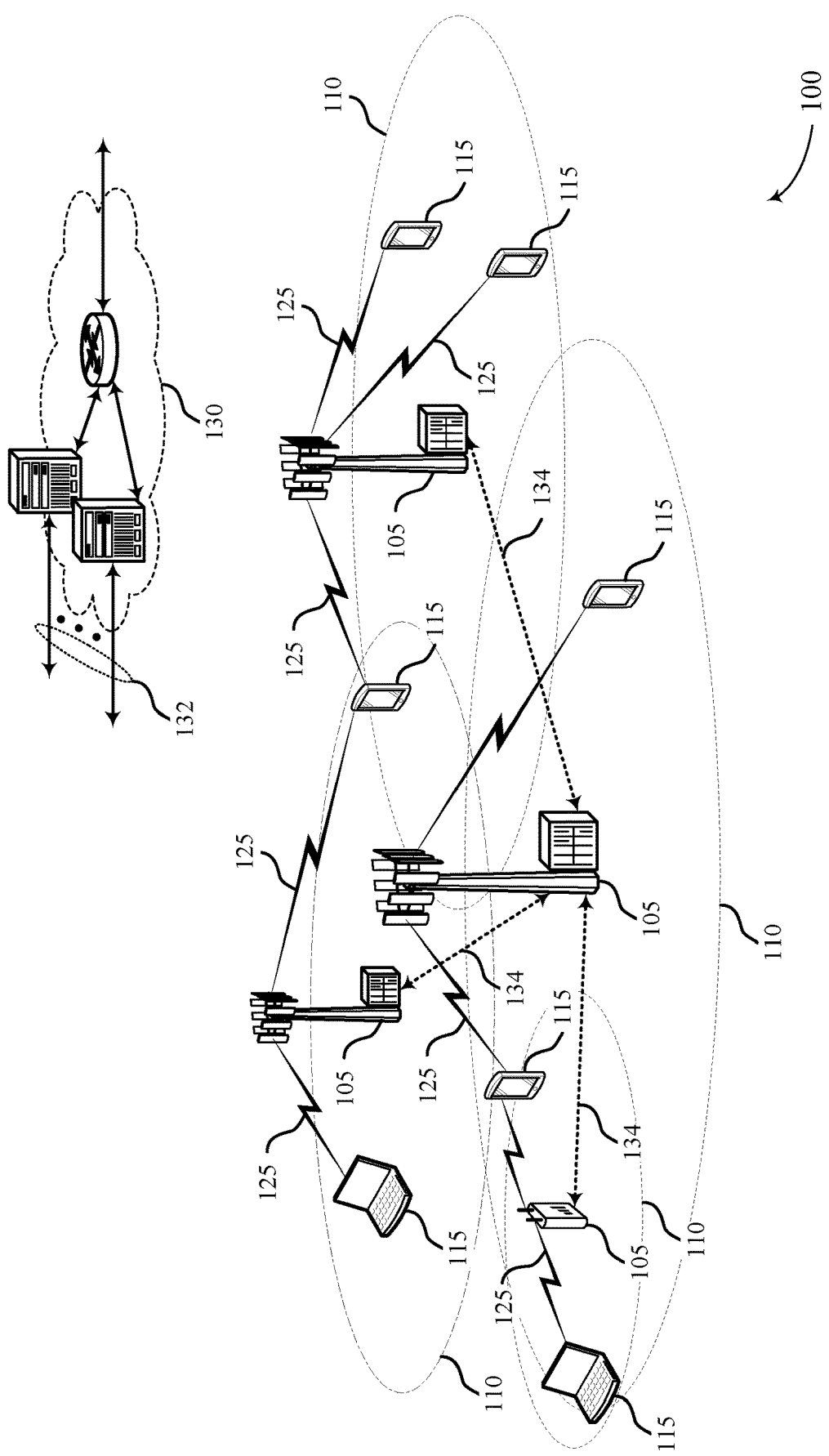
FIG. 1 illustrates an example of a system for wireless communications that supports beam measurement for a cell subset in accordance with aspects of the present disclosure.

A wireless communications system may attempt to provide a strong signal for a user equipment (UE). If a neighboring cell can provide a stronger signal than a serving cell, the UE may be handed over from the serving cell to the neighboring cell. The UE may measure signal strength from its serving cell as well as neighboring cells to detect if a neighboring cell has better signal strength and may be able to provide a stronger connection. The UE may monitor for reference signals to measure the signal strengths of the cells. If a measurement triggers a measurement event, the UE may provide its serving cell with measurement report. In some cases, a measurement report may initiate a handover for the UE. An example of a measurement event may be the signal strength of a neighboring cell surpassing a threshold, or the signal strength of the serving cell falling below a threshold.

Some wireless communications systems may support beamformed transmissions. Therefore, the UE may make measurements for both a candidate cell on average as well as each of the beams of the candidate cell. These different measurements may respectively be referred to as cell measurements, or cell-level measurements, and beam measurements, or beam-level measurements. The UE may provide both cell measurements and beam measurements in a measurement report when a measurement event is triggered. In some wireless communications networks, a conventional UE may be configured to report cell measurements and beam measurements for each neighboring cell. This may use a significant amount of power for the UE to take measurements for each neighboring cell. The UE may also reserve a large amount of overhead for reporting measurements for each of the neighboring cells.

A UE described herein may be configured to instead report beam measurements for just a subset of neighboring cells. For example, the UE may report cell measurements for each of the neighboring cells, but the UE may measure, or report beam measurements for a subset of the neighboring cells which meet configured criteria or are included in a set of pre-triggered cells configured by the serving cell. By measuring for just the subset of neighboring cells, the UE may reduce an amount of power used to take beam measurements. Reporting measurements for just the subset of cells may reduce an amount of overhead allocated for a measuring report.

In some cases, a serving cell may configure the UE with a set of thresholds, and the UE may identify which cells are included in the subset based on whether the cells satisfy the thresholds. For example, if a neighboring cell's signal strength is strong and surpasses a threshold, the UE may measure beams of that neighboring cell, as it may be a good candidate for handover. Other examples of thresholds may be based on the signal strength of the serving cell or a difference between the serving cell and the neighboring cell. Additionally, or alternatively, the serving cell may select the cells in the cell subset based on measurements reported by the UE. In some cases, the UE may be configured to periodically transmit measurement reports. Additionally, or alternatively, the serving cell may configure a set of measurement events based on cell measurements taken at the UE. The serving cell may transmit thresholds to the UE, and if a neighboring cell satisfies one of the thresholds, the UE may indicate that neighboring cell is valid for the subset of neighboring cells. The serving cell may then update the subset of neighboring cells based on the measurement or indication.

In some cases, the UE may indicate that a neighboring cell should be removed from the subset of cells. For example, if a signal strength of a neighboring cell dips below a threshold, the UE may transmit an indication to remove the neighboring cell from the subset of cells. In some cases, the serving cell may configure the UE with the threshold. In this example, even if a neighboring cell previously met criteria to be included in the subset of cells, a cell which does not continue to meet the criteria may be removed from the subset of cells.

Some wireless communications systems may support communications between base stations and UEs on multiple beams. In such systems, it may be appropriate for a UE to perform and report cell measurements and beam measurements to a source base station (e.g., to facilitate radio resource management (RRM) at the source base station). In some cases, however, the overhead associated with performing both cell-level and beam-level measurements for a base station and reporting these measurements to a source base station may be high, resulting in significant power consumption at a UE. Further, the UE may be configured to perform and report measurements for multiple neighbor base stations, resulting in even greater overhead.

As described herein, a wireless communications system may support efficient techniques for reducing the overhead associated with performing measurements on reference signals and reporting the measurements to a source base station (e.g., to facilitate RRM at the source base station). In particular, a base station may transmit a control message to a UE indicating a quasi co-location (QCL) configuration for measurement reporting. The control message may indicate that groups of reference signals are quasi co-located for measurements reporting. Accordingly, the UE may perform and report measurements for a subset of the groups of reference signals, or the UE may perform and report group measurements for the groups of reference signals to limit the overhead associated with performing and reporting measurements.

Aspects of the disclosure are initially described in the context of a wireless communications system. Aspects of the disclosure are further illustrated by and described with reference to apparatus diagrams, system diagrams, and flowcharts that relate to beam measurement for a cell subset.

FIG. 1 illustrates an example of a wireless communications system 100 that supports beam measurement for a cell subset in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In wireless communications system 100, the antennas of a base station 105 or UE 115 may be located within one or more antenna arrays, which may support MIMO operations, or transmit or receive beamforming. In some cases, data streams may be mapped to antennas using antenna ports. Specifically, an antenna port may be a logical entity used to map data streams to antennas. A given antenna port may drive transmissions from one or more antennas and resolve signal components received over one or more antennas. Each antenna port may be associated with a reference signal (e.g., which may allow the receiver to distinguish data streams associated with the different antenna ports in a received transmission). In some cases, some antenna ports may be referred to as quasi co-located, meaning that the spatial parameters associated with a transmission on one antenna port may be inferred from the spatial parameters associated with another transmission on a different antenna port. Similarly, reference signals (e.g., transmitted on an antenna port) may be referred to as quasi co-located meaning that the spatial parameters associated with one reference signal may be inferred from the spatial parameters associated with another reference signal.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may be configured to report beam-level measurements for just a subset of neighboring cells. For example, the UE 115 may report cell-level measurements for each of the neighboring cells, but the UE 115 may measure, or report beam measurements for, a subset of the neighboring cells which meet configured criteria or are included in a subset of cells configured by the serving cell. Techniques for configuring and maintaining the subset of cells are described herein. For example, the cells in the subset may be configured by the UE 115 or the serving cell of the UE 115. A cell may also be removed from the subset if the cell does not continue to meet criteria for being included in the subset.

A base station 105 may transmit an indication of a QCL configuration to a UE 115 that may indicate the groups of antenna ports that are quasi co-located and a QCL type associated with the configuration. For type A QCL of two sets of antenna ports, a UE 115 may be able to determine a Doppler shift, Doppler spread, average delay, and a delay spread associated with a transmission on one set of antenna ports based on signals received on another set of antenna ports. For type B QCL of two sets of antenna ports, a UE 115 may be able to determine a Doppler shift and a Doppler spread associated with a transmission on one set of antenna ports based on signals received on another set of antenna ports. For type C QCL of two sets of antenna ports, a UE 115 may be able to determine an average delay and a Doppler shift associated with a transmission on one set of antenna ports based on signals received on another set of antenna ports. For type D QCL of two sets of antenna ports, a UE 115 may be able to determine spatial receive parameters associated with a transmission on one set of antenna ports based on signals received on another set of antenna ports.

Thus, as described above, wireless communications system 100 may support communications between base stations 105 and UEs 115 on multiple beams. In some cases, it may be appropriate for a UE 115 to perform and report cell measurements and beam measurements to a source base station 105 (e.g., to facilitate RRM at the source base station 105).

Figure 2:
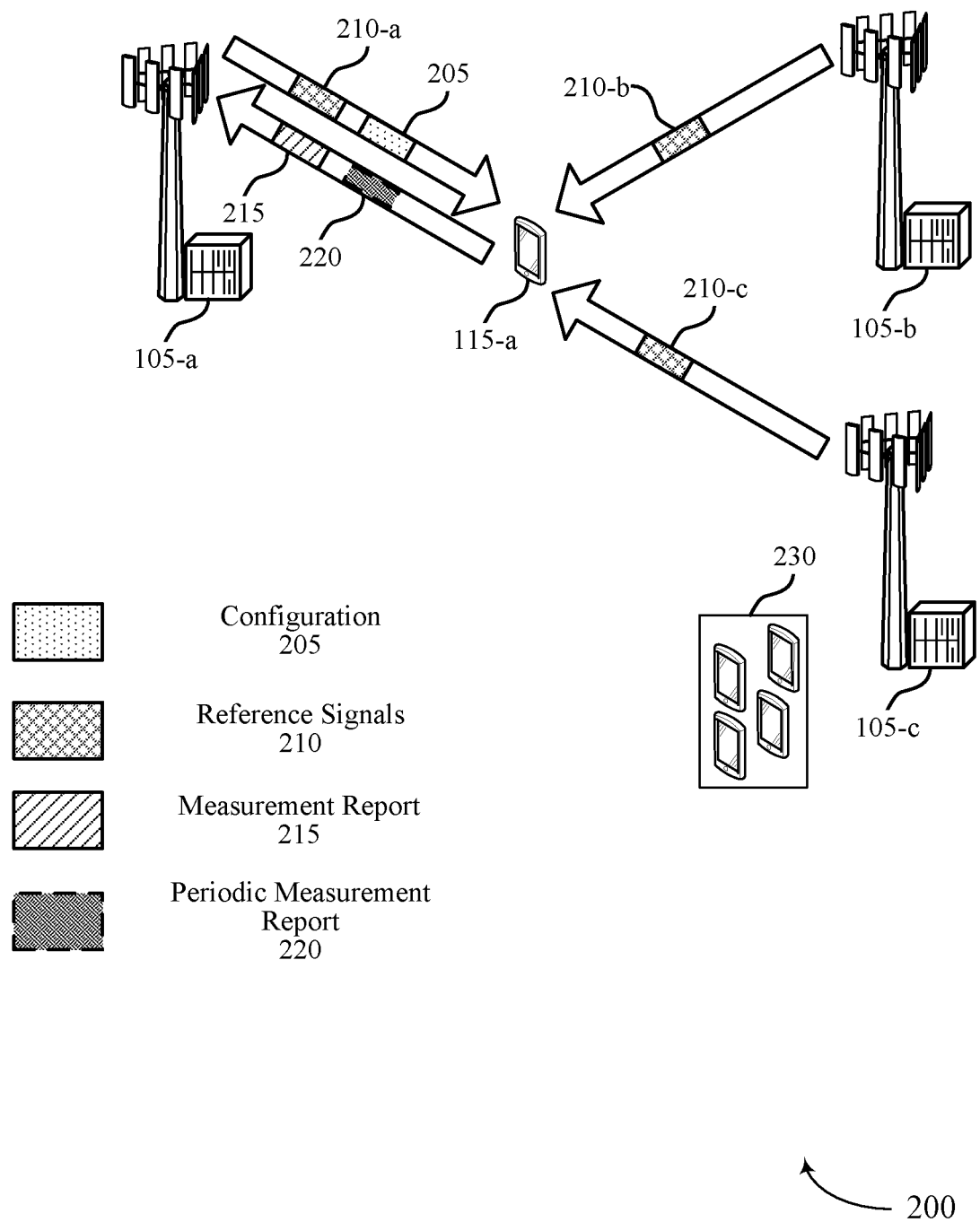
FIG. 2 illustrates an example of a wireless communications system that supports beam measurement for a cell subset in accordance with aspects of the present disclosure.

FIG. 2 illustrates an example of a wireless communications system 200 that supports beam measurement for a cell subset in accordance with aspects of the present disclosure. In some examples, wireless communications system 200 may implement aspects of wireless communication system 100. The wireless communications system 200 may include base station 105-a, base station 105-b, and base station 105-c which may each be an example of a base station 105 as described herein. Base station 105-a may be a serving cell for UE 115-a, and base stations 105-b and 105-c may be neighbor cells of base station 105-a. In some cases, the wireless communications system 200 may include aspects of a synchronous or an asynchronous network.

The wireless communications system 200 may attempt to provide the best connection available for UE 115-a. For example, if a neighboring cell can provide a connection with reduced latency and higher signal quality for UE 115-a when compared to a connection with a serving cell, UE 115-a may be handed over from the serving cell to the neighboring cell. UE 115-a may measure signal strength from its serving cell as well as neighboring cells to detect if a neighboring cell has better signal strength and may be able to provide a stronger connection.

UE 115-a may measure reference signals from the base stations 105 and provide its serving cell, base station 105-a, measurement reports 215 which include the measurements. For example, UE 115-a may measure one or more of a reference signal received power (RSRP), a reference signal received quality (RSRQ), or a signal to noise ratio (SINR), among other types of measurements, and include these measurements in the measurement report 215. UE 115-a may transmit a measurement report 215 for different base stations 105 at different times. Or, in some cases, UE 115-a may transmit the measurements for multiple base stations 105 in a single measurement report 215. UE 115-a may measure reference signals such as a channel state information reference signal (CSI-RS) or reference signals transmitted as part of a synchronization signal block (SSB) (e.g., demodulation reference signals (DMRS)).

The wireless communications system 200 may support beamformed transmissions. In beamforming, a base station 105 may transmit using multiple beams in different directions. Therefore, UE 115-a may identify candidate beams for handover among the beams provided by a candidate base station in a handover. UE 115-a may make measurements for a candidate cell in general (e.g., as an average of the beams of the candidate cell) as well as measurements for the specific beams of the candidate cell. These different measurements may be referred to as cell measurements, or cell-level measurements, and beam measurements, or beam-level measurements.

UE 115-a may regularly perform cell measurements to measure cell quality of neighboring cells. Some examples of cell measurements included in a measurement report 215 may include one or more of RSRP, RSRQ, or SINR. Cell measurements may also be used to trigger a handover as part of a measurement event evaluation. For example, if a neighbor cell has a cell quality greater than a configured threshold, UE 115-a may trigger a handover to that neighbor cell, which may then be referred to as the target cell or target base station of the handover. In some cases, the serving cell of UE 115-a may trigger a handover based on one or more measurement events occurring at UE 115-a. For example, cell evaluation may trigger a measurement event, and the network (e.g., including the serving cell) may identify a potential target cell for handover of UE 115-a based on that measurement event or based on a measurement report transmitted during the measurement event.

UE 115-a may also measure and report beam-level measurements. In some cases, the beam measurements may assist the network for a handover decision. For example, UE 115-a may report beam-level measurements to be handed over to a best beam of the target base station. In some cases, beam measurements may be used by the network to configure contention-free random access (CFRA) resources for the target cell of the handover. Some handover decisions may be made based on a beast beam instead of an averaged cell quality. For example, some infra-vendors may prefer to evaluate a best one beam, not the averaged cell quality. UE 115-a may be configured to report nothing for beam-level measurements, a beam index, or a beam index and beam quality. A beam-level measurement may include RSRP, RSRQ, SINR, a beam index, or any combination thereof. The RSRP, RSRQ, and SINR measurements may be filtered (e.g., layer 3 filtered), where the filter may be configured by the serving cell via RRC signaling. Techniques for cell measurement and beam measurement are described in more detail in FIG. 3.

In conventional wireless communications systems, a UE 115 may measure and report cell measurements and beam measurements for each neighbor cell. This may lead to significant power consumption and overhead when generating the measurement report 215. There may be up to 64 SSBs per frequency allocation, up to 96 CSI-RS resources per frequency allocation, and 10 or more neighboring cells in some cases. Thus, the report overhead may be large. In some cases, each of RSRP, RSRQ, and SINR quantity may use 7 bits, an SSB index may use 6 bits, CSI-RS index may use 7 bits, and up to 64 beam indexes/qualities can be configured for reporting. For one neighboring cell, the maximum reporting size may be 3572 bits, as shown by Equation (1).

$$10 \text{ bits } (PCI) + 7*3 \text{ bits } (\text{cell } SSB) + \\ 7*3 \text{ bits } (\text{cell } CSI\text{-}RS) + 64*(6+3*7) (\text{beam index}) + \\ 64*(6+3*7) (\text{beam quality}) = 3572 \text{ bits} \quad (1)$$

However, only one base station 105 would be selected for the handover. Thus, the beam measurements for each of multiple neighbor cells may not be useful when only one base station 105 is selected for the handover, especially if some of the neighbor cells are unlikely to be picked as the target cell.

To reduce power consumption and signaling overhead caused by a large number of beam-level measurements, a base station 105 and a UE 115 described herein may implement techniques for the UE 115 to measure and report beams for a subset of the neighboring cells. For example, if a neighboring cell is likely to be considered for a handover, the neighboring cell may be included in a subset of cells. The UE 115 may perform cell measurements for each of the neighboring cells, but only perform or report beam measurements for cells in the subset of cells.

In an example, UE 115-*a* may receive indicators of a configuration 205 from base station 105-*a*, which may be the serving cell for UE 115-*a*. Based on the configuration 205, UE 115-*a* may perform cell-level measurements and may support measurement events for neighboring cells, but not beam-level L3 measurements by default. For example, UE 115-*a* may perform cell measurements for base station 105-*b* and base station 105-*c*, which may be examples of neighboring cells of base station 105-*a*. However, UE 115-*a* may only perform additional beam-level measurements or beam-level reporting for a neighboring cell if that neighboring cell is identified as in the subset of the neighboring cells. In some cases, the subset of the neighboring cells may be referred to as a pre-triggered cell set, and the cells in the subset may be referred to as pre-trigger cells. Techniques for configuring the UE 115-*a* to identify or select and maintain the subset of cells are described.

In a first example, UE 115-*a* may identify the subset of cells. In some cases, selecting the subset of cells may be up to UE implementation. For example, UE 115-*a* may select cells for the subset of cells without additional signaling or additional configuration from the serving cell. Additionally, or alternatively, base station 105-*a* may configure UE 115-*a* with a set of thresholds. If a neighboring cell has a signal strength that satisfies the thresholds, that neighboring cell may be included in the subset of cells, and UE 115-*a* may perform beam-level measurements for that neighboring cell. In some cases, a neighboring cell with cell measurements which exceed a threshold (e.g., larger than M dB) may be included in the subset of cells. Additionally, or alternatively, a neighboring cell may be included in the subset of cells if the neighbor cell is larger than a first threshold while base station 105-*a* has a signal which is worse than a second threshold. For example, if the neighbor cell has a signal strength larger than M dB and the serving cell has a signal strength lower than N dB, the neighbor cell may be included in the subset of cells, and UE 115-*a* may perform beam-level measurements for the neighbor cell. In another example, UE 115-*a* may include a neighbor cell in the subset of cells if a standard deviation of beam level quality (e.g., determined by the beam consolidation/selection process described above in FIG. 3) satisfies a threshold. For example, if the standard deviation of beam level quality for a base station 105 is larger than P dB, UE 115-*a* may include the base station 105 in the subset of cells and perform beam-level measurements for the base station 105.

In an example, base station 105-*b* may transmit reference signals 210 for each of its configured beams. UE 115-*a* may receive and measure reference signals 210-*b* from base station 105-*b*. UE 115-*a* may perform cell measurements as described herein. Based on the conditions for a UE 115 selecting the subset of cells described herein, UE 115-*a* may include base station 105-*b* in the subset of neighbor cells or the pre-triggered cell set. If, for example, the measured RSRP, RSRQ, SINR, or any combination thereof, of base station 105-*b* exceeds a threshold, UE 115-*a* may include base station 105-*b* in the subset of neighbor cells. In other examples, UE 115-*a* may also consider the signal strength of base station 105-*a* in the determination based on reference signals 210-*a*. If base station 105-*b* is included in the subset of cells, UE 115-*a* may then perform beam-level measurements for base station 105-*b*. In some cases, UE 115-*a* may report the beam-level measurements to base station 105-*a*.

UE 115-*a* may take cell measurements for base station 105-*c*. However, base station 105-*c* may already serve a large number of UEs 115, including the set of UEs 230. The cell measurements for base station 105-*c* may satisfy the thresholds, and UE 115-*a* may determine to put base station 105-*c* in the subset of neighboring cells. UE 115-*a* may then perform beam-level measurements for base station 105-*c* and report these measurements to base station 105-*a*. However, base station 105-*c* may be unable to take UE 115-*a* in the handover, as base station 105-*c* may serve many UEs 115 already. In this case, a signal strength from a neighbor cell may be strong, but that neighbor cell may already have high loading. UE 115-*a* and the base stations 105 may additionally, or alternatively, implement techniques to avoid loading issues.

In a second example, base station 105-*a* may configure and maintain the subset of neighboring cells. Base station 105-*a* may maintain the subset of neighboring cells based on cell measurements made by UE 115-*a*. In some conventional wireless communications systems, a UE 115 may transmit a measurement report 215 based on a measurement event trigger. UEs 115 and base stations 105 described herein may implement techniques which support periodically reporting neighbor cell quality or utilizing additional triggers for reporting cell measurements.

In some cases, UE 115-*a* may be configured to report neighbor cell quality periodically. The reporting periodicity may be selected by base station 105-*a*, or another device of the wireless communications system 200 such as a network controller. After receiving a periodic measurement report 220 from UE 115-*a*, base station 105-*a* may determine whether to include the neighbor cell in the subset of neighbor cells (e.g., the pre-triggered cell set). The criteria for determining whether to include the neighbor cell may include, for example, cell quality, cell loading, both cell quality and cell loading, or other factors.

In some examples, base station 105-*a* may order the cells of the subset in terms of priority. The priority of the cells in the subset may be based on cell quality or cell load. UE 115-*a* may measure and report beam-level measurements for the cells in the configured subset. In some cases, UE 115-*a* may be configured to perform different number of beam measurements for different neighbor cells with different priority. For example, if a cell is identified as high priority (e.g., ordered first), UE 115-*a* may perform more beam measurements for the high priority cell than for a low priority cell. In some cases, a strong cell measurement may be an indicator of a greater number of strong beams. Therefore, UE 115-*a* may be configured to perform more beam measurement for stronger cells or cells with lighter loading. In some cases, this may be reflected in the ordering of the cells in the subset or the priority of the cells in the subset.

In an example, UE 115-*a* may measure the signal strength of base station 105-*b* and base station 105-*c* and transmit a periodic measurement report 220 for the base stations 105. Base station 105-*a* may receive the periodic measurement report 220 and determine whether to include base station 105-*b*, base station 105-*c*, both base stations 105, or neither base station 105 in the configured subset. In one example, base station 105-*a* may include both base station 105-*b* and base station 105-*c* in the subset, but base station 105-*a* may set a higher priority for base station 105-*b* than base station 105-*c* due to heavy loading at base station 105-*c*.

Base station 105-*a* may configure UE 115-*a* with the subset of neighboring cells (e.g., via RRC signaling), and UE 115-*a* may perform beam-level measurements for the cells in the subset of cells based on the configuration. For example, UE 115-*a* may perform more L3 beam filtering procedures for base station 105-*b* than base station 105-*c* based on the priority ordering of the subset of cells.

In some cases, UE 115-*a* may be configured to report a candidate neighbor cell based on a configured measurement event. UE 115-*a* may measure reference signals 210 from neighboring base station and trigger a cell measurement report based on a set of thresholds configured at UE 115-*a*. These configured triggers may be in addition to the set of triggers used for conventional cell measurement reporting. In some cases, the configured triggers may be based on "looser" or easier to trigger thresholds than the set of triggers for conventional cell measurement reporting. In some cases, these configured measurement events may not be used to initiate a handover. For example, the configured measurement events may be used to indicate an update for the subset of cells. Then, when the UE 115-*a* triggers a measurement event for handover, UE 115-*a* may have an up-to-date list of cells for the subset of cells for which the UE performs beam measurements.

For example, if the signal of a neighbor cell becomes offset X dB better than the signal of base station 105-*a*, UE 115-*a* may be configured to transmit a measurement report to base station 105-*a*. Additionally, or alternative, if a neighbor cell becomes better than a threshold Y dB, UE 115-*a* may be configured to transmit a measurement report. Or, in some cases, if the signal strength of base station 105-*a* becomes worse than a threshold Z1 and the signal strength of a neighbor cell becomes better than a threshold Z2, UE 115-*a* may be configured to transmit a measurement report.

For the configured measurement events, either SSB or CSI-RS may be configured for UE 115-*a* to evaluate and trigger and event based on cell evaluation. Base station 105-*a* may receive the measurement reports and order the cells of the subset in terms of priority (e.g., based on cell quality or cell load).

In some cases, UE 115-*a* and base station 105-*a* may remove a cell from the subset of cells. For example, if the signal strength a cell in the subset of cells fails to satisfy a criteria, that cell may be removed from the subset of cells. For example, if the signal strength of the cell dips below a threshold, or if loading of the cell increases, the cell may be removed from the subset of cells. In some other examples, a cell may be removed from the subset of cells based on a difference between a neighbor cell signal quality and a serving cell signal quality not satisfying a threshold. Additionally, or alternatively, a cell may be removed from the subset of cells based on a neighbor cell signal quality not satisfying a first threshold or a serving cell signal quality not satisfying a second threshold. In some cases, UE 115-*a* may be configured with a set of thresholds and trigger a measurement event to remove a cell from the subset of cells based on cell measurements. For example, even if UE 115-*a* indicated to include base station 105-*b* in the subset of cells previously based on a strong signal, UE 115-*a* may indicate to remove base station 105-*b* from the subset of cells if the signal strength of base station 105-*b* dips below a signal strength threshold. Or, in another example, the signal strength of base station 105-*a* may increase above a threshold such that base station 105-*a* goes from having poor signal quality to high signal quality. In this example, base station 105-*b* may be removed from the configured subset of cells. Additionally, or alternatively, if a measurement report transmitted by UE 115-*a* indicates that a signal strength of a neighbor cell fails to meet a threshold, base station 105-*a* may remove that neighbor cell from the configured subset of neighbor cells.

Figure 3:
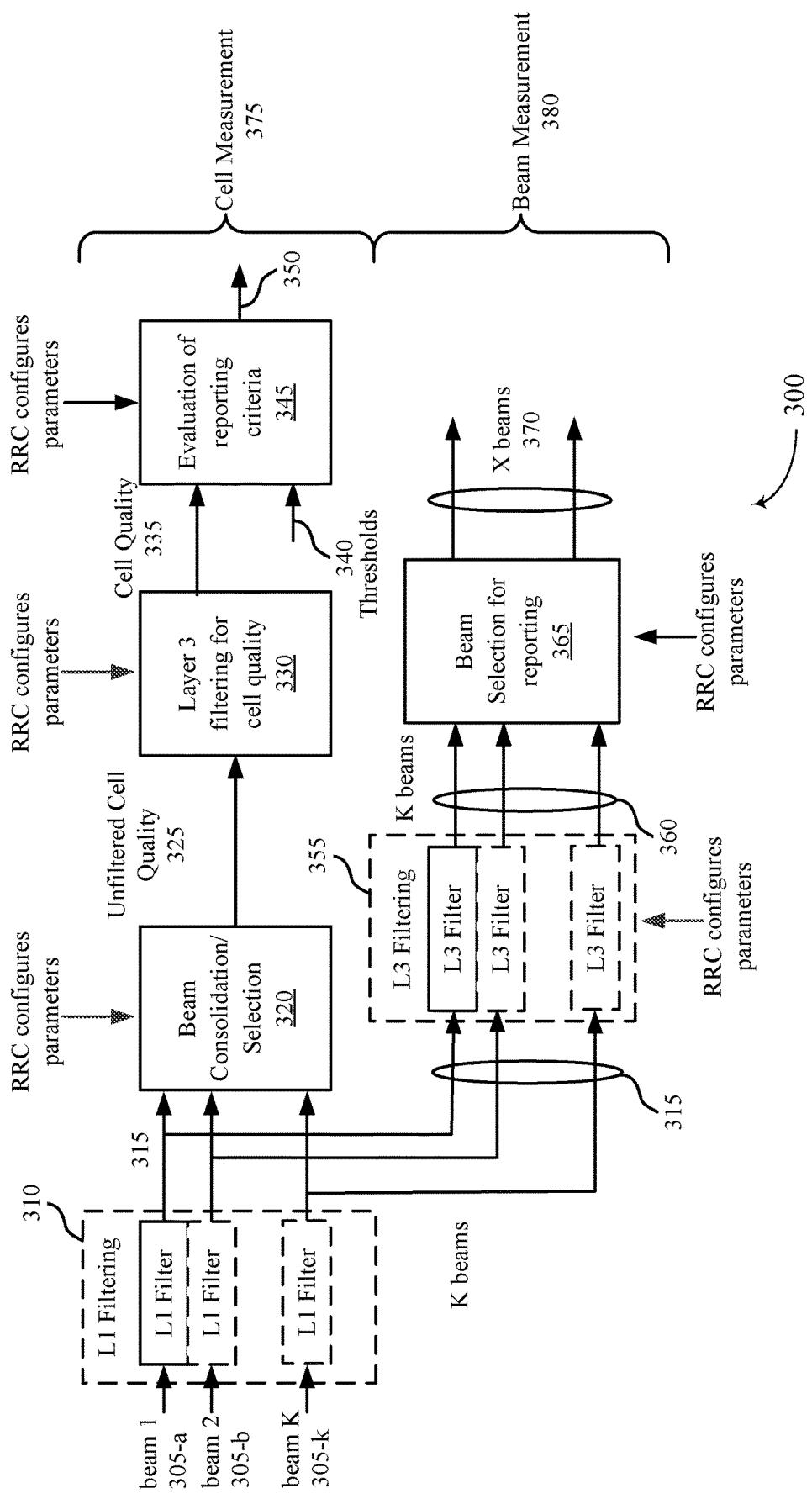
FIG. 3 illustrates an example of a measurement model that supports beam measurement for a cell subset in accordance with aspects of the present disclosure.

FIG. 3 illustrates an example of a measurement model 300 that supports beam measurement for a cell subset in accordance with aspects of the present disclosure. In some examples, measurement model 300 may implement aspects of wireless communication system 100.

A wireless communications system may attempt to provide a strong signal for a UE 115. If a neighboring cell can provide a stronger signal than a serving cell, the UE 115 may be handed over from the serving cell to the neighboring cell. The UE 115 may measure signal strength from its serving cell as well as neighboring cells to detect if a neighboring cell has better signal strength and may be able to provide a stronger connection. The UE 115 may monitor for reference signals to measure the signal strengths of the cells. If a measurement triggers a measurement event, the UE 115 may provide its serving cell with measurement report. In some cases, a measurement report may initiate a handover for the UE 115. An example of a measurement event may be the signal strength of a neighboring cell surpassing a threshold, or the signal strength of the serving cell falling below a threshold.

Some wireless communications systems may support beamformed transmissions. Therefore, as part of mobility management, the UE 115 and its serving cell may identify a best beam among the beams provided by a target base station in a handover. The UE 115 may make measurements for both a candidate cell on average as well as each of the beams of the candidate cell. These different measurements may respectively be referred to as cell measurements, or cell-level measurements, and beam measurements, or beam-level measurements. The UE 115 may provide both cell measurements and beam measurements in a measurement report when a measurement event is triggered. Cell level measurements may be used for judging the cell quality of a neighbor cell and triggering a measurement event. In some cases, beam level measurements may be used by the network to configure CFRA resources of a target cell in a handover. In some examples, beam level measurements may assist the network in making a handover decision, as some wireless communications networks may use a best beam for deciding a handover as an alternative to, or in addition to, an averaged cell quality.

The measurement model 300 generally describes how a UE 115 takes a measurement of signal strength of a base station 105. The UE 115 may receive one or more beams 305 from the base station 105. For example, the UE 115 receives K beams, including beam 305-*a* and beam 305-*b* through 305-*k* as shown. These beams may be used to transmit reference signals, such as CSI-RS, which are measured by the UE 115. If taking measurements for multiple base stations, the UE 115 may use this measurement model 300 for each of the base stations 105.

The UE 115 may perform an initial filtering on each received beam at 310. For example, the UE 115-*a* may perform Layer1 ("L1") filtering on each of the received beams to receive L1 filtered beams 315. The L1 filtered beams 315 may be used for both cell measurements 375 and beam measurements 380. In some cases, the L1 filtering process may be UE implementation specific. For example, the UE 115 may adjust parameters for the L1 filtering process.

For cell measurements 375, the UE 115 may use the L1 filtered beams 315 in a beam consolidation/selection process 320. The beam consolidation/selection process 320 may average the L1 filtered beams 320 together to receive an average cell quality for the base station 105. The serving cell may configure the UE 115 with some parameters for the beam consolidation/selection process 320. In some cases, the parameters for the consolidation/selection process 320 may be configured by RRC signaling. The UE 115 may receive an unfiltered averaged cell quality 325 for the base station 105 from the beam consolidation/selection process 320. For example, K values for received beams go in, 1 value for an unfiltered averaged cell quality comes out.

The unfiltered averaged cell quality 325 may be filtered to prevent a ping-ponging effect. For example, the unfiltered averaged cell quality 325 may be processed by a Layer3 ("L3") cell quality filter 330, where parameters for the L3 cell quality filter 330 are configured by RRC. The L3 cell quality filter 330 may provide a smooth result for the averaged cell quality which avoids ping-pong handover.

The L3 filtered cell quality 335, in some cases referred to as the cell quality, may be evaluated against reporting criteria. In some cases, there may be multiple different criteria which trigger a measurement report. For example, if the cell quality (e.g., RSRP, RSRQ, or SINR of the cell) is larger than a threshold 340, this may trigger a measurement event, and the UE 115 may transmit a measurement report to its serving cell. Additionally, or alternatively, the measurement event may be triggered based on a signal strength of the serving cell. The UE 115 may include a cell measurement result 350 in the measurement report. The serving cell and the network may prepare for a handover based on the measurement report.

For a beam measurement 380, the L1 filtered beams 315 may each be processed by an L3 beam filter 355. In some cases, parameters for the L3 beam filters 355 may be configured by RRC signaling from the serving cell. The L3 filtered beams 360 may be used in a beam selection process 365, which selects the beams to report to the serving cell, for example as part of the measurement report. Some of the L3 filtered beams 360 may have a poor quality, so the beam selection process 365 may remove beams with poor quality, as these beams may not be used should the UE 115 be handed over to this base station 105. Based on the beam selection process 365, UE 115-a may select a set of best beams 370 of the L3 filtered beams 365 to report. For example, UE 115-a may just report the highest quality L3 filtered beams. In some cases, the UE 115 may include the beam index or beam quality, or both, for the best beams 370 in the measurement report.

In some wireless communications networks, a conventional UE 115 may be configured to report cell measurements and beam measurements for each neighboring cell. A UE 115 described herein may be configured to instead report beam measurements for a configured set of neighboring cells. For example, the UE 115 may report cell measurements for each of the neighboring cells, but the UE 115 may report beam measurements for a subset of the neighboring cells which meet configured criteria or are included in a set of pre-triggered cells configured by the serving cell.

As described in FIG. 2, the UE 115 may identify the pre-triggered cell set without additional assistance from the serving cell, based on a configured set of thresholds, or both. Additionally, or alternatively, the serving cell may select the cells in the pre-triggered cell set based on cell measurements reported by the UE 115. In some cases, the cell measurements used to select the pre-triggered cell set may be periodically reported by the UE 115, or the serving cell may configure a measurement event with additional thresholds. By reporting beam measurements for the configured subset of neighboring cells, the UE 115 may reduce the power used to measure beams for each of the neighboring cells as well as reduce an overhead associated with reporting beam measurements for each neighboring cell.

Figure 4:
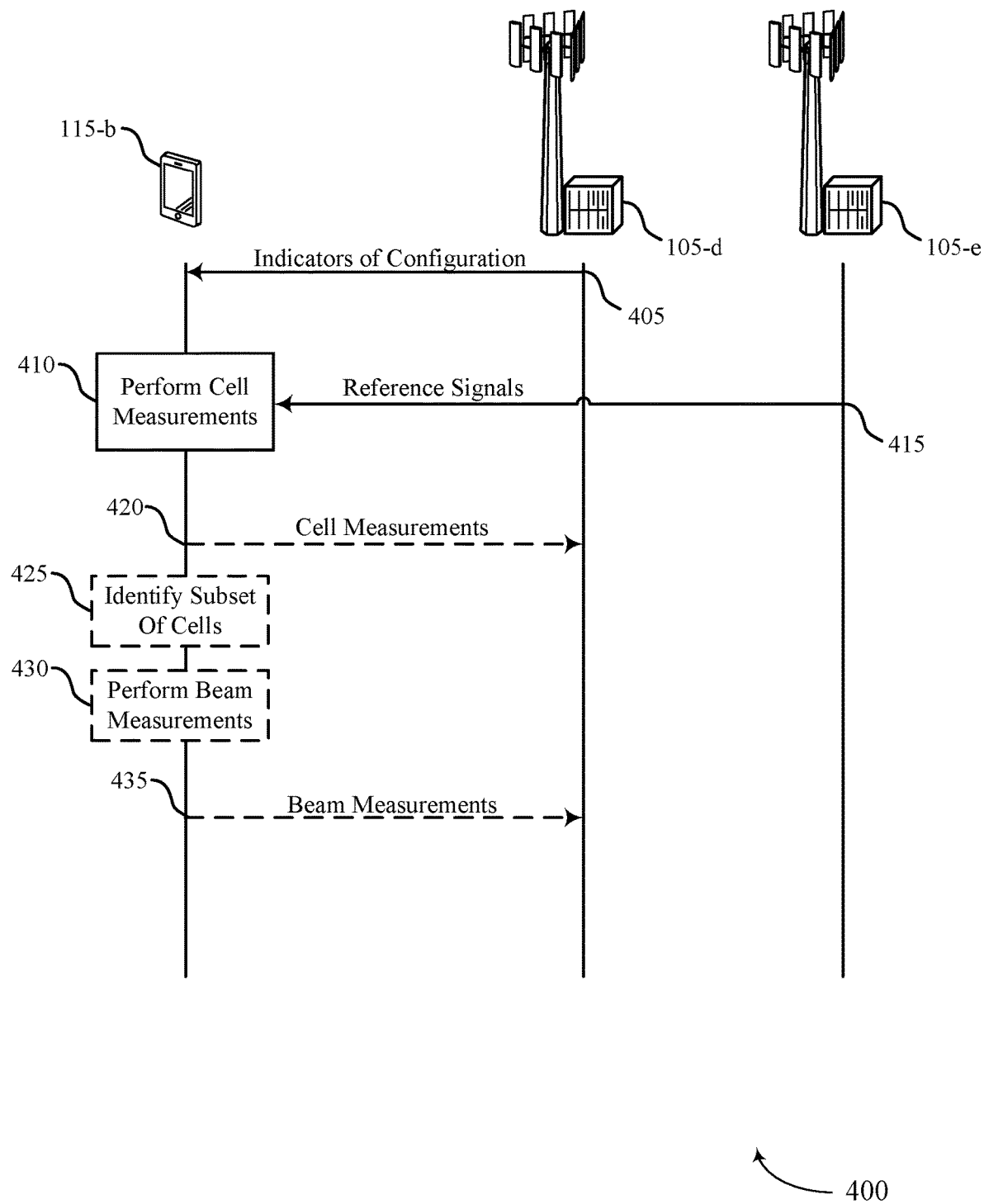
FIG. 4 illustrates an example of a process flow that supports beam measurement for a cell subset in accordance with aspects of the present disclosure.

FIG. 4 illustrates an example of a process flow 400 that supports beam measurement for a cell subset in accordance with aspects of the present disclosure. In some examples, process flow 400 may implement aspects of wireless communication system 100. Process flow 400 may include UE 115-b, which may be an example of a UE 115 described herein. Process flow 400 may also include base station 105-d and base station 105-e, which may each be an example of a base station 105 described herein.

At 405, UE 115-b may receive, from a serving cell, indicators of a configuration for measurement reporting. For example, base station 105-d may be the serving cell of UE 115-b, and base station 105-b may transmit the indicators of the configuration for measurement reporting to UE 115-b.

At 410, UE 115-b may perform cell measurements for a set of neighboring cells based on the configuration. For example, base station 105-e may be an example of a neighboring cell. At 415, base station 105-e may transmit reference signals, and UE 115-b may perform a cell-level measurement for base station 105-e based on the received reference signals. CSI-RS may be an example of a reference signal used for cell measurements.

In some cases, at 420, UE 115-b may report the cell measurements for the set of neighboring cells to the serving cell. For example, UE 115-b may report the cell measurements for base station 105-e to base station 105-d. In some cases, base station 105-e may be included in a subset of cells.

At 425, UE 115-b may identify a subset of the neighboring cells based the configuration, the cell measurements, or both. UE 115-b may perform beam-level measurements for cells in the subset of cells. However, if a neighboring cell is not included in the subset of cells, UE 115-b may not perform beam-level measurement for that neighboring cell.

In some cases, UE 115-b may identify and manage the subset of cells. For example, UE 115-b may receive one or more thresholds from the serving cell, and UE 115-b may identify the subset of the neighboring cells based on the one or more thresholds. In an illustrated example, if base station 105-e satisfies the thresholds, base station 105-e may be included in the subset of cells. In some cases, the thresholds may include a signal strength for a neighboring cell. If, for example, base station 105-e has a signal strength which is greater than the configured threshold, UE 115-b may include base station 105-e in the subset of neighboring cells. Then, UE 115-b may perform beam measurements for base station 105-e at 430.

In another example, the subset of neighboring cells may be configured and maintained by the serving cell (e.g., base station 105-d). For example, base station 105-d may receive measurement reports from UE 115-b and update the subset of cells based on the measurement reports. In some cases, base station 105-d may configure UE 115-b to transmit periodic cell measurements. Based on the cell measurements, base station 105-d may include or remove a neighboring cell from the subset. For example, if a periodic measurement report indicates that base station 105-*e* has a strong signal strength for UE 115-*b*, base station 105-*d* may include base station 105-*e* in the subset of cells. Base station 105-*d* may then transmit an indicator of the subset of cells to UE 115-*b*, and UE 115-*b* may perform beam measurements for the subset of cells in addition to cell measurements.

Additionally, or alternatively, base station 105-*d* may configure a set of thresholds at UE 115 for a measurement event associated with the subset of cells. If, for example, UE 115-*b* detects that a signal strength of a neighboring cell satisfies a configured threshold, UE 115-*b* may transmit an indicator of the neighboring cell to base station 105-*d*. Base station 105-*d* may then include the indicated neighboring cell in the subset of cells. Additionally, or alternatively, UE 115-*b* may be triggered to transmit a cell measurement report, and base station 105-*d* may decide whether to include the indicated neighboring cell in the subset of cells based on the measurement report.

In some cases, other criteria such as cell loading may be considered when determining whether to include a cell in the subset of cells. For example, UE 115-*b* may measure a strong signal strength from base station 105-*e*, but base station 105-*e* may already serve many UEs 115. In these examples, base station 105-*e* may not be included in the subset of cells based on its high UE loading.

UE 115-*b* may report the beam measurements for the subset of the neighboring cells to the serving cell at 435. For example, if base station 105-*e* is included in the subset of cells, UE 115-*b* may include beam measurements for base station 105-*e* in a measurement report transmitted to base station 105-*d*. In some cases, beam measurements and cell measurements may be transmitted in a same measurement report. For example, the cell measurements, shown to be transmitted at 420, may additionally, or alternatively, be transmitted in a measurement report at 435 with the beam measurements.

Figure 5:
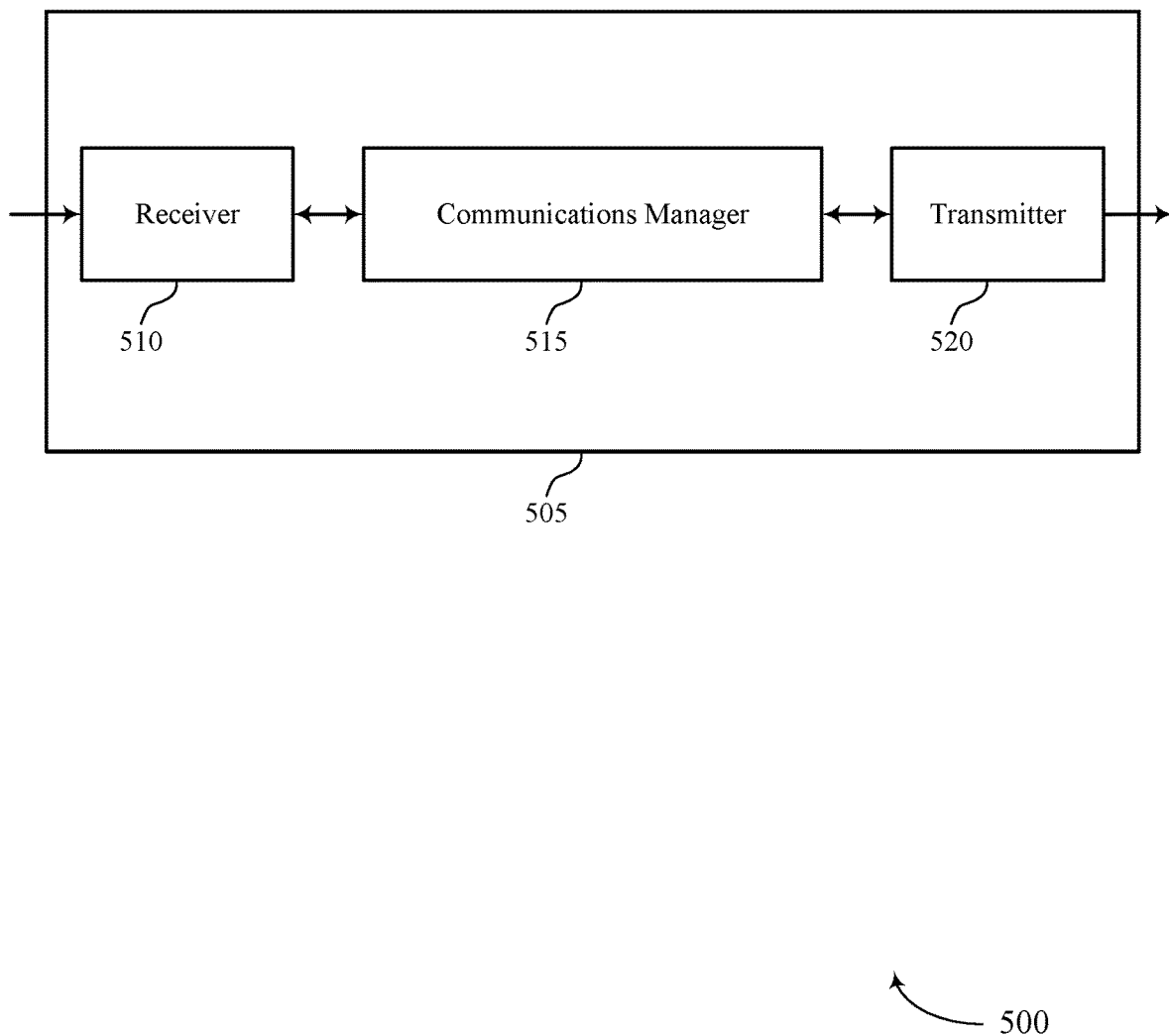
FIGS. 5 and 6 show block diagrams of devices that support beam measurement for a cell subset in accordance with aspects of the present disclosure.

FIG. 5 shows a block diagram 500 of a device 505 that supports beam measurement for a cell subset in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to beam measurement for a cell subset, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a serving cell, indicators of a configuration for measurement reporting, perform cell measurements for a set of neighboring cells based on the configuration, report the cell measurements for the set of neighboring cells to the serving cell, identify a subset of the neighboring cells based on one or more of the configuration or the cell measurements, perform beam measurements for the subset of the neighboring cells based on the configuration, and report the beam measurements for the subset of the neighboring cells to the serving cell.

In some cases, the communications manager 515 may receive a control message indicating that a first group of reference signals is quasi co-located with a second group of reference signals for measurement reporting, receive the first group of reference signals and the second group of reference signals, perform measurements on the first group of reference signals, or the second group of reference signals, or both based on the first group of reference signals being quasi co-located with the second group of reference signals, and report measurements on the first group of reference signals, or measurements on the second group of reference signals, or group measurements on the first group of reference signals and the second group of reference signals based on the first group of reference signals being quasi co-located with the second group of reference signals. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
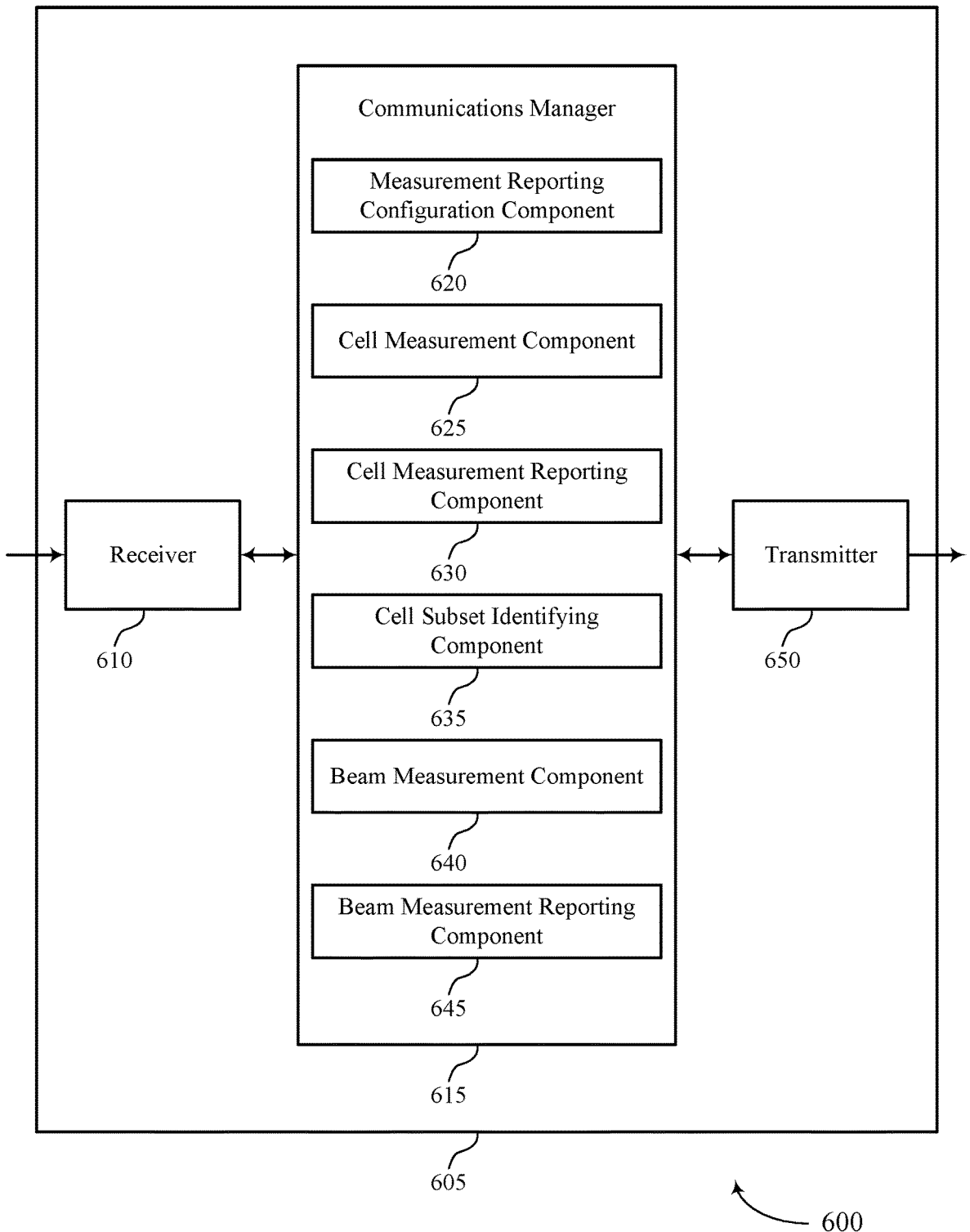

FIG. 6 shows a block diagram 600 of a device 605 that supports beam measurement for a cell subset in accordance with aspects of the present disclosure. The device 605 may be an example of aspects of a device 505, or a UE 115 as described herein. The device 605 may include a receiver 610, a communications manager 615, and a transmitter 650. The device 605 may also include a processor. Each of these components may be in communication with one another (e.g., via one or more buses).

The receiver 610 may receive information such as packets, user data, or control information associated with various information channels (e.g., control channels, data channels, and information related to beam measurement for a cell subset, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a measurement reporting configuration component 620, a cell measurement component 625, a cell measurement reporting component 630, a cell subset identifying component 635, a beam measurement component 640, and a beam measurement reporting component 645. The communications manager 615 may be an example of aspects of the communications manager 810 described herein.

The measurement reporting configuration component 620 may receive, from a serving cell, indicators of a configuration for measurement reporting. The cell measurement component 625 may perform cell measurements for a set of neighboring cells based on the configuration. The cell measurement reporting component 630 may report the cell measurements for the set of neighboring cells to the serving cell. The cell subset identifying component 635 may identify a subset of the neighboring cells based on one or more of the configuration or the cell measurements. The beam measurement component 640 may perform beam measurements for the subset of the neighboring cells based on the configuration. The beam measurement reporting component 645 may report the beam measurements for the subset of the neighboring cells to the serving cell.

The transmitter 650 may transmit signals generated by other components of the device 605. In some examples, the transmitter 650 may be collocated with a receiver 610 in a transceiver module. For example, the transmitter 650 may be an example of aspects of the transceiver 820 described with reference to FIG. 8. The transmitter 650 may utilize a single antenna or a set of antennas.

Figure 7:
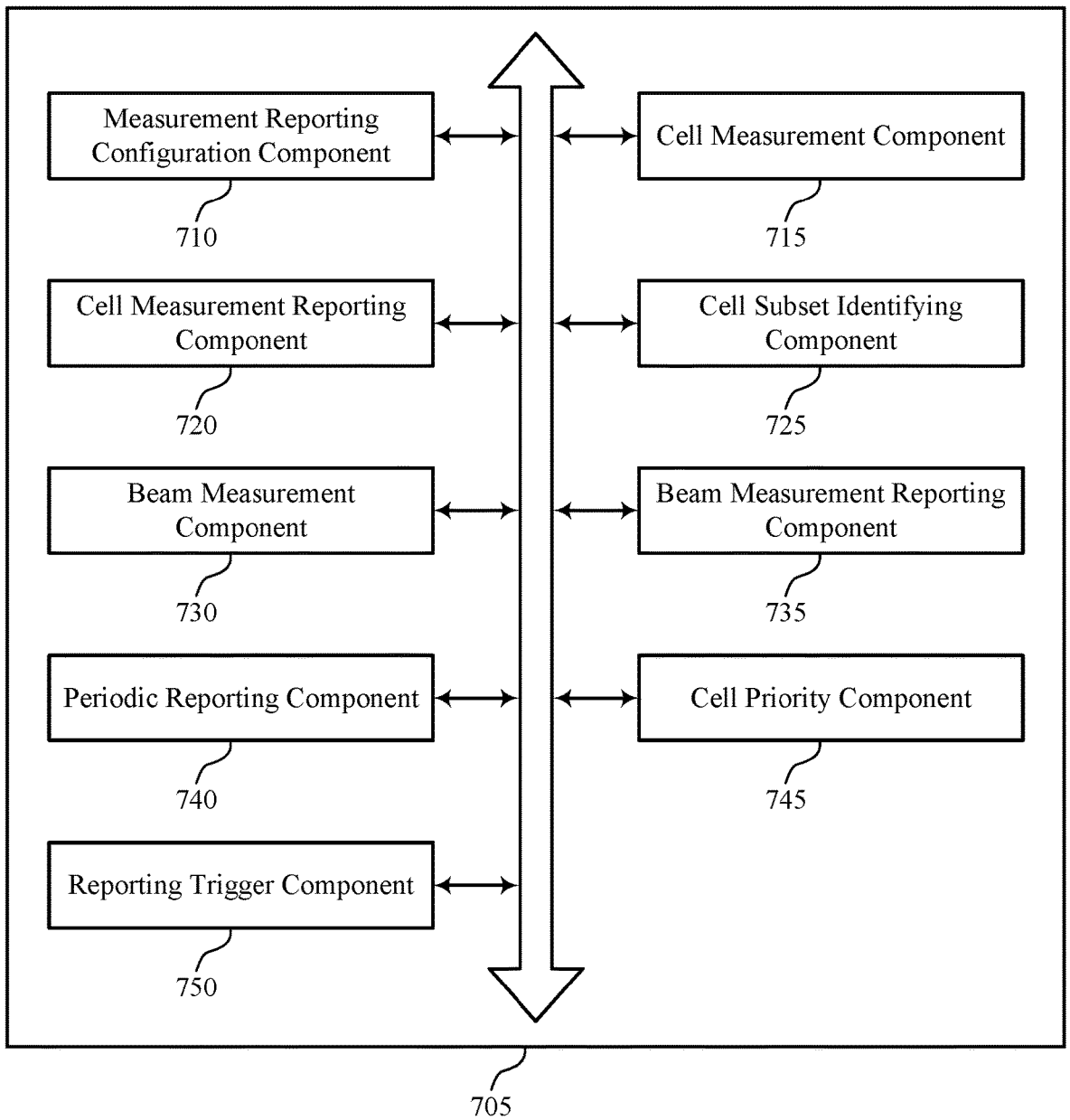
FIG. 7 shows a block diagram of a communications manager that supports beam measurement for a cell subset in accordance with aspects of the present disclosure.

FIG. 7 shows a block diagram 700 of a communications manager 705 that supports beam measurement for a cell subset in accordance with aspects of the present disclosure. The communications manager 705 may be an example of aspects of a communications manager 515, a communications manager 615, or a communications manager 810 described herein. The communications manager 705 may include a measurement reporting configuration component 710, a cell measurement component 715, a cell measurement reporting component 720, a cell subset identifying component 725, a beam measurement component 730, a beam measurement reporting component 735, a periodic reporting component 740, a cell priority component 745, and a reporting trigger component 750. Each of these modules may communicate, directly or indirectly, with one another (e.g., via one or more buses).

The measurement reporting configuration component 710 may receive, from a serving cell, indicators of a configuration for measurement reporting. In some cases, the indicators of the configuration are received by RRC signaling.

The cell measurement component 715 may perform cell measurements for a set of neighboring cells based on the configuration. In some examples, the cell measurement component 715 may measure one or more of an SSB or a CSI-RS for each cell of the set of neighboring cells. The cell measurement reporting component 720 may report the cell measurements for the set of neighboring cells to the serving cell.

The cell subset identifying component 725 may identify a subset of the neighboring cells based on one or more of the configuration or the cell measurements. In some examples, the cell subset identifying component 725 may receive one or more thresholds from the serving cell. In some examples, the cell subset identifying component 725 may identify the subset of the neighboring cells based on the one or more thresholds.

In some examples, the cell subset identifying component 725 may identify the subset of the neighboring cells based on a signal strength of the subset of the neighboring cells satisfying the one or more thresholds. In some examples, the cell subset identifying component 725 may identify the subset of the neighboring cells based on a signal strength of the subset of the neighboring cells satisfying a first threshold and a signal strength of the serving cell satisfying a second threshold. In some examples, the cell subset identifying component 725 may identify the subset of the neighboring cells based on a standard deviation of beam level quality satisfying the one or more thresholds. In some examples, the cell subset identifying component 725 may receive an indicator that identifies the subset of the neighboring cells based on the cell measurements.

The beam measurement component 730 may perform beam measurements for the subset of the neighboring cells based on the configuration. In some examples, the beam measurement component 730 may filter the beam measurements by a Level 3 filter, where the Level 3 filter is configured by RRC signaling.

The beam measurement reporting component 735 may report the beam measurements for the subset of the neighboring cells to the serving cell. The periodic reporting component 740 may periodically report the cell measurements for the set of neighboring cells to the serving cell. In some examples, the periodic reporting component 740 may receive an indicator that identifies the subset of the neighboring cells based on the periodic reporting.

The cell priority component 745 may identify an order for the subset of the neighboring cells based on one or more of a cell level quality or a cell load. In some examples, the cell priority component 745 may determine a priority of a cell of the subset of the neighboring cells based on the order. In some examples, the cell priority component 745 may perform the beam measurements for the cell based on the priority of the cell.

The reporting trigger component 750 may receive a threshold from the serving cell. In some examples, the reporting trigger component 750 may identify a trigger for reporting the cell measurements based on a difference between a neighbor cell signal quality and a serving cell signal quality satisfying the threshold. In some examples, the reporting trigger component 750 may identify a trigger for reporting the cell measurements based on a neighbor cell signal quality satisfying the threshold.

In some examples, the reporting trigger component 750 may receive one or more thresholds from the serving cell. In some examples, the reporting trigger component 750 may identify a trigger for reporting the cell measurements based on a neighbor cell signal quality satisfying a first threshold and a serving cell signal quality satisfying a second threshold. In some examples, the reporting trigger component 750 may identify a trigger for reporting the cell measurements based on a neighbor cell signal quality not satisfying the threshold, where a neighbor cell is removed from the subset of neighboring cells based on reporting the cell measurements.

In some examples, the reporting trigger component 750 may receive a threshold from the serving cell. In some examples, the reporting trigger component 750 may identify a trigger for reporting the cell measurements based on a difference between a neighbor cell signal quality and a serving cell signal quality not satisfying the threshold, where a neighbor cell is removed from the subset of neighboring cells based on reporting the cell measurements.

In some examples, the reporting trigger component 750 may receive one or more thresholds from the serving cell. In some examples, the reporting trigger component 750 may identify a trigger for reporting the cell measurements based on a neighbor cell signal quality not satisfying a first threshold or a serving cell signal quality not satisfying a second threshold, where a neighbor cell is removed from the subset of neighboring cells based on reporting the cell measurements.

Figure 8:
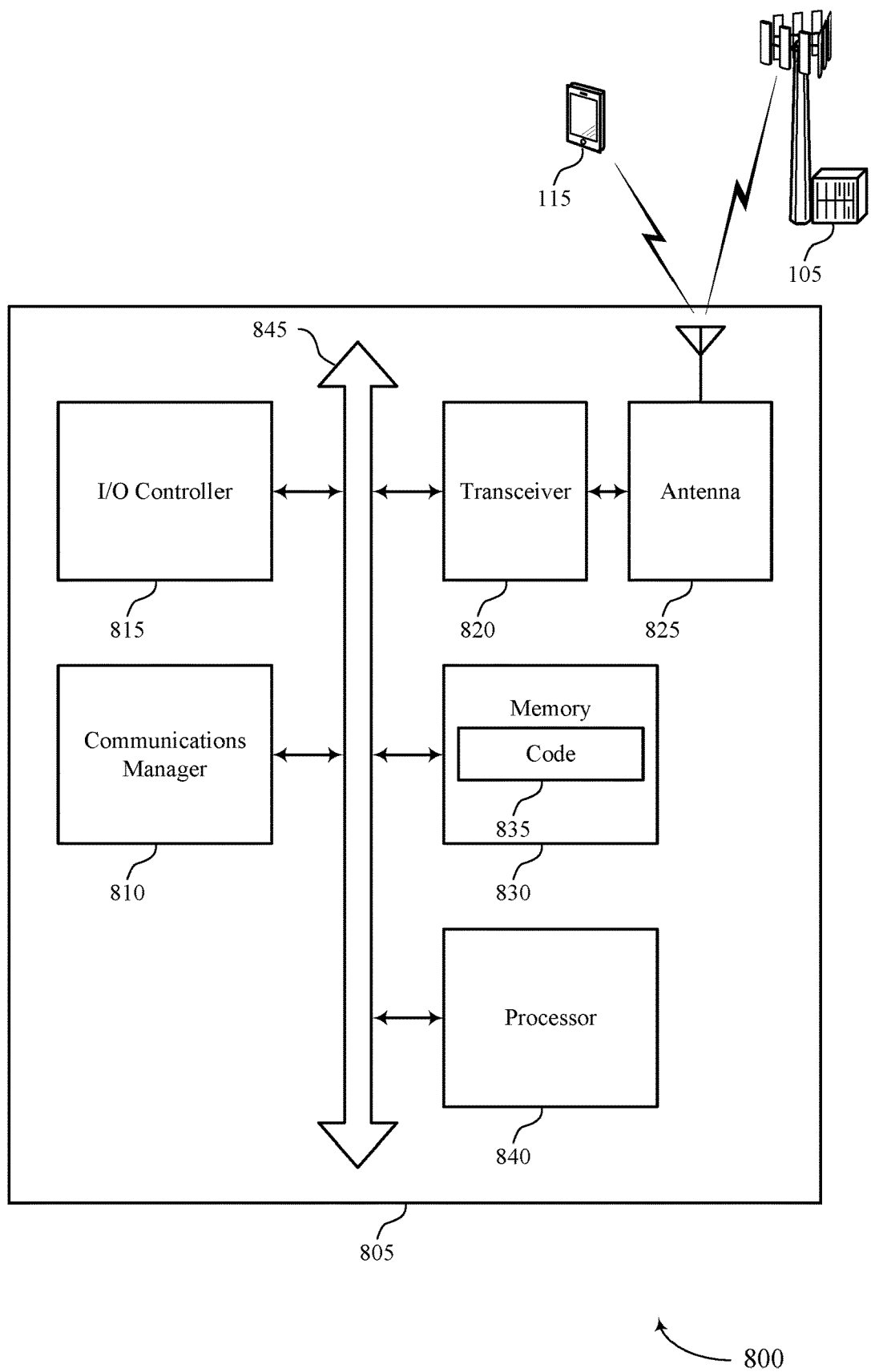
FIG. 8 shows a diagram of a system including a device that supports beam measurement for a cell subset in accordance with aspects of the present disclosure.

FIG. 8 shows a diagram of a system 800 including a device 805 that supports beam measurement for a cell subset in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a serving cell, indicators of a configuration for measurement reporting, perform cell measurements for a set of neighboring cells based on the configuration, report the cell measurements for the set of neighboring cells to the serving cell, identify a subset of the neighboring cells based on one or more of the configuration or the cell measurements, perform beam measurements for the subset of the neighboring cells based on the configuration, and report the beam measurements for the subset of the neighboring cells to the serving cell.

In some cases, the communications manager 810 may receive a control message indicating that a first group of reference signals is quasi co-located with a second group of reference signals for measurement reporting, receive the first group of reference signals and the second group of reference signals, perform measurements on the first group of reference signals, or the second group of reference signals, or both based on the first group of reference signals being quasi co-located with the second group of reference signals, and report measurements on the first group of reference signals, or measurements on the second group of reference signals, or group measurements on the first group of reference signals and the second group of reference signals based on the first group of reference signals being quasi co-located with the second group of reference signals.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting beam measurement for a cell subset).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
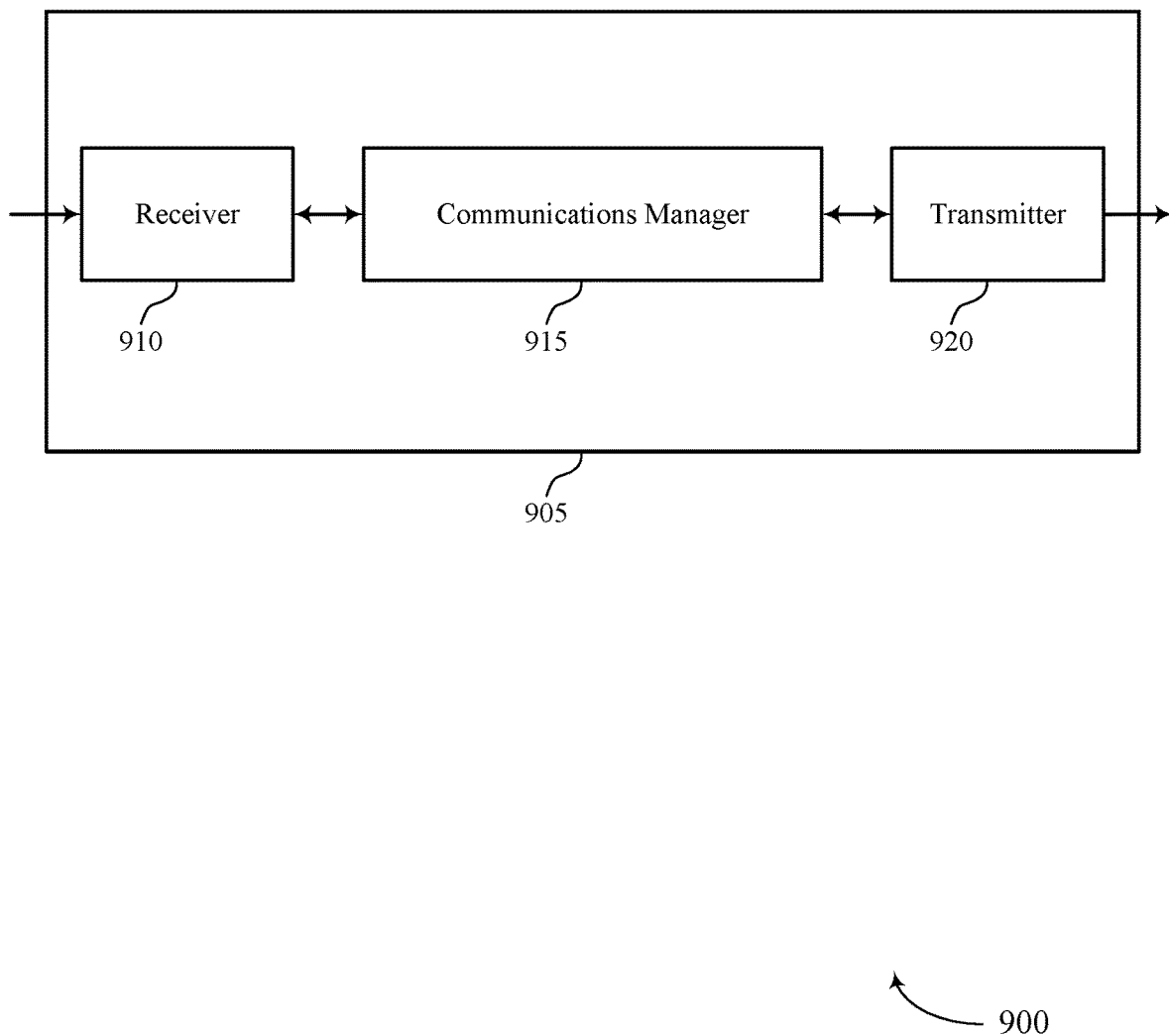
FIGS. 9 and 10 show block diagrams of devices that support beam measurement for a cell subset in accordance with aspects of the present disclosure.

FIG. 9 shows a block diagram 900 of a device 905 that supports beam measurement for a cell subset in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to beam measurement for a cell subset, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may transmit, to a UE, indicators of a configuration for measurement reporting, receive cell measurements for a set of neighboring cells from the UE based on the configuration, identify a subset of the neighboring cells based on one or more of the configuration or the cell measurements, and receive beam measurements for the subset of the neighboring cells from the UE based on the configuration.

In some cases, the communications manager 915 may transmit a control message, to a UE, indicating that a first group of reference signals is quasi co-located with a second group of reference signals for measurement reporting, transmit, to the UE, the first group of reference signals, the second group of reference signals, or both, and receive measurements for the first group of reference signals, or measurements on the second group of reference signals, or group measurements for the first group of reference signals and the second group of reference signals based on the first group of reference signals being quasi co-located with the second group of reference signals. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
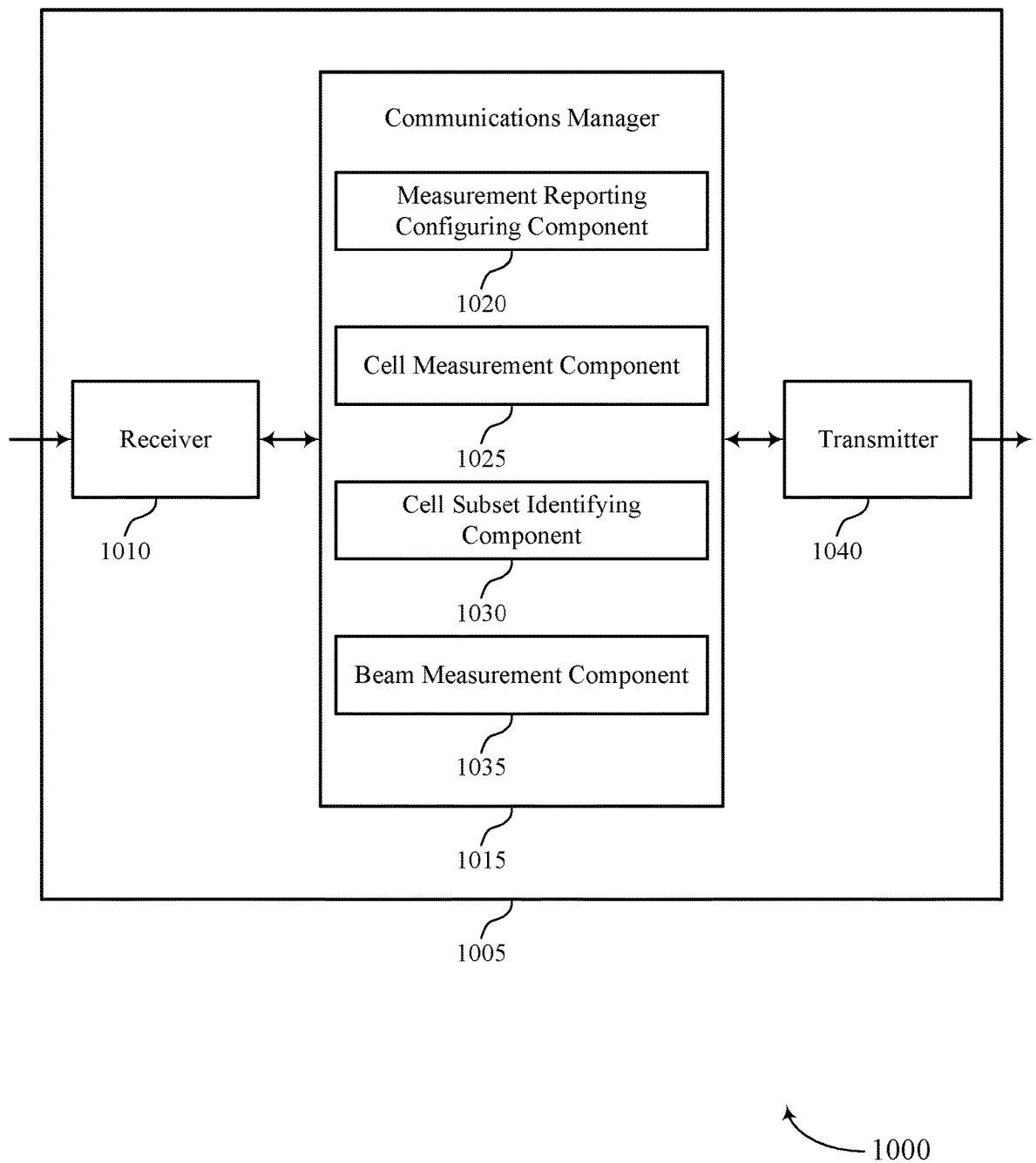

FIG. 10 shows a block diagram 1000 of a device 1005 that supports beam measurement for a cell subset in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to beam measurement for a cell subset, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a measurement reporting configuring component 1020, a cell measurement component 1025, a cell subset identifying component 1030, and a beam measurement component 1035. The communications manager 1015 may be an example of aspects of the communications manager 1210 described herein.

The measurement reporting configuring component 1020 may transmit, to a UE, indicators of a configuration for measurement reporting. The cell measurement component 1025 may receive cell measurements for a set of neighboring cells from the UE based on the configuration. The cell subset identifying component 1030 may identify a subset of the neighboring cells based on one or more of the configuration or the cell measurements. The beam measurement component 1035 may receive beam measurements for the subset of the neighboring cells from the UE based on the configuration.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
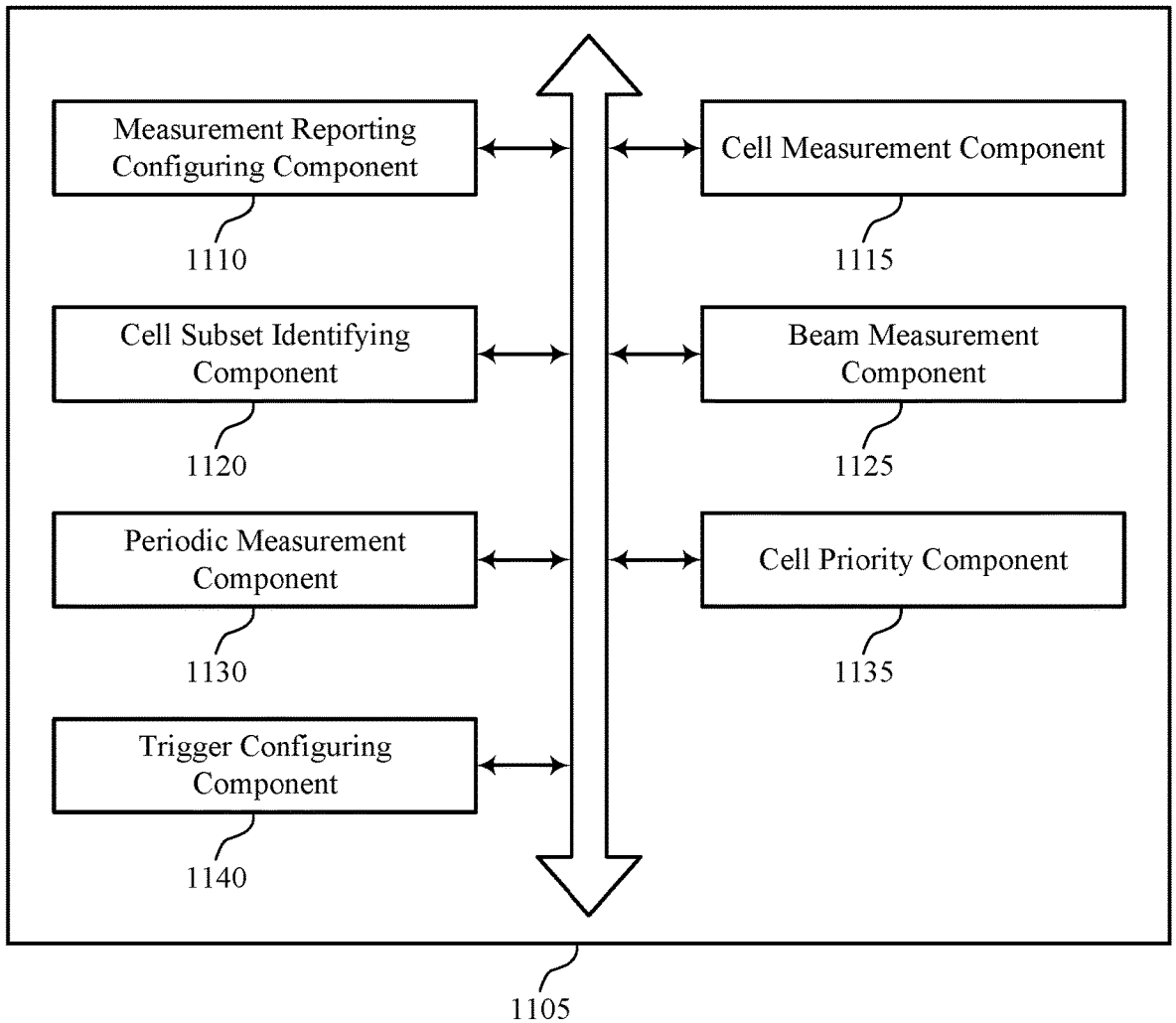
FIG. 11 shows a block diagram of a communications manager that supports beam measurement for a cell subset in accordance with aspects of the present disclosure.

FIG. 11 shows a block diagram 1100 of a communications manager 1105 that supports beam measurement for a cell subset in accordance with aspects of the present disclosure. The communications manager 1105 may be an example of aspects of a communications manager 915, a communications manager 1015, or a communications manager 1210 described herein. The communications manager 1105 may include a measurement reporting configuring component 1110, a cell measurement component 1115, a cell subset identifying component 1120, a beam measurement component 1125, a periodic measurement component 1130, a cell priority component 1135, and a trigger configuring component 1140. Each of these modules may communicate, directly or indirectly, with one another (e.g., via one or more buses).

The measurement reporting configuring component 1110 may transmit, to a UE, indicators of a configuration for measurement reporting. In some cases, the indicators of the configuration are transmitted by RRC signaling.

The cell measurement component 1115 may receive cell measurements for a set of neighboring cells from the UE based on the configuration. In some examples, the cell measurement component 1115 may receive measurements for one or more of an SSB or a CSI-RS for each cell of the set of neighboring cells.

The cell subset identifying component 1120 may identify a subset of the neighboring cells based on one or more of the configuration or the cell measurements. In some examples, the cell subset identifying component 1120 may configure the UE with one or more thresholds. In some examples, the cell subset identifying component 1120 may identify the subset of the neighboring cells based on the one or more thresholds.

In some examples, the cell subset identifying component 1120 may identify the subset of the neighboring cells based on a signal strength of the subset of the neighboring cells satisfying the one or more thresholds. In some examples, the cell subset identifying component 1120 may identify the subset of the neighboring cells based on a signal strength of the subset of the neighboring cells satisfying a first threshold and a signal strength of the base station satisfying a second threshold. In some examples, the cell subset identifying component 1120 may identify the subset of the neighboring cells based on a standard deviation of beam level quality satisfying the one or more thresholds.

In some examples, the cell subset identifying component 1120 may select the subset of the neighboring cells based on the cell measurements for the set of neighboring cells. In some examples, the cell subset identifying component 1120 may transmit an indicator that identifies the subset of the neighboring cells to the UE.

The beam measurement component 1125 may receive beam measurements for the subset of the neighboring cells from the UE based on the configuration. In some examples, the beam measurement component 1125 may configure a Level 3 filter at the UE by RRC signaling, where the beam measurements are filtered by the Level 3 filter.

The periodic measurement component 1130 may periodically receive the cell measurements for the set of neighboring cells. In some examples, the periodic measurement component 1130 may select the subset of the neighboring cells based on the cell measurements. In some examples, the periodic measurement component 1130 may transmit an indicator that identifies the subset of the neighboring cells.

The cell priority component 1135 may indicate an order for the subset of the neighboring cells based on one or more of a cell level quality or a cell load. In some cases, the beam measurements reported for the subset are based on the order of the subset.

The trigger configuring component 1140 may transmit a threshold to the UE. In some examples, the trigger configuring component 1140 may configure the UE with a trigger for reporting the cell measurements based on a difference between a neighbor cell signal quality and a serving cell signal quality satisfying the threshold. In some examples, the trigger configuring component 1140 may configure the UE with a trigger for reporting the cell measurements based on a neighbor cell signal quality satisfying the threshold. In some examples, the trigger configuring component 1140 may transmit one or more thresholds to the UE. In some examples, the trigger configuring component 1140 may configure the UE with a trigger for reporting the cell measurements based on a neighbor cell signal quality satisfying a first threshold and a serving cell signal quality satisfying a second threshold.

In some examples, the trigger configuring component 1140 may transmit a threshold to the UE. In some examples, the trigger configuring component 1140 may configure the UE with a trigger for reporting the cell measurements based on a neighbor cell signal quality not satisfying the threshold. In some examples, the trigger configuring component 1140 may remove a neighbor cell from the subset of neighboring cells based on the reported cell measurements.

In some examples, the trigger configuring component 1140 may transmit a threshold to the UE. In some examples, the trigger configuring component 1140 may configure the UE with a trigger for reporting the cell measurements based on a difference between a neighbor cell signal quality and a serving cell signal quality not satisfying the threshold. In some examples, the trigger configuring component 1140 may removing a neighbor cell from the subset of neighboring cells based on the reported cell measurements.

In some examples, the trigger configuring component 1140 may transmit one or more thresholds to the UE. In some examples, the trigger configuring component 1140 may configure the UE with a trigger for reporting the cell measurements based on a neighbor cell signal quality not satisfying a first threshold or a serving cell signal quality not satisfying a second threshold. In some examples, the trigger configuring component 1140 may remove a neighbor cell from the subset of neighboring cells based on the reported cell measurements.

Figure 12:
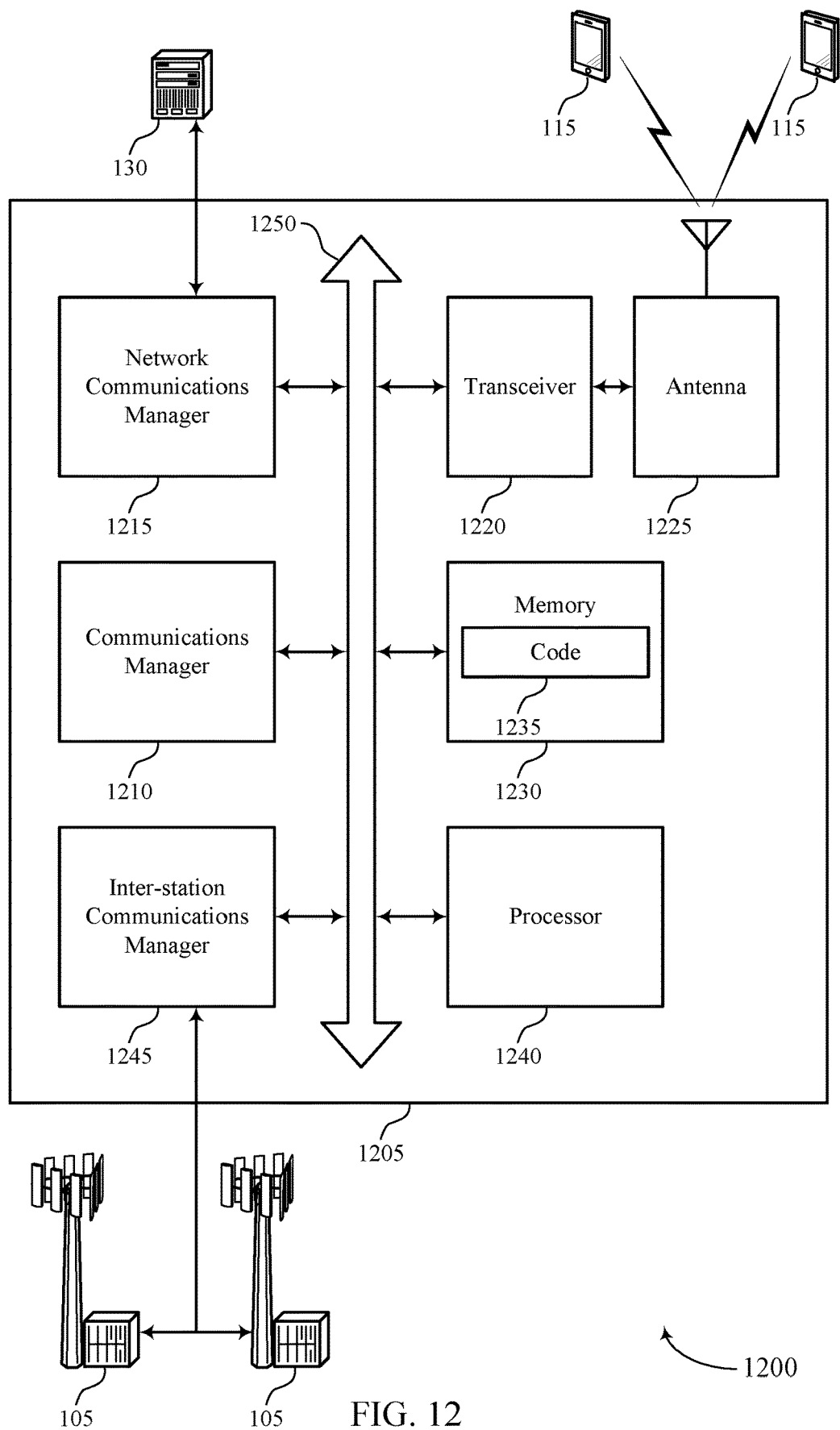
FIG. 12 shows a diagram of a system including a device that supports beam measurement for a cell subset in accordance with aspects of the present disclosure.

FIG. 12 shows a diagram of a system 1200 including a device 1205 that supports beam measurement for a cell subset in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may transmit, to a UE, indicators of a configuration for measurement reporting, receive cell measurements for a set of neighboring cells from the UE based on the configuration, identify a subset of the neighboring cells based on one or more of the configuration or the cell measurements, and receive beam measurements for the subset of the neighboring cells from the UE based on the configuration.

In some cases, the communications manager 1210 may transmit a control message, to a UE, indicating that a first group of reference signals is quasi co-located with a second group of reference signals for measurement reporting, transmit, to the UE, the first group of reference signals, the second group of reference signals, or both, and receive measurements for the first group of reference signals, measurements on the second group of reference signals, or group measurements for the first group of reference signals and the second group of reference signals based on the first group of reference signals being quasi co-located with the second group of reference signals.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting beam measurement for a cell subset).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
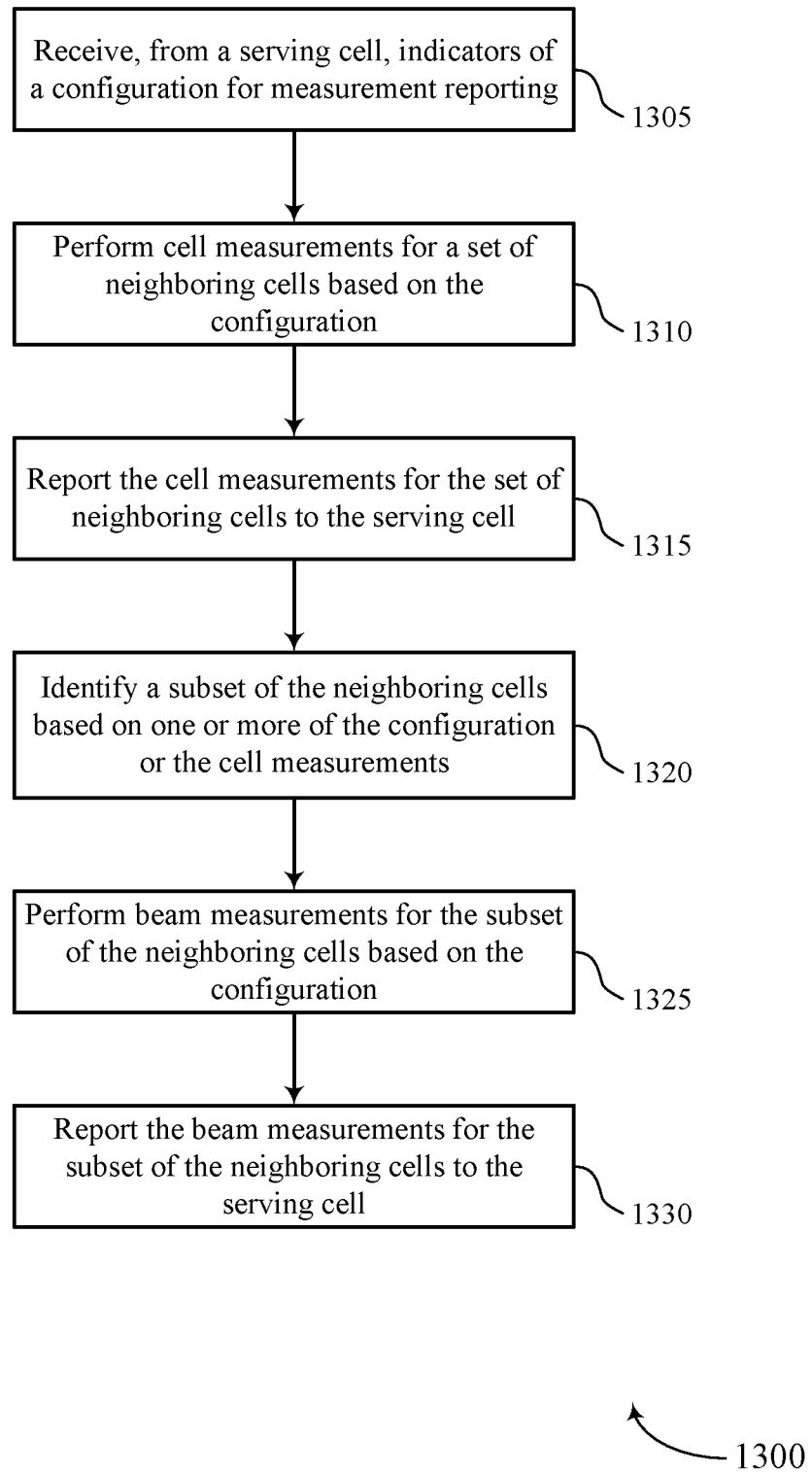
FIGS. 13 through 17 show flowcharts illustrating methods that support beam measurement for a cell subset in accordance with aspects of the present disclosure.

FIG. 13 shows a flowchart illustrating a method 1300 that supports beam measurement for a cell subset in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE 115 may receive, from a serving cell, indicators of a configuration for measurement reporting. The operations of 1305 may be performed according to the methods described herein. In some examples, aspects of the operations of 1305 may be performed by a measurement reporting configuration component as described with reference to FIGS. 5 through 8.

At 1310, the UE 115 may perform cell measurements for a set of neighboring cells based on the configuration. The operations of 1310 may be performed according to the methods described herein. In some examples, aspects of the operations of 1310 may be performed by a cell measurement component as described with reference to FIGS. 5 through 8.

At 1315, the UE 115 may report the cell measurements for the set of neighboring cells to the serving cell. The operations of 1315 may be performed according to the methods described herein. In some examples, aspects of the operations of 1315 may be performed by a cell measurement reporting component as described with reference to FIGS. 5 through 8.

At 1320, the UE 115 may identify a subset of the neighboring cells based on one or more of the configuration or the cell measurements. The operations of 1320 may be performed according to the methods described herein. In some examples, aspects of the operations of 1320 may be performed by a cell subset identifying component as described with reference to FIGS. 5 through 8.

At 1325, the UE 115 may perform beam measurements for the subset of the neighboring cells based on the configuration. The operations of 1325 may be performed according to the methods described herein. In some examples, aspects of the operations of 1325 may be performed by a beam measurement component as described with reference to FIGS. 5 through 8.

At 1330, the UE 115 may report the beam measurements for the subset of the neighboring cells to the serving cell. The operations of 1330 may be performed according to the methods described herein. In some examples, aspects of the operations of 1330 may be performed by a beam measurement reporting component as described with reference to FIGS. 5 through 8.

Figure 14:
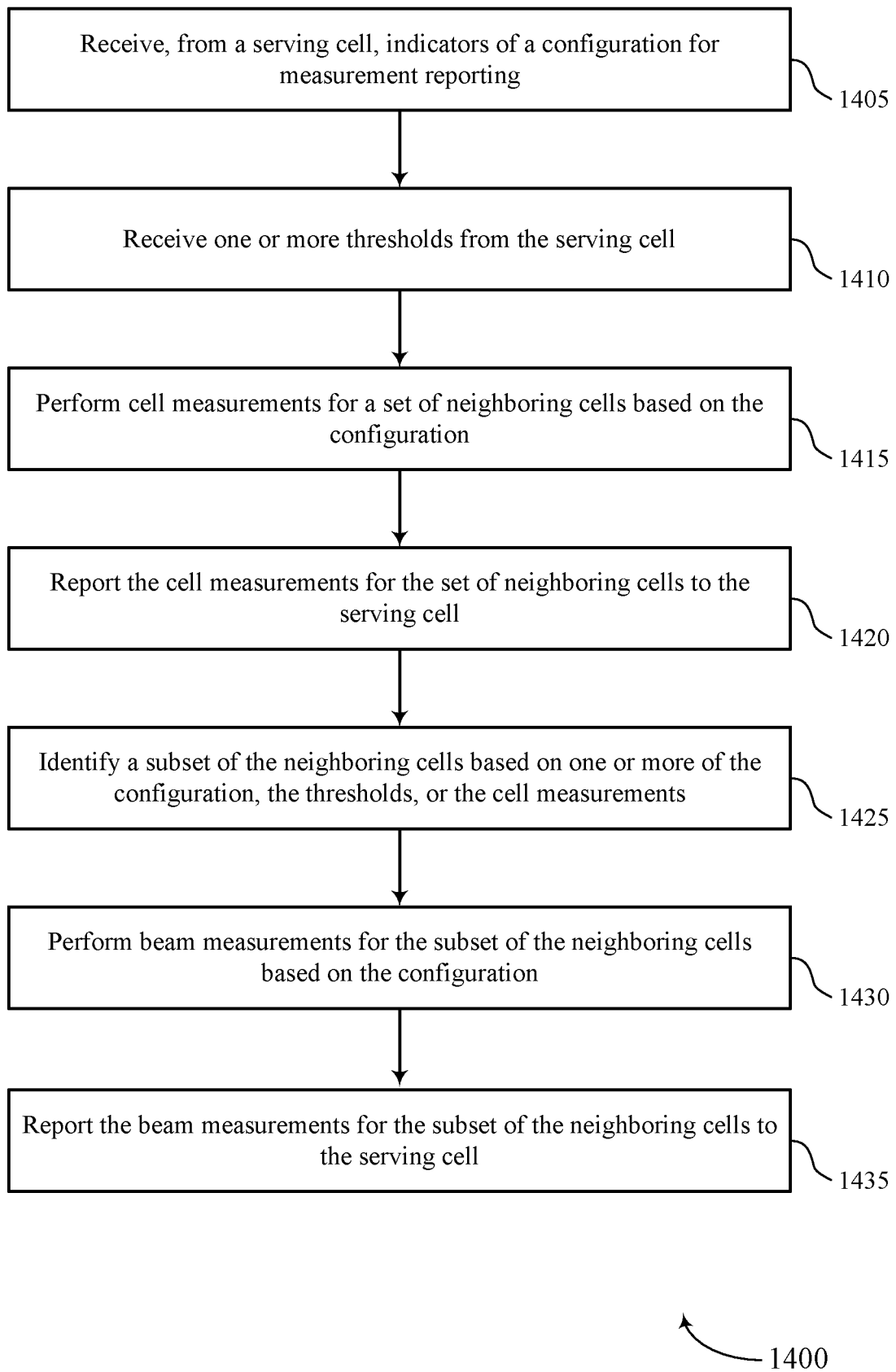

FIG. 14 shows a flowchart illustrating a method 1400 that supports beam measurement for a cell subset in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE 115 may receive, from a serving cell, indicators of a configuration for measurement reporting. The operations of 1405 may be performed according to the methods described herein. In some examples, aspects of the operations of 1405 may be performed by a measurement reporting configuration component as described with reference to FIGS. 5 through 8.

At 1410, the UE 115 may receive one or more thresholds from the serving cell. The operations of 1410 may be performed according to the methods described herein. In some examples, aspects of the operations of 1410 may be performed by a cell subset identifying component as described with reference to FIGS. 5 through 8.

At 1415, the UE 115 may perform cell measurements for a set of neighboring cells based on the configuration. The operations of 1415 may be performed according to the methods described herein. In some examples, aspects of the operations of 1415 may be performed by a cell measurement component as described with reference to FIGS. 5 through 8.

At 1420, the UE 115 may report the cell measurements for the set of neighboring cells to the serving cell. The operations of 1420 may be performed according to the methods described herein. In some examples, aspects of the operations of 1420 may be performed by a cell measurement reporting component as described with reference to FIGS. 5 through 8.

At 1425, the UE 115 may identify a subset of the neighboring cells based on one or more of the configuration, the thresholds, or the cell measurements. The operations of 1425 may be performed according to the methods described herein. In some examples, aspects of the operations of 1425 may be performed by a cell subset identifying component as described with reference to FIGS. 5 through 8.

At 1430, the UE 115 may perform beam measurements for the subset of the neighboring cells based on the configuration. The operations of 1430 may be performed according to the methods described herein. In some examples, aspects of the operations of 1430 may be performed by a beam measurement component as described with reference to FIGS. 5 through 8.

At 1435, the UE 115 may report the beam measurements for the subset of the neighboring cells to the serving cell. The operations of 1435 may be performed according to the methods described herein. In some examples, aspects of the operations of 1435 may be performed by a beam measurement reporting component as described with reference to FIGS. 5 through 8.

Figure 15:
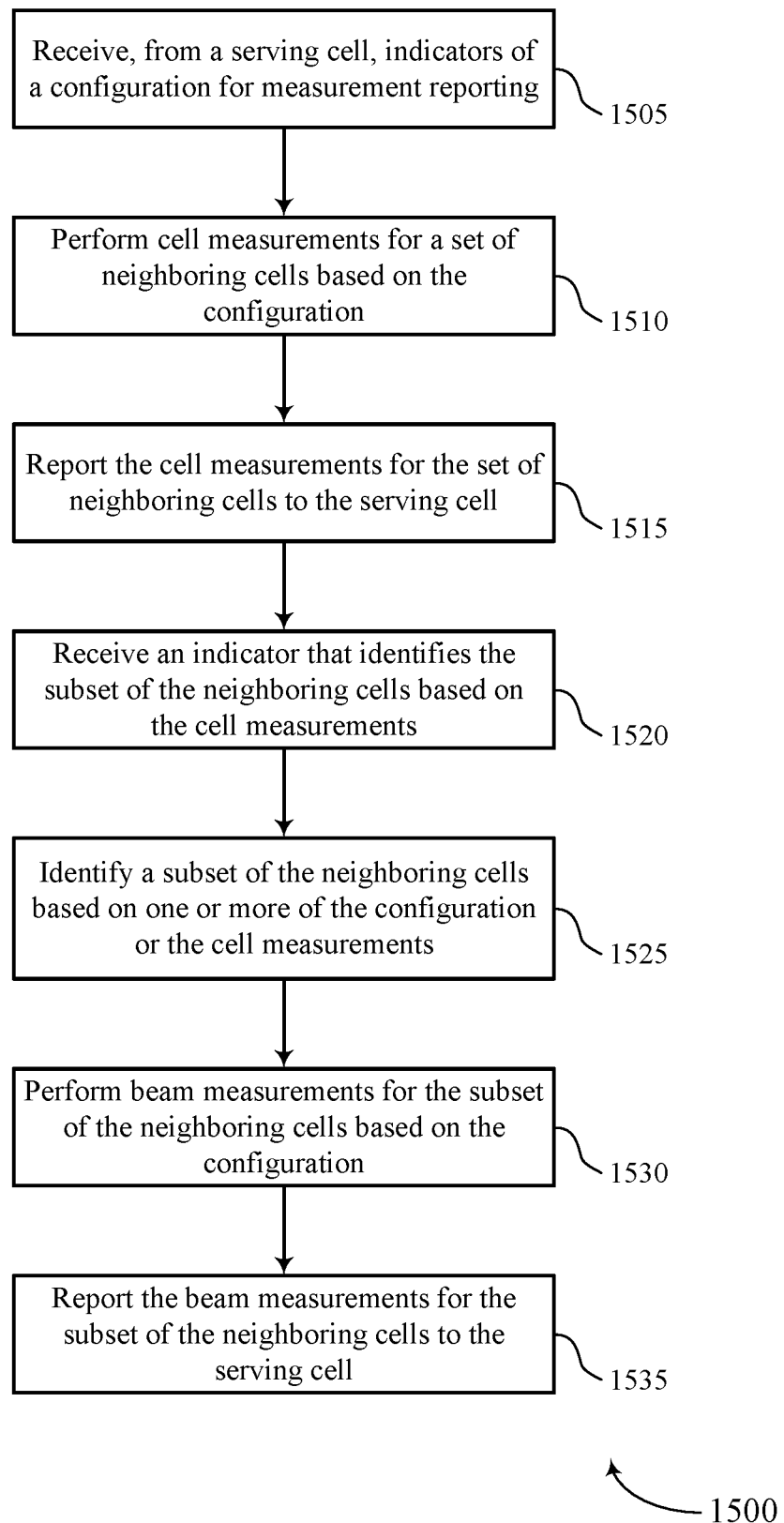

FIG. 15 shows a flowchart illustrating a method 1500 that supports beam measurement for a cell subset in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE 115 may receive, from a serving cell, indicators of a configuration for measurement reporting. The operations of 1505 may be performed according to the methods described herein. In some examples, aspects of the operations of 1505 may be performed by a measurement reporting configuration component as described with reference to FIGS. 5 through 8.

At 1510, the UE 115 may perform cell measurements for a set of neighboring cells based on the configuration. The operations of 1510 may be performed according to the methods described herein. In some examples, aspects of the operations of 1510 may be performed by a cell measurement component as described with reference to FIGS. 5 through 8.

At 1515, the UE 115 may report the cell measurements for the set of neighboring cells to the serving cell. The operations of 1515 may be performed according to the methods described herein. In some examples, aspects of the operations of 1515 may be performed by a cell measurement reporting component as described with reference to FIGS. 5 through 8.

At 1520, the UE 115 may receive an indicator that identifies the subset of the neighboring cells based on the cell measurements. The operations of 1520 may be performed according to the methods described herein. In some examples, aspects of the operations of 1520 may be performed by a cell subset identifying component as described with reference to FIGS. 5 through 8.

At 1525, the UE 115 may identify a subset of the neighboring cells based on one or more of the configuration or the cell measurements. In some cases, the UE may identify the subset of the neighboring cells based on the indicator that identifies the subset of the neighboring cells. The operations of 1525 may be performed according to the methods described herein. In some examples, aspects of the operations of 1525 may be performed by a cell subset identifying component as described with reference to FIGS. 5 through 8.

At 1530, the UE 115 may perform beam measurements for the subset of the neighboring cells based on the configuration. The operations of 1530 may be performed according to the methods described herein. In some examples, aspects of the operations of 1530 may be performed by a beam measurement component as described with reference to FIGS. 5 through 8.

At 1535, the UE 115 may report the beam measurements for the subset of the neighboring cells to the serving cell. The operations of 1535 may be performed according to the methods described herein. In some examples, aspects of the operations of 1535 may be performed by a beam measurement reporting component as described with reference to FIGS. 5 through 8.

Figure 16:
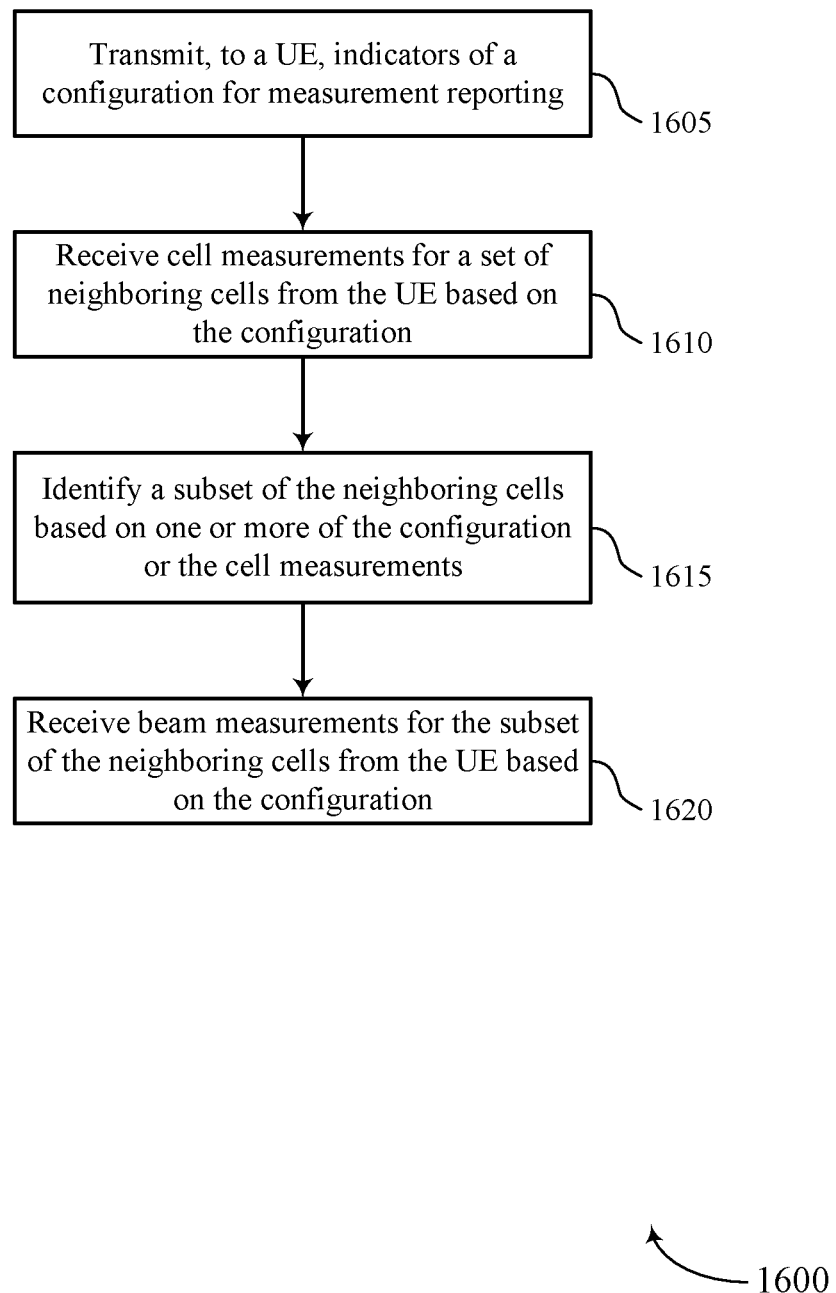

FIG. 16 shows a flowchart illustrating a method 1600 that supports beam measurement for a cell subset in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station 105 may transmit, to a UE 115, indicators of a configuration for measurement reporting. The operations of 1605 may be performed according to the methods described herein. In some examples, aspects of the operations of 1605 may be performed by a measurement reporting configuring component as described with reference to FIGS. 9 through 12.

At 1610, the base station 105 may receive cell measurements for a set of neighboring cells from the UE 115 based on the configuration. The operations of 1610 may be performed according to the methods described herein. In some examples, aspects of the operations of 1610 may be performed by a cell measurement component as described with reference to FIGS. 9 through 12.

At 1615, the base station 105 may identify a subset of the neighboring cells based on one or more of the configuration or the cell measurements. The operations of 1615 may be performed according to the methods described herein. In some examples, aspects of the operations of 1615 may be performed by a cell subset identifying component as described with reference to FIGS. 9 through 12.

At 1620, the base station 105 may receive beam measurements for the subset of the neighboring cells from the UE based on the configuration. The operations of 1620 may be performed according to the methods described herein. In some examples, aspects of the operations of 1620 may be performed by a beam measurement component as described with reference to FIGS. 9 through 12.

Figure 17:
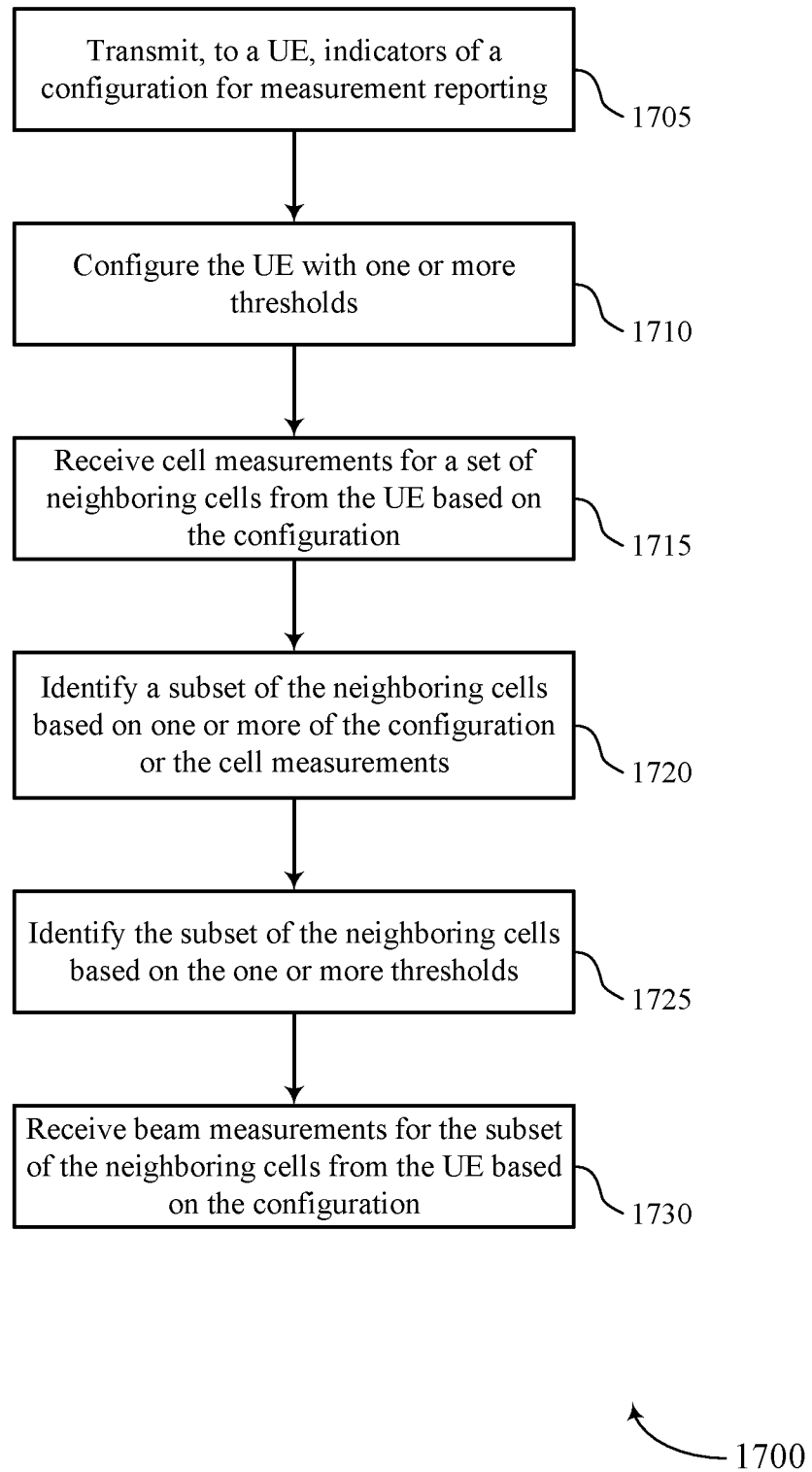

FIG. 17 shows a flowchart illustrating a method 1700 that supports beam measurement for a cell subset in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station 105 may transmit, to a UE 115, indicators of a configuration for measurement reporting. The operations of 1705 may be performed according to the methods described herein. In some examples, aspects of the operations of 1705 may be performed by a measurement reporting configuring component as described with reference to FIGS. 9 through 12.

At 1710, the base station 105 may configure the UE 115 with one or more thresholds. The operations of 1710 may be performed according to the methods described herein. In some examples, aspects of the operations of 1710 may be performed by a cell subset identifying component as described with reference to FIGS. 9 through 12.

At 1715, the base station 105 may receive cell measurements for a set of neighboring cells from the UE 115 based on the configuration. The operations of 1715 may be performed according to the methods described herein. In some examples, aspects of the operations of 1715 may be performed by a cell measurement component as described with reference to FIGS. 9 through 12.

At 1720, the base station 105 may identify a subset of the neighboring cells based on one or more of the configuration or the cell measurements. The operations of 1720 may be performed according to the methods described herein. In some examples, aspects of the operations of 1720 may be performed by a cell subset identifying component as described with reference to FIGS. 9 through 12.

At 1725, the base station 105 may identify the subset of the neighboring cells based on the one or more thresholds. The operations of 1725 may be performed according to the methods described herein. In some examples, aspects of the operations of 1725 may be performed by a cell subset identifying component as described with reference to FIGS. 9 through 12.

At 1730, the base station 105 may receive beam measurements for the subset of the neighboring cells from the UE based on the configuration. The operations of 1730 may be performed according to the methods described herein. In some examples, aspects of the operations of 1730 may be performed by a beam measurement component as described with reference to FIGS. 9 through 12.

Figure 18:
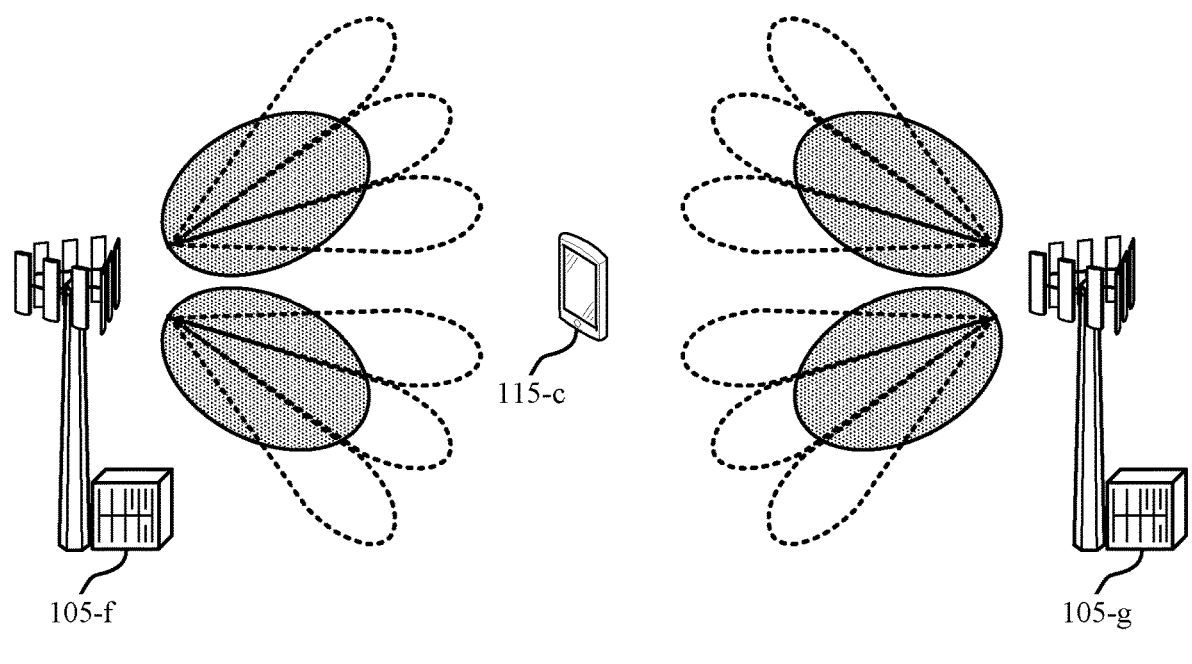
FIG. 18 illustrates an example of a wireless communications system that supports beam measurement for a cell subset in accordance with aspects of the present disclosure.
Figure 18:
Figure 18:
Figure 18:

FIG. 18 illustrates an example of a wireless communications system 1800 that supports beam measurement for a cell subset in accordance with aspects of the present disclosure. Wireless communications system 1800 includes base station 105-f and base station 105-g, which may be examples of a base station 105 described with reference to FIG. 1. Wireless communications system 1800 also includes UE 115-c, which may be an example of a UE 115 described with reference to FIG. 1. Base station 105-f may be an example of a source base station 105 and may transmit reference signals (e.g., SSBs 1805 and CSI-RSs 1810) which may be received by UE 115-c, and base station 105-g may be an example of a neighbor base station 105 and may also transmit reference signals (e.g., SSBs 1805 and CSI-RSs 1810) which may be received by UE 115-c. Wireless communications system 1800 may implement aspects of wireless communications system 100. For example, wireless communications system 1800 may support efficient techniques for reducing the overhead associated with performing measurements on reference signals and reporting the measurements to a source base station 105.

In the example of FIG. 18, base station 105-f may transmit a QCL configuration for measurement reporting (e.g., in RRC signaling) to UE 115-c, and UE 115-c may perform and report measurements to base station 105-f based on the QCL configuration for measurement reporting. In some cases, the QCL configuration for measurement reporting may be associated with a QCL type (e.g., QCL type E) and may be used to indicate which groups of reference signals received by UE 115-c are quasi co-located for measurement reporting (or which antenna ports used to transmit the groups of reference signals are quasi co-located). Accordingly, UE 115-c may perform and report measurements for a subset of the groups of reference signals received from multiple base stations 105, or the UE 115-c may perform group measurements for the quasi co-located groups of reference signals received from multiple base stations 105. That is, the UE 115-c may be configured to skip performing and reporting redundant or similar measurements (e.g., for one or more measurement quantities, such as RSRP, RSRQ, and SINR) to base station 105-f, resulting in reduced overhead.

In one aspect, the QCL configuration for measurement reporting may indicate that groups of reference signals transmitted by base station 105-f and base station 105-g (e.g., across serving frequencies) are quasi co-located for measurement reporting. In this aspect, the QCL configuration for measurement reporting may indicate a PCI of the source base station 105-f, a PCI of the target base station 105-g, a bandwidth part (BWP) used to transmit the reference signals, the measurement quantities (e.g., RSRP, RSRQ, or SINR) associated with the QCL configuration (i.e., which measurement quantities for reference signals received from base station 105-g can be inferred from reference signals received from base station 105-f), a reference signal type (e.g., SSB or CSI-RS) associated with the QCL configuration (i.e., the type of reference signals that are quasi co-located), and an indication of whether the reference signals are quasi co-located for cell measurements or beam measurements. Once the UE 115-c receives the QCL configuration indicating that reference signals transmitted by base station 105-f and base station 105-g are quasi co-located for measurement reporting, the UE 115-c may perform and report measurements based on the QCL configuration.

In particular, the UE 115-c may perform and report measurements for reference signals received from base station 105-f and avoid performing and reporting measurements for reference signals received from base station 105-g if antennas or antenna ports for base station 105-f and 105-g are quasi co-located (e.g., since the measurements for reference signals received from base station 105-g may be inferred from the measurements for reference signals received from base station 105-f). Similarly, if cells corresponding to the same base station 105 are quasi co-located, even if they use different frequencies, the UE 115-c may only perform measurements for one of the cells since measurements for other cells may be inferred from measurements for that one cell. In the event that the UE 115 is configured to perform beam measurements, the QCL configuration for measurement reporting may also indicate the indexes of beams at the source base station 105-f and the indexes of beams at the target base station 105-g that are quasi co-located. In this case, the UE 115-c may perform and report the beam measurements for reference signals transmitted by base station 105-f on beams with indexes indicated in the QCL configuration, and the UE 115-c may avoid performing and reporting beam measurements for reference signals transmitted by base station 105-g on beams with the indexes indicated in the QCL configuration for base station 105-g.

In another aspect, the QCL configuration for measurement reporting may indicate that an SSB 1805 is quasi co-located with a set of CSI-RSs 1810 for measurement reporting (e.g., since an SSB used to determine coarse beam measurements may overlap CSI-RSs used to determine finer beam measurements, as illustrated). In this aspect, the QCL configuration for measurement reporting may indicate an index of the SSB, a list of indexes for the set of CSI-RSs, and the measurement quantities (e.g., RSRP, RSRQ, or SINR) associated with the QCL configuration (i.e., which measurement quantities for the CSI-RSs 1810 received from base station 105-$f$ can be inferred from the SSB 1805 received from base station 105-$f$). For instance, the QCL configuration may indicate that an SSB with index 1 is quasi co-located with CSI-RSs with indexes 1, 2, and 3 for RSRP reporting. Thus, once the UE 115-$c$ receives the QCL configuration indicating that the SSB and the CSI-RSs are quasi co-located for measurement reporting, the UE 115-$c$ may perform and report measurements based on the QCL configuration.

In particular, the UE 115-$c$ may perform and report measurements for the indicated SSB 1805 received from base station 105-$f$ and avoid performing and reporting measurements for the indicated CSI-RSs received from base station 105-$g$ (e.g., since the measurements for the CSI-RSs may be inferred from the measurements for the SSB). In some instances, UE 115-$c$ may be configured to additionally measure and report beam-level measurements of the CSI-RSs that are quasi co-located with the SSB, if appropriate (i.e., the QCL configuration may be overridden). Further, if UE 115-$c$ fails to detect the SSB 1805, UE 115-$c$ may perform and report measurements for one or more of the CSI-RSs 1810 that are quasi co-located with the SSB 1805. In some examples, if UE 115-$c$ fails to detect the SSB 1805, UE 115-$c$ may identify and report an index of the strongest CSI-RS of the CSI-RSs 1810 that are quasi co-located with the SSB 1805 (e.g., the CSI-RSs associated with the highest RSRQ). In other examples, if UE 115-$c$ fails to detect the SSB 1805, UE 115-$c$ may identify and report a linear power average of the CSI-RSs 1810 that are quasi co-located with the SSB 1805. In yet other examples, if UE 115-$c$ fails to detect the SSB 1805, UE 115-$c$ may perform and report measurements for each of the CSI-RSs 1810 that are quasi co-located with the SSB 1805 (e.g., based on the measurement quantities indicated in the QCL configuration).

In yet another aspect, the QCL configuration for measurement reporting may indicate that a first SSB 1805 or a first set of CSI-RSs is quasi co-located with a second SSB or a second set of CSI-RSs 1810 for measurement reporting (e.g., since the beam resolution determined from measurements performed for all SSBs and CSI-RSs may be too fine). In this aspect, the QCL configuration for measurement reporting may indicate indexes of the SSBs, lists of indexes for the sets of CSI-RSs, and the measurement quantities (e.g., RSRP, RSRQ, or SINR) associated with the QCL configuration (i.e., which measurement quantities for one group of SSBs 1805 or CSI-RSs 1810 received from a base station can be inferred from another group of SSBs 1805 or CSI-RSs 1810 received from the base station). Thus, once the UE 115-$c$ receives the QCL configuration indicating that the groups of SSBs or CSI-RSs are quasi co-located for measurement reporting, the UE 115-$c$ may perform and report measurements based on the QCL configuration.

In particular, the UE 115-$c$ may perform group measurements for all reference signals that are quasi co-located (e.g., for a QCL group of reference signals). That is, UE 115-$c$ may identify the SSBs and CSI-RSs that are quasi co-located (i.e., the QCL group) based on the QCL configuration, and UE 115-$c$ may perform and report group measurements for the QCL group (e.g., using techniques similar to the techniques used to derive a cell quality based on multiple reference signals). As an example, the UE 115-$c$ may determine the highest quality of reference signals in the QCL group, and the UE 115-$c$ may report the highest quality to base station 105-$f$. Alternatively, the UE 115-$c$ may determine a linear average of the highest qualities of the reference signals in the QCL group (e.g., the qualities above a configured threshold), and the UE 115-$c$ may report the linear average to base station 105-$f$. In some cases, if there are multiple QCL groups of reference signals (e.g., indicated by the QCL configuration), base station 105-$f$ may configure UE 115-$c$ to perform and report measurements for all or a subset of the QCL groups (e.g., via RRC signaling, MAC control element (MAC-CE) signaling, or downlink control information (DCI) signaling). Further, in some instances, UE 115-$c$ may be configured to additionally measure and report beam-level measurements for each SSB or CSI-RS in a QCL group, if appropriate (e.g., the QCL configuration may be overridden).

Figure 19:
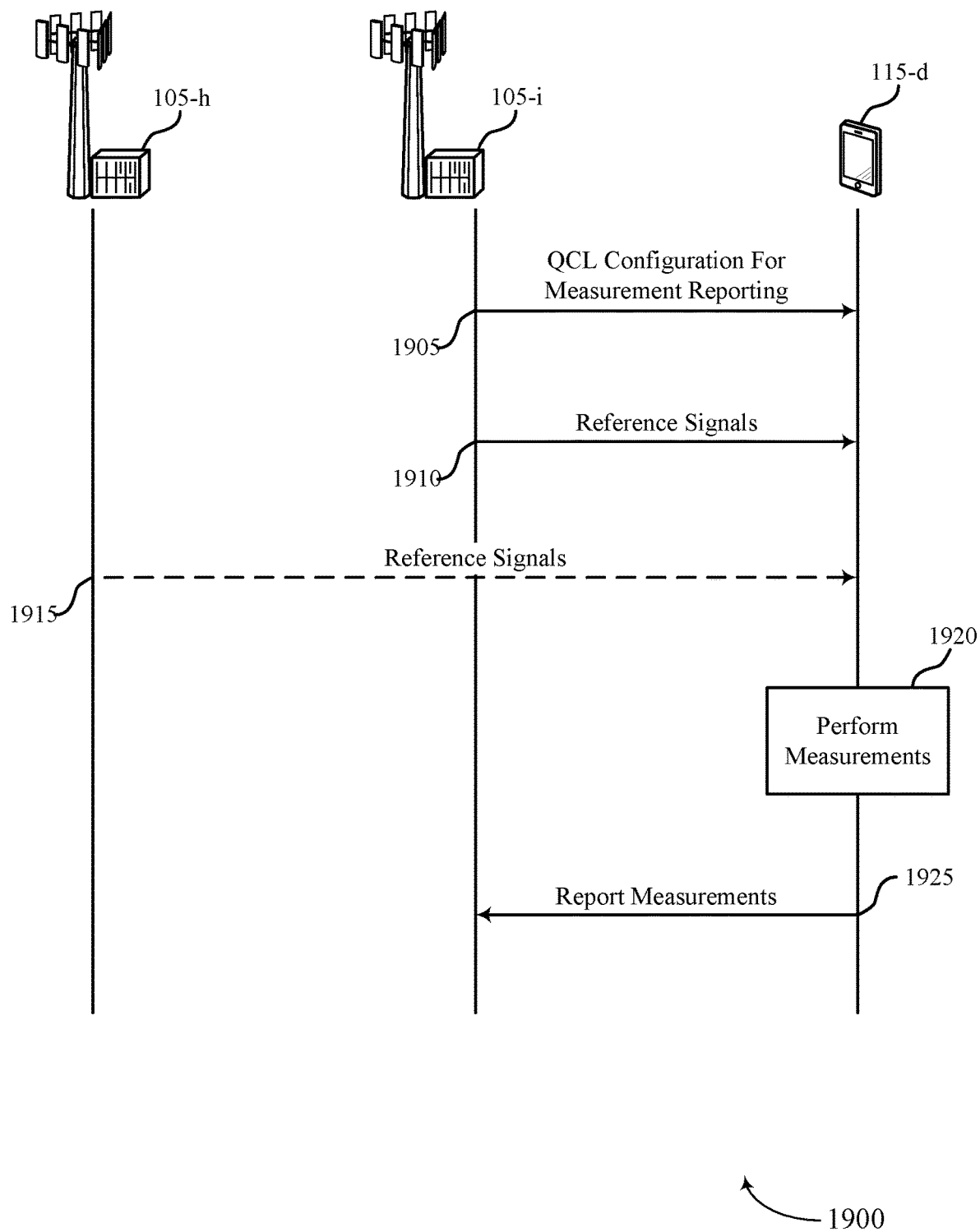
FIG. 19 illustrates an example of a process flow that supports beam measurement for a cell subset in accordance with aspects of the present disclosure.

FIG. 19 illustrates an example of a process flow 1900 that supports beam measurement for a cell subset in accordance with aspects of the present disclosure. Process flow 1900 illustrates aspects of techniques performed by a base station 105-$h$ and a base station 105-$i$, which may be examples of a base station 105 described with reference to FIGS. 1-3. Process flow 1900 also illustrates aspects of techniques performed by a UE 115-$d$, which may be an example of a UE 115 described with reference to FIGS. 1-3.

At 1905, base station 105-$h$ (e.g., a primary serving cell) may transmit a control message (e.g., an RRC message) indicating a QCL configuration for measurement reporting. In particular, the control message may indicate which groups of reference signals to be transmitted to UE 115-$d$ are quasi co-located (or which antenna ports used to transmit the reference signals are quasi co-located). At 1910, base station 105-$h$ may then transmit one or more groups of reference signals to UE 115-$d$, and, at 1915, base station 105-$h$ may transmit one or more groups of reference signals to UE 115-$d$. UE 115-$d$ may receive the groups of reference signals from base station 105-$h$ and/or base station 105-$i$, and, at 1920, UE 115-$d$ may perform measurements on the reference signals based on the QCL configuration. At 1925, UE 115-$d$ may then report the measurements to base station 105-$h$.

In some aspects, UE 115-$h$ may receive a first group of reference signals and a second group of reference signals, and the control message may indicate that the first group of reference signals is quasi co-located with the second group of reference signals for measurement reporting. Thus, UE 115-$h$ may use the techniques described herein to perform and report measurements for either the first group of measurements or the second group of measurements, or to perform and report group measurements for the first and second groups of measurements, such that the overhead associated with performing and reporting measurements may be reduced.

In one aspect, UE 115-$d$ may receive the first group of reference signals from base station 105-$h$ and the second group of reference signals from base station 105-$i$, and UE 115-$h$ may perform and report measurements (e.g., cell or beam measurements) for the first group of reference signals (e.g., where measurements for the second group of reference signals may be indicated by the measurements for the first group of measurements). In another aspect, the first group of reference signals may include an SSB (e.g., received from base station 105-$h$), and the second group of reference signals may include a set of CSI-RSs (e.g., also received from base station 105-$h$). In this aspect, UE 115-$d$ may perform and report measurements for the SSB (e.g., where measurements for the CSI-RSs may be indicated by the measurements for the SSB). In yet another aspect, the first group of reference signals may include a first SSB or a first set of CSI-RSs and the second group of reference signals may include a second SSB or a second set of CSI-RSs, and the first and second groups of reference signals may form a QCL group of reference signals. In this aspect, UE 115-d may perform and report group measurements for reference signals in the QCL group.

Figure 20:
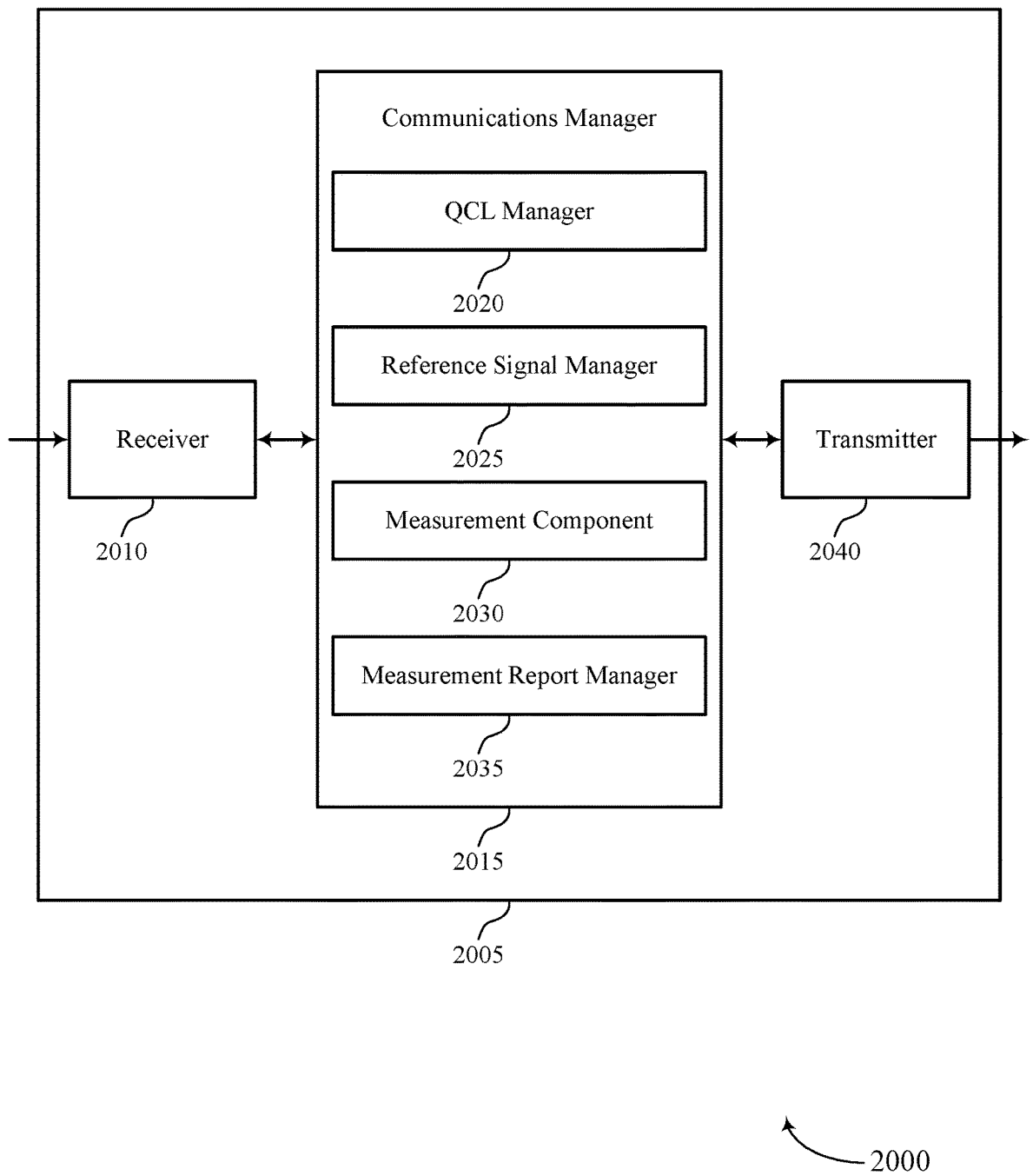
FIG. 20 shows a block diagram of a device that supports beam measurement for a cell subset in accordance with aspects of the present disclosure.

FIG. 20 shows a block diagram 2000 of a device 2005 that supports beam measurement for a cell subset in accordance with aspects of the present disclosure. The device 2005 may be an example of aspects of a device 505, or a UE 115 as described herein. The device 2005 may include a receiver 2010, a communications manager 2015, and a transmitter 2040. The device 2005 may also include a processor. Each of these components may be in communication with one another (e.g., via one or more buses).

The receiver 2010 may receive information such as packets, user data, or control information associated with various information channels (e.g., control channels, data channels, and information related to beam measurement for a cell subset, quasi co-located reference signals for measurement reporting, etc.). Information may be passed on to other components of the device 2005. The receiver 2010 may be an example of aspects of the transceiver 820 described with reference to FIG. 8. The receiver 2010 may utilize a single antenna or a set of antennas.

The communications manager 2015 may be an example of aspects of the communications manager 515 as described herein. The communications manager 2015 may include a QCL manager 2020, a reference signal manager 2025, a measurement component 2030, and a measurement report manager 2035. The communications manager 2015 may be an example of aspects of the communications manager 810 described herein.

The QCL manager 2020 may receive a control message indicating that a first group of reference signals is quasi co-located with a second group of reference signals for measurement reporting. The reference signal manager 2025 may receive the first group of reference signals and the second group of reference signals. The measurement component 2030 may perform measurements on the first group of reference signals, or the second group of reference signals, or both based on the first group of reference signals being quasi co-located with the second group of reference signals. The measurement report manager 2035 may report measurements on the first group of reference signals, or measurements on the second group of reference signals, or group measurements on the first group of reference signals and the second group of reference signals based on the first group of reference signals being quasi co-located with the second group of reference signals.

The transmitter 2040 may transmit signals generated by other components of the device 2005. In some examples, the transmitter 2040 may be collocated with a receiver 2010 in a transceiver module. For example, the transmitter 2040 may be an example of aspects of the transceiver 820 described with reference to FIG. 8. The transmitter 2040 may utilize a single antenna or a set of antennas.

Figure 21:
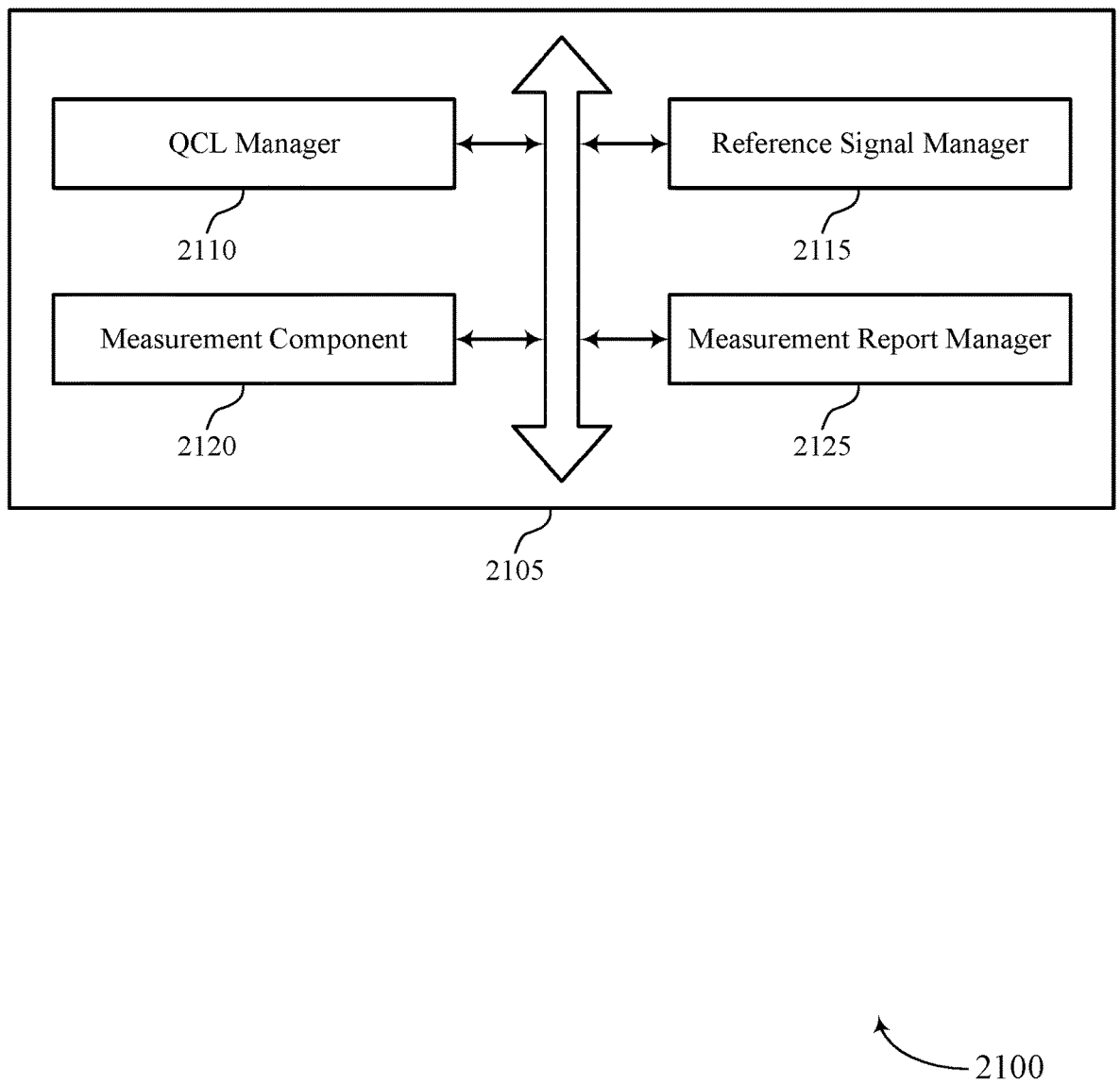
FIG. 21 illustrates an example of a process flow that supports beam measurement for a cell subset in accordance with aspects of the present disclosure.

FIG. 21 shows a block diagram 2100 of a communications manager 2105 that supports beam measurement for a cell subset in accordance with aspects of the present disclosure. The communications manager 2105 may be an example of aspects of a communications manager 515, a communications manager 2015, or a communications manager 810 described herein. The communications manager 2105 may include a QCL manager 2110, a reference signal manager 2115, a measurement component 2120, and a measurement report manager 2125. Each of these modules may communicate, directly or indirectly, with one another (e.g., via one or more buses).

The QCL manager 2110 may receive a control message indicating that a first group of reference signals is quasi co-located with a second group of reference signals for measurement reporting. In some examples, the QCL manager 2110 may identify a set of QCL groups of reference signals. In some examples, the QCL manager 2110 may receive an indication of a subset of the QCL groups for which to perform and report measurements. In some cases, the control message indicates a first PCI of the first serving cell, a second PCI of the second serving cell, a BWP used to transmit the first and second groups of reference signals, measurement quantities for the measurement reporting, a type of reference signals on which to perform measurements, whether to perform and report cell measurements or beam measurements, or indexes of beams used to transmit the first and second groups of reference signals. In some cases, the first serving cell and the second serving cell are configured to transmit on different frequencies.

In some cases, the measurement quantities for measurement reporting include RSRP, RSRQ, or SINR. In some cases, the control message indicates an index of the SSB, a list of indexes of the CSI-RSs, and measurement quantities for the measurement reporting. In some cases, the control message includes an RRC message. The reference signal manager 2115 may receive the first group of reference signals and the second group of reference signals. In some examples, the reference signal manager 2115 may receive the first group of reference signals from a first serving cell and the second group of reference signals from a second serving cell. In some cases, the first group of reference signals includes a SSB and the second group of reference signals includes CSI-RSs.

In some cases, the first group of reference signals includes a first SSB or a first set of CSI-RSs and the second group of reference signals includes a second SSB or a second set of CSI-RSs, the first group of reference signals and the second group of reference signals forming a QCL group of reference signals. In some cases, each of the first group of reference signals and the second group of reference signals includes one or more reference signals. The measurement component 2120 may perform measurements on the first group of reference signals, or the second group of reference signals, or both based on the first group of reference signals being quasi co-located with the second group of reference signals. In some examples, the measurement component 2120 may perform measurements on the first group of reference signals.

In some examples, the measurement component 2120 may perform cell measurements or beam measurements on the first group of reference signals in accordance with the control message. In some examples, the measurement component 2120 may perform measurements on the SSB. In some examples, the measurement component 2120 may fail to detect the SSB. In some examples, the measurement component 2120 may identify a CSI-RS of the CSI-RSs associated with a highest quality. In some examples, the measurement component 2120 may determine a linear average power of the CSI-RSs. In some examples, the measurement component 2120 may perform group measurements on reference signals in the QCL group. In some cases, the beam measurements are filtered by RRC configured L3 filters. In some cases, the cell measurements are filtered by RRC configured L3 filters.

The measurement report manager 2125 may report measurements on the first group of reference signals, or measurements on the second group of reference signals, or group measurements on the first group of reference signals and the second group of reference signals based on the first group of reference signals being quasi co-located with the second group of reference signals. In some examples, the measurement report manager 2125 may report measurements for the first group of reference signals, where measurements for the second group of reference signals are indicated by the reported measurements for the first group of reference signals based on the first group of reference signals being quasi co-located with the second group of reference signals.

In some examples, the measurement report manager 2125 may report measurements for the SSB, where measurements for the CSI-RSs are indicated by the reported measurements for the SSB based on the SSB being quasi co-located with the CSI-RSs. In some examples, the measurement component 2120 may perform measurements for one or more of the CSI-RSs, and the measurement report manager 2125 may report the measurements for the one or more of the CSI-RSs. In some examples, the measurement report manager 2125 may transmit an indication of the CSI-RS associated with the highest quality. In some examples, the measurement report manager 2125 may transmit an indication of the linear average power of the CSI-RSs. In some examples, the measurement component 2120 may perform measurements for each of the CSI-RSs, and the measurement report manager 2125 may report the measurements for each of the CSI-RSs. In some examples, the measurement report manager 2125 may report the group measurements for reference signals in the QCL group. In some examples, the measurement component 2120 may perform measurements for each QCL group of the subset of the QCL groups, and the measurement report manager 2125 may report the group measurements for each QCL group of the subset of the QCL groups.

Figure 22:
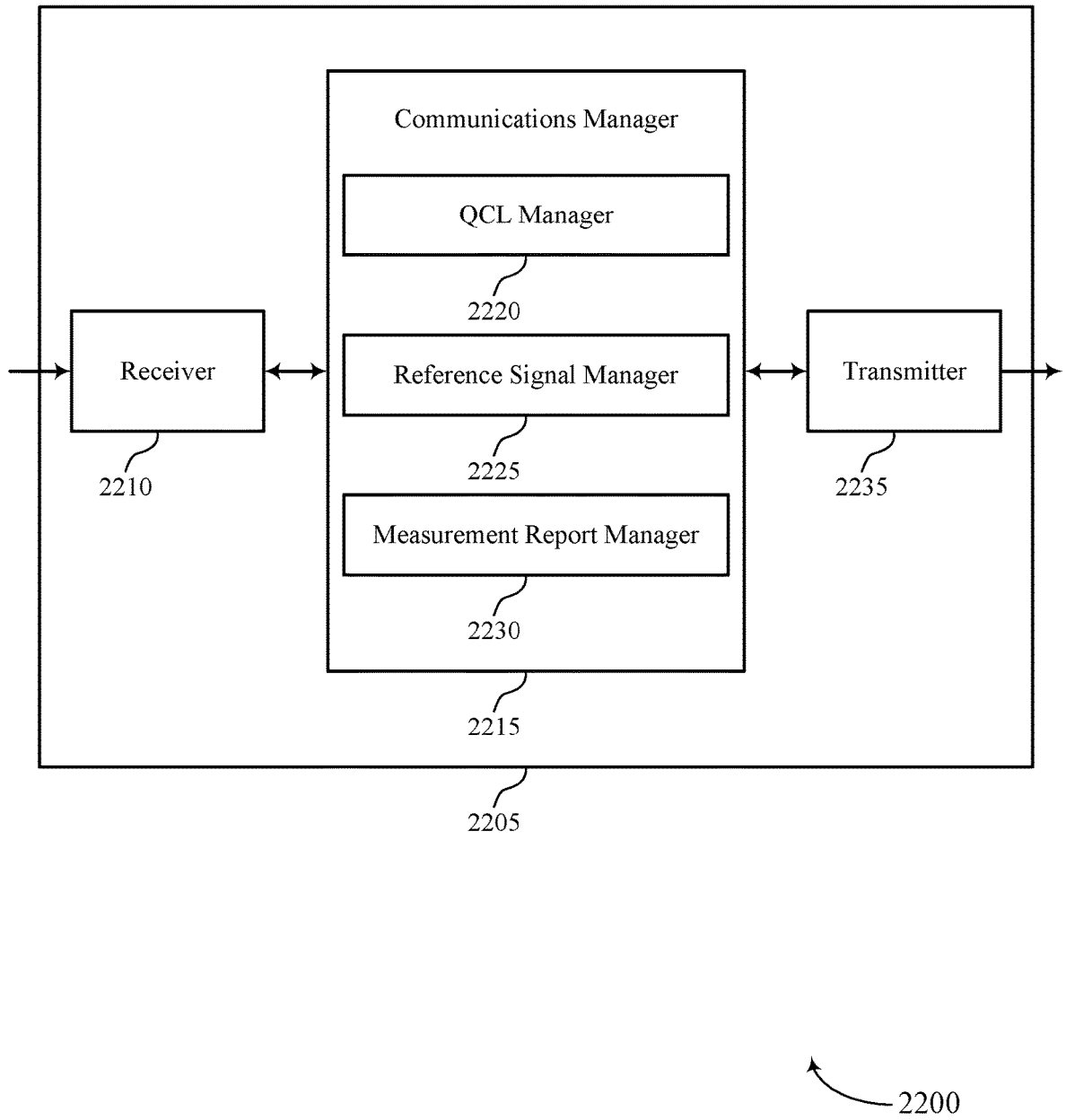
FIG. 22 shows a block diagram of a device that supports beam measurement for a cell subset in accordance with aspects of the present disclosure.

FIG. 22 shows a block diagram 2200 of a device 2205 that supports beam measurement for a cell subset in accordance with aspects of the present disclosure. The device 2205 may be an example of aspects of a device 905, or a base station 105 as described herein. The device 2205 may include a receiver 2210, a communications manager 2215, and a transmitter 2235. The device 2205 may also include a processor. Each of these components may be in communication with one another (e.g., via one or more buses).

The receiver 2210 may receive information such as packets, user data, or control information associated with various information channels (e.g., control channels, data channels, and information related to beam measurement for a cell subset, etc.). Information may be passed on to other components of the device 2205. The receiver 2210 may be an example of aspects of the transceiver 1220 described with reference to FIG. 12. The receiver 2210 may utilize a single antenna or a set of antennas.

The communications manager 2215 may be an example of aspects of the communications manager 915 as described herein. The communications manager 2215 may include a QCL manager 2220, a reference signal manager 2225, and a measurement report manager 2230. The communications manager 2215 may be an example of aspects of the communications manager 1210 described herein.

The QCL manager 2220 may transmit a control message, to a UE, indicating that a first group of reference signals is quasi co-located with a second group of reference signals for measurement reporting. The reference signal manager 2225 may transmit, to the UE, the first group of reference signals, the second group of reference signals, or both. The measurement report manager 2230 may receive measurements for the first group of reference signals, or measurements on the second group of reference signals, or group measurements for the first group of reference signals and the second group of reference signals based on the first group of reference signals being quasi co-located with the second group of reference signals.

The transmitter 2235 may transmit signals generated by other components of the device 2205. In some examples, the transmitter 2235 may be collocated with a receiver 2210 in a transceiver module. For example, the transmitter 2235 may be an example of aspects of the transceiver 1220 described with reference to FIG. 12. The transmitter 2235 may utilize a single antenna or a set of antennas.

Figure 23:
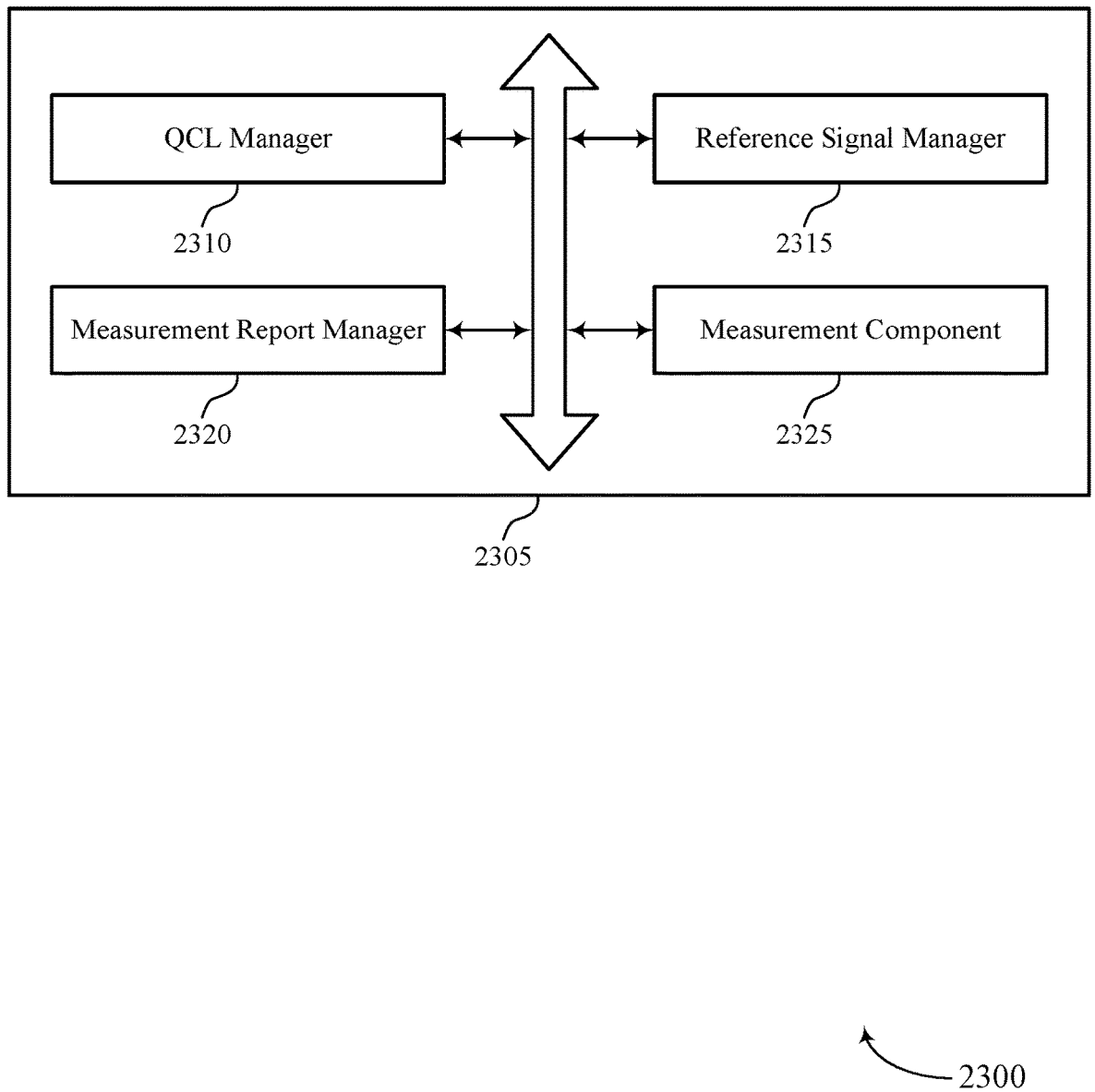
FIG. 23 shows a block diagram of a communications manager that supports beam measurement for a cell subset in accordance with aspects of the present disclosure.

FIG. 23 shows a block diagram 2300 of a communications manager 2305 that supports beam measurement for a cell subset in accordance with aspects of the present disclosure. The communications manager 2305 may be an example of aspects of a communications manager 915, a communications manager 1015, or a communications manager 1210 described herein. The communications manager 2305 may include a QCL manager 2310, a reference signal manager 2315, a measurement report manager 2320, and a measurement component 2325. Each of these modules may communicate, directly or indirectly, with one another (e.g., via one or more buses).

The QCL manager 2310 may transmit a control message, to a UE, indicating that a first group of reference signals is quasi co-located with a second group of reference signals for measurement reporting. In some cases, the control message indicates a first physical cell identifier (PCI) of the first serving cell, a second PCI of the second serving cell, a bandwidth part (BWP) used to transmit the first and second groups of reference signals, measurement quantities for the measurement reporting, a type of reference signals on which to perform measurements, whether to perform and report cell measurements or beam measurements, or indexes of beams used to transmit the first and second groups of reference signals. In some cases, the measurement quantities for measurement reporting include RSRP, RSRQ, or SINR. In some cases, the control message indicates an index of the SSB, a list of indexes of the CSI-RSs, and measurement quantities for the measurement reporting. In some cases, the control message includes a RRC message.

The reference signal manager 2315 may transmit, to the UE, the first group of reference signals, the second group of reference signals, or both. In some cases, the first group of reference signals is transmitted by a first serving cell and the second group of reference signals is transmitted by a second serving cell. In some cases, the first group of reference signals includes a SSB, and the second group of reference signals includes CSI-RSs. In some cases, the first group of reference signals includes a first SSB or a first set of CSI-RSs and the second group of reference signals includes a second SSB or a second set of CSI-RSs, the first group of reference signals and the second group of reference signals forming a QCL group of reference signals. In some cases, each of the first group of reference signals and the second group of reference signals includes one or more reference signals.

The measurement report manager 2320 may receive measurements for the first group of reference signals, or measurements on the second group of reference signals, or group measurements for the first group of reference signals and the second group of reference signals based on the first group of reference signals being quasi co-located with the second group of reference signals. In some examples, the measurement report manager 2320 may receive measurements for the first group of reference signals. In some examples, the measurement report manager 2320 may receive measurements for the SSB. In some examples, the measurement report manager 2320 may receive group measurements for reference signals in the QCL group.

The measurement component 2325 may determine that measurements for the second group of reference signals are indicated by the measurements for the first group of reference signals based on the first group of reference signals being quasi co-located with the second group of reference signals. In some examples, the measurement component 2325 may determine that measurements for the CSI-RSs are indicated by the measurements for the SSB based on the SSB being quasi co-located with the CSI-RSs.

Figure 24:
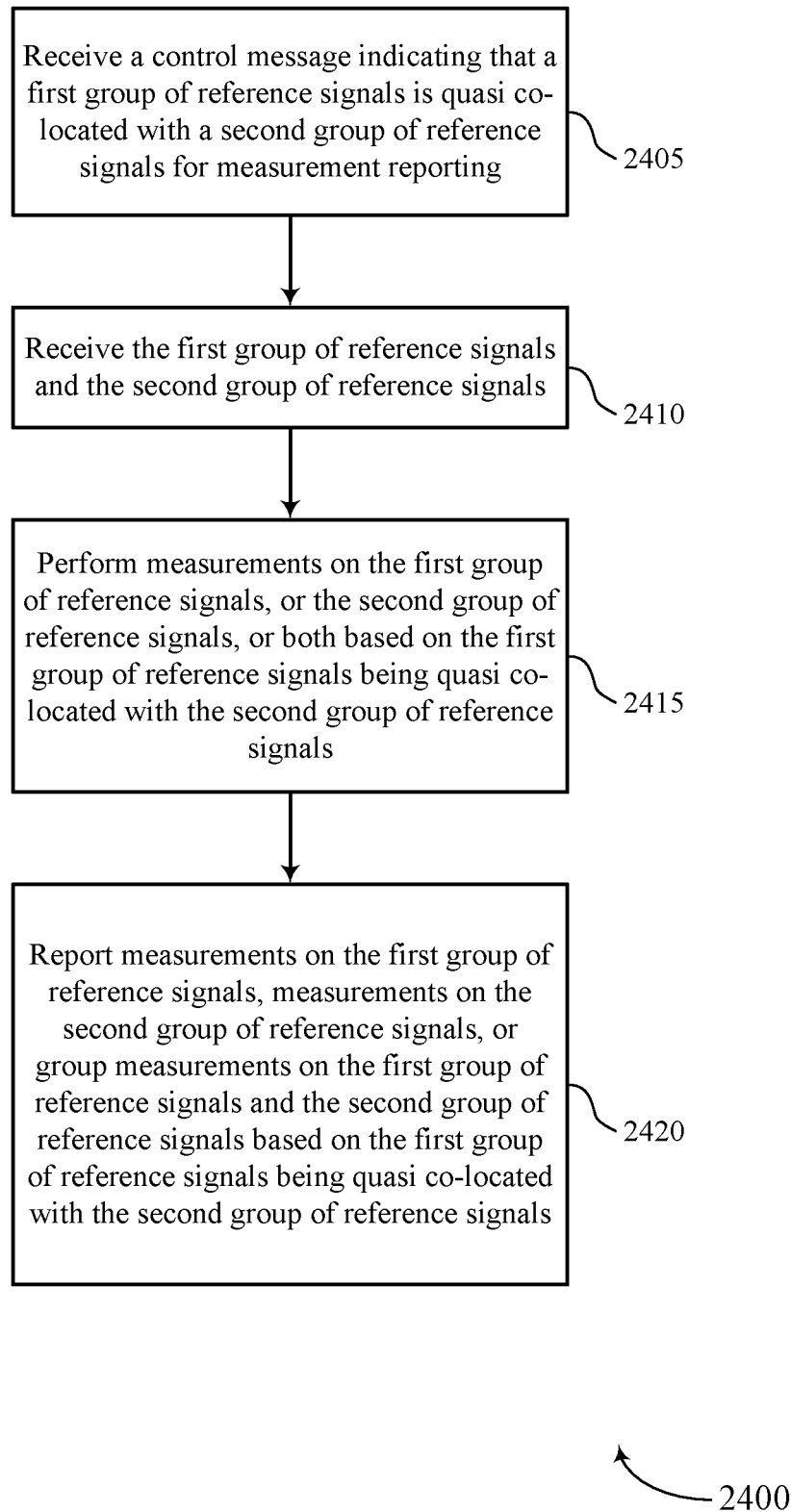
FIGS. 24 and 25 show flowcharts illustrating methods that support beam measurement for a cell subset in accordance with aspects of the present disclosure.

FIG. 24 shows a flowchart illustrating a method 2400 that supports beam measurement for a cell subset in accordance with aspects of the present disclosure. The operations of method 2400 may be implemented by a UE 115 or its components as described herein. For example, the operations of method 2400 may be performed by a communications manager as described with reference to FIGS. 5, 8, 20 and 21. In some examples, a UE may execute a set of instructions to control the functional elements of the UE to perform the functions described below. Additionally, or alternatively, a UE may perform aspects of the functions described below using special-purpose hardware.

At 2405, the UE may receive a control message indicating that a first group of reference signals is quasi co-located with a second group of reference signals for measurement reporting. The operations of 2405 may be performed according to the methods described herein. In some examples, aspects of the operations of 2405 may be performed by a QCL manager as described with reference to FIGS. 5, 8, 20 and 21.

At 2410, the UE may receive the first group of reference signals and the second group of reference signals. The operations of 2410 may be performed according to the methods described herein. In some examples, aspects of the operations of 2410 may be performed by a reference signal manager as described with reference to FIGS. 5, 8, 20 and 21.

At 2415, the UE may perform measurements on the first group of reference signals, the second group of reference signals, or both based on the first group of reference signals being quasi co-located with the second group of reference signals. The operations of 2415 may be performed according to the methods described herein. In some examples, aspects of the operations of 2415 may be performed by a measurement component as described with reference to FIGS. 5, 8, 20 and 21.

At 2420, the UE may report measurements on the first group of reference signals, measurements on the second group of reference signals, or group measurements on the first group of reference signals and the second group of reference signals based on the first group of reference signals being quasi co-located with the second group of reference signals. The operations of 2420 may be performed according to the methods described herein. In some examples, aspects of the operations of 2420 may be performed by a measurement report manager as described with reference to FIGS. 5, 8, 20 and 21.

Figure 25:
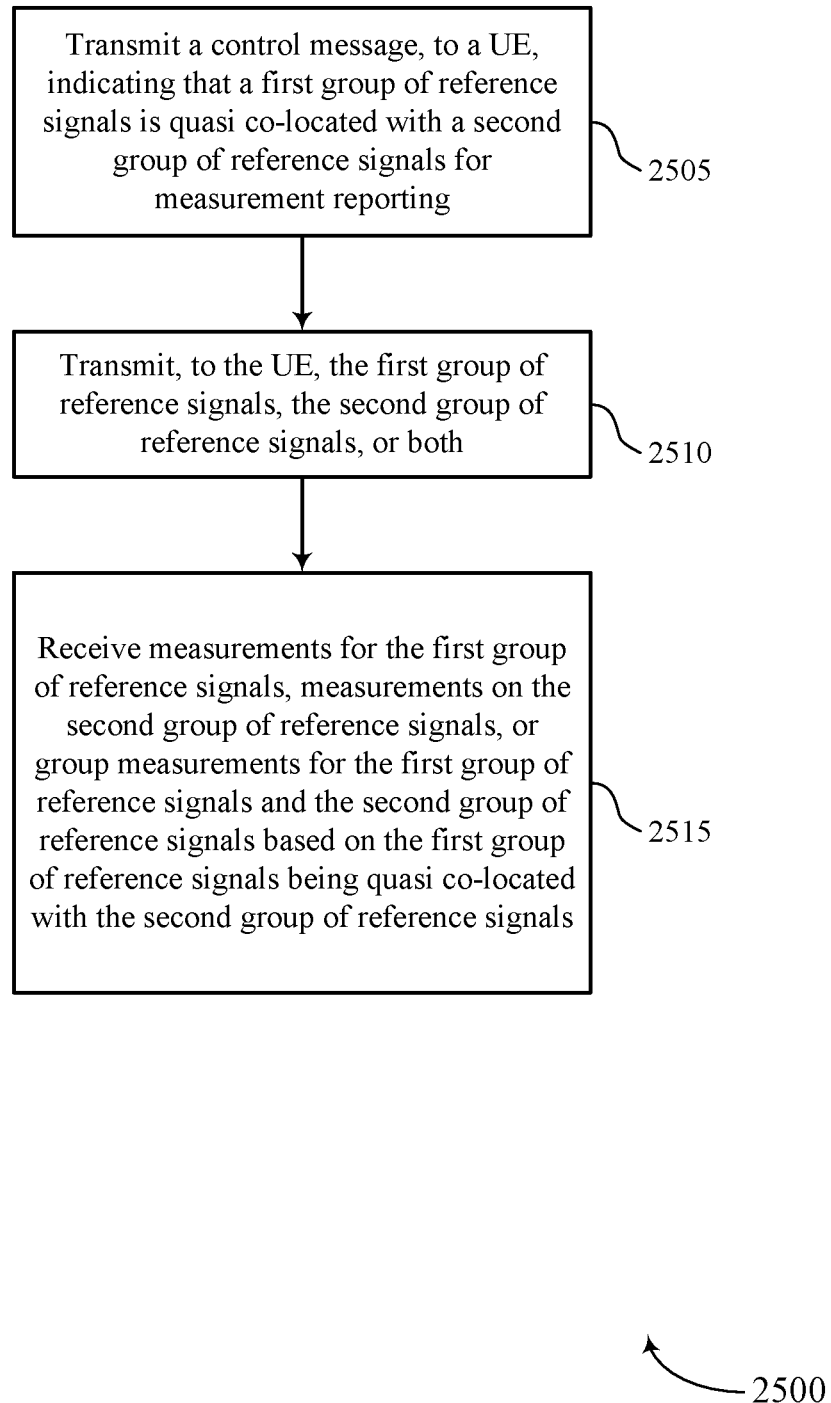

FIG. 25 shows a flowchart illustrating a method 2500 that supports beam measurement for a cell subset in accordance with aspects of the present disclosure. The operations of method 2500 may be implemented by a base station 105 or its components as described herein. For example, the operations of method 2500 may be performed by a communications manager as described with reference to FIGS. 9, 12, 22, and 23. In some examples, a base station may execute a set of instructions to control the functional elements of the base station to perform the functions described below. Additionally, or alternatively, a base station may perform aspects of the functions described below using special-purpose hardware.

At 2505, the base station may transmit a control message, to a UE, indicating that a first group of reference signals is quasi co-located with a second group of reference signals for measurement reporting. The operations of 2505 may be performed according to the methods described herein. In some examples, aspects of the operations of 2505 may be performed by a QCL manager as described with reference to FIGS. 9, 12, 22, and 23.

At 2510, the base station may transmit, to the UE, the first group of reference signals, the second group of reference signals, or both. The operations of 2510 may be performed according to the methods described herein. In some examples, aspects of the operations of 2510 may be performed by a reference signal manager as described with reference to FIGS. 9, 12, 22, and 23.

At 2515, the base station may receive measurements for the first group of reference signals, measurements on the second group of reference signals, or group measurements for the first group of reference signals and the second group of reference signals based on the first group of reference signals being quasi co-located with the second group of reference signals. The operations of 2515 may be performed according to the methods described herein. In some examples, aspects of the operations of 2515 may be performed by a measurement report manager as described with reference to FIGS. 9, 12, 22, and 23.

It should be noted that the methods described herein describe possible implementations, and that the operations and the steps may be rearranged or otherwise modified and that other implementations are possible. Further, aspects from two or more of the methods may be combined.

Example 1 is a method of wireless communications that includes receiving, from a serving cell, indicators of a configuration for measurement reporting, performing cell measurements for a set of neighboring cells based at least in part on the configuration, reporting the cell measurements for the set of neighboring cells to the serving cell, identifying a subset of the neighboring cells based at least in part on one or more of the configuration or the cell measurements, performing beam measurements for the subset of the neighboring cells based at least in part on the configuration, and reporting the beam measurements for the subset of the neighboring cells to the serving cell.

In example 2, the method of example 1 may include receiving one or more thresholds from the serving cell and identifying the subset of the neighboring cells based at least in part on the one or more thresholds. In example 3, the method of any of examples 1-2 may include identifying the subset of the neighboring cells based at least in part on a signal strength of the subset of the neighboring cells satisfying the one or more thresholds. In example 4, the method of any of examples 1-3 may include identifying the subset of the neighboring cells based at least in part on a signal strength of the subset of the neighboring cells satisfying a first threshold and a signal strength of the serving cell satisfying a second threshold. In example 5, the method of any of examples 1-4 may include identifying the subset of the neighboring cells based at least in part on a standard deviation of beam level quality satisfying the one or more thresholds.

In example 6, the method of any of examples 1-5 may include receiving an indicator that identifies the subset of the neighboring cells based at least in part on the cell measurements. In example 7, the method of any of examples 1-6 may include periodically reporting the cell measurements for the set of neighboring cells to the serving cell and receiving an indicator that identifies the subset of the neighboring cells based at least in part on the periodic reporting. In example 8, the method of any of examples 1-7 may include identifying an order for the subset of the neighboring cells based at least in part on one or more of a cell level quality or a cell load.

In example 9, the method of any of examples 1-8 may include determining a priority of a cell of the subset of the neighboring cells based at least in part on the order and performing the beam measurements for the cell based at least in part on the priority of the cell. In example 10, the method of any of examples 1-9 may include receiving a threshold from the serving cell and identifying a trigger for reporting the cell measurements based at least in part on a difference between a neighbor cell signal quality and a serving cell signal quality satisfying the threshold. In example 11, the method of any of examples 1-10 may include receiving a threshold from the serving cell and identifying a trigger for reporting the cell measurements based at least in part on a neighbor cell signal quality satisfying the threshold.

In example 12, the method of any of examples 1-11 may include receiving one or more thresholds from the serving cell and identifying a trigger for reporting the cell measurements based at least in part on a neighbor cell signal quality satisfying a first threshold and a serving cell signal quality satisfying a second threshold. In example 13, the method of any of examples 1-12 may include receiving a threshold from the serving cell and identifying a trigger for reporting the cell measurements based at least in part on a neighbor cell signal quality not satisfying the threshold, where a neighbor cell is removed from the subset of neighboring cells based at least in part on reporting the cell measurements.

In example 14, the performing the cell measurements for the set of neighbor cells of 13 may include measuring one or more of an SSB or a CSI-RS for each cell of the set of neighboring cells. In example 15, the method of any of examples 1-14 may include filtering the beam measurements by a Level 3 filter, where the Level 3 filter is configured by RRC signaling. In example 16, the method of any of claims 1-15, the indicators of the configuration may be received by RRC signaling.

Example 17 is a method for wireless communication at a base station, including transmitting, to a UE, indicators of a configuration for measurement reporting, receiving cell measurements for a set of neighboring cells from the UE based at least in part on the configuration, identifying a subset of the neighboring cells based at least in part on one or more of the configuration or the cell measurements, and receiving beam measurements for the subset of the neighboring cells from the UE based at least in part on the configuration.

In example 18, the method of example 17 may include configuring the UE with one or more thresholds and identifying the subset of the neighboring cells based at least in part on the one or more thresholds. In example 19, the method of any of examples 17-18 may include identifying the subset of the neighboring cells based at least in part on a signal strength of the subset of the neighboring cells satisfying the one or more thresholds. In example 20, the method of any of examples 17-19 may include identifying the subset of the neighboring cells based at least in part on a signal strength of the subset of the neighboring cells satisfying a first threshold and a signal strength of the base station satisfying a second threshold.

In example 21, the method of any of examples 17-20 may include identifying the subset of the neighboring cells based at least in part on a standard deviation of beam level quality satisfying the one or more thresholds. In example 22, the method of any of examples 17-21 may include selecting the subset of the neighboring cells based at least in part on the cell measurements for the set of neighboring cells and transmitting an indicator that identifies the subset of the neighboring cells to the UE. In example 23, the method of any of examples 17-22 may include periodically receiving the cell measurements for the set of neighboring cells, selecting the subset of the neighboring cells based at least in part on the cell measurements, and transmitting an indicator that identifies the subset of the neighboring cells.

In example 24, the method of any of examples 17-23 may include indicating an order for the subset of the neighboring cells based at least in part on one or more of a cell level quality or a cell load. In example 25, for the method of any of examples 17-24, the beam measurements reported for the subset are based at least in part on the order of the subset. In example 26, the method of any of examples 17-25 may include transmitting a threshold to the UE and configuring the UE with a trigger for reporting the cell measurements based at least in part on a difference between a neighbor cell signal quality and a serving cell signal quality satisfying the threshold. In example 27, the method of any of examples 17-26 may include transmitting a threshold to the UE and configuring the UE with a trigger for reporting the cell measurements based at least in part on a neighbor cell signal quality satisfying the threshold.

In example 28, the method of any of examples 17-27 may include transmitting one or more thresholds to the UE and configuring the UE with a trigger for reporting the cell measurements based at least in part on a neighbor cell signal quality satisfying a first threshold and a serving cell signal quality satisfying a second threshold. In example 29, the method of any of examples 17-28 may include transmitting a threshold to the UE, configuring the UE with a trigger for reporting the cell measurements based at least in part on a neighbor cell signal quality not satisfying the threshold and removing a neighbor cell from the subset of neighboring cells based at least in part on the reported cell measurements.

In example 30, the method of any of examples 17-29 may include receiving measurements for one or more of an SSB or a CSI-RS for each cell of the set of neighboring cells. In example 31, the method of any of examples 17-30 may include configuring a Level 3 filter at the UE by RRC signaling, where the beam measurements are filtered by the Level 3 filter. In example 32, for the method of any of examples 17-31, the indicators for the configuration may be transmitted by RRC signaling.

Example 31 is a system or apparatus including means for implementing a method or realizing an apparatus as in any of examples 1-16. Example 32 is a non-transitory computer-readable medium storing instructions executable by one or more processors to cause the one or more processors to implement a method as in any of examples 1-16. Example 33 is a system including one or more processors and memory in electronic communication with the one or more processors storing instructions executable by the one or more processors to cause the system or apparatus to implement a method as in any of examples 1-16. Aspects of these examples may be combined with aspects or embodiments disclosed in other implementations.

Example 34 is a system or apparatus including means for implementing a method or realizing an apparatus as in any of examples 17-32. Example 35 is a non-transitory computer-readable medium storing instructions executable by one or more processors to cause the one or more processors to implement a method as in any of examples 17-32. Example 36 is a system including one or more processors and memory in electronic communication with the one or more processors storing instructions executable by the one or more processors to cause the system or apparatus to implement a method as in any of examples 17-32. Aspects of these examples may be combined with aspects or embodiments disclosed in other implementations.

Example 37 is a method for wireless communication at a UE that includes receiving a control message indicating that a first group of reference signals is quasi co-located with a second group of reference signals for measurement reporting, receiving the first group of reference signals and the second group of reference signals, performing measurements on the first group of reference signals, or the second group of reference signals, or both based on the first group of reference signals being quasi co-located with the second group of reference signals, and reporting measurements on the first group of reference signals, or measurements on the second group of reference signals, or group measurements on the first group of reference signals and the second group of reference signals based on the first group of reference signals being quasi co-located with the second group of reference signals.

In example 38, the method of example 37 includes receiving the first group of reference signals from a first serving cell and the second group of reference signals from a second serving cell, performing measurements on the first group of reference signals and reporting measurements for the first group of reference signals, where measurements for the second group of reference signals may be indicated by the reported measurements for the first group of reference signals based on the first group of reference signals being quasi co-located with the second group of reference signals.

In example 39, the method of any of examples 37-38 includes performing cell measurements or beam measurements on the first group of reference signals in accordance with the control message. In example 40, and in the method of any of examples 37-39, the beam measurements may be filtered by RRC configured layer3 (L3) filters. In example 41, and in the method of any of examples 37-40, the cell measurements may be filtered by RRC configured L3 filters.

In example 42, and in the method of any of examples 37-41, the control message indicates a first PCI of the first serving cell, a second PCI of the second serving cell, a BWP used to transmit the first and second groups of reference signals, measurement quantities for the measurement reporting, a type of reference signals on which to perform measurements, whether to perform and report cell measurements or beam measurements, or indexes of beams used to transmit the first and second groups of reference signals. In example 43, and in the method of any of examples 37-42, the measurement quantities for measurement reporting include RSRP, RSRQ, SINR. In example 44, and in the method of any of examples 37-43, the first serving cell and the second serving cell are configured to transmit on different frequencies.

In example 45, and in the method of any of examples 37-44, the first group of reference signals includes an SSB and the second group of reference signals includes CSI-RSs. In example 46, the method of any of examples 37-45 includes performing measurements on the SSB and reporting measurements for the SSB, where measurements for the CSI-RSs may be indicated by the reported measurements for the SSB based on the SSB being quasi co-located with the CSI-RSs.

In example 47, and in the method of any of examples 37-46, the control message indicates an index of the SSB, a list of indexes of the CSI-RSs, and measurement quantities for the measurement reporting. In example 48, and in the method of any of examples 37-47, the measurement quantities for measurement reporting include RSRP, RSRQ, or SINR. In example 49, the method of any of examples 37-48 includes failing to detect the SSB and performing and reporting measurements for one or more of the CSI-RSs.

In example 50, the method of any of examples 37-49 includes identifying a CSI-RS of the CSI-RSs associated with a highest quality and transmitting an indication of the CSI-RS associated with the highest quality. In example 51, the method of any of examples 37-50 includes determining a linear average power of the CSI-RSs and transmitting an indication of the linear average power of the CSI-RSs. In example 52, the method of any of examples 37-51 includes performing and reporting measurements for each of the CSI-RSs. In example 53, and in the method of any of examples 37-52, the first group of reference signals includes a first SSB or a first set of CSI-RSs and the second group of reference signals includes a second SSB or a second set of CSI-RSs, the first group of reference signals and the second group of reference signals forming a QCL group of reference signals.

In example 54, the method of any of examples 37-53 includes performing group measurements on reference signals in the QCL group and reporting the group measurements for reference signals in the QCL group. In example 55, the method of any of examples 37-54 includes identifying a set of QCL groups of reference signals, receiving an indication of a subset of the QCL groups for which to perform and report measurements and performing and reporting group measurements for each QCL group of the subset of the QCL groups. In example 56, and in the method of any of examples 37-55, the control message includes an RRC message. In example 57, and in the method of any of examples 37-56, each of the first group of reference signals and the second group of reference signals includes one or more reference signals.

Example 58 is a system or apparatus including means for implementing a method or realizing an apparatus as in any of examples 37-57. Example 59 is a non-transitory computer-readable medium storing instructions executable by one or more processors to cause the one or more processors to implement a method as in any of examples 37-57. Example 60 is a system including one or more processors and memory in electronic communication with the one or more processors storing instructions executable by the one or more processors to cause the system or apparatus to implement a method as in any of examples 37-57. Aspects of these examples may be combined with aspects or embodiments disclosed in other implementations.

Example 61 is a method for wireless communication that includes transmitting a control message, to a UE, indicating that a first group of reference signals is quasi co-located with a second group of reference signals for measurement reporting, transmitting, to the UE, the first group of reference signals, the second group of reference signals, or both, and receiving measurements for the first group of reference signals, or measurements on the second group of reference signals, or group measurements for the first group of reference signals and the second group of reference signals based on the first group of reference signals being quasi co-located with the second group of reference signals.

In example 62, and in the method of example 61, the first group of reference signals may be transmitted by a first serving cell and the second group of reference signals may be transmitted by a second serving cell. In example 63, the method of any of examples 61-62 includes receiving measurements for the first group of reference signals and determining that measurements for the second group of reference signals may be indicated by the measurements for the first group of reference signals based on the first group of reference signals being quasi co-located with the second group of reference signals.

In example 64, and in the method of any of examples 61-63, the control message indicates a first PCI of the first serving cell, a second PCI of the second serving cell, a BWP used to transmit the first and second groups of reference signals, measurement quantities for the measurement reporting, a type of reference signals on which to perform measurements, whether to perform and report cell measurements or beam measurements, or indexes of beams used to transmit the first and second groups of reference signals. In example 65, and in the method of any of examples 61-64, the measurement quantities for measurement reporting include RSRP, RSRQ, or SINR. In example 66, and in the method of any of examples 61-65, the first group of reference signals includes an SSB, and the second group of reference signals includes CSI-RSs.

In example 67, the method of any of examples 61-36 includes receiving measurements for the SSB and determining that measurements for the CSI-RSs may be indicated by the measurements for the SSB based on the SSB being quasi co-located with the CSI-RSs. In example 68, and in the method of any of examples 61-67, the control message indicates an index of the SSB, a list of indexes of the CSI-RSs, and measurement quantities for the measurement reporting. In example 69, and in the method of any of examples 61-68, the measurement quantities for measurement reporting include RSRP, RSRQ, or SINR.

In example 70, and in the method of any of examples 61-69, the first group of reference signals includes a first SSB or a first set of CSI-RSs and the second group of reference signals includes a second SSB or a second set of CSI-RSs, the first group of reference signals and the second group of reference signals forming a QCL group of reference signals. In example 71, the method of any of examples 61-70 includes receiving group measurements for reference signals in the QCL group. In example 72, and in the method of any of examples 61-71, the control message includes an RRC message. In example 73, and in the method of any of examples 61-72, each of the first group of reference signals and the second group of reference signals includes one or more reference signals.

Example 74 is a system or apparatus including means for implementing a method or realizing an apparatus as in any of examples 61-73. Example 75 is a non-transitory computer-readable medium storing instructions executable by one or more processors to cause the one or more processors to implement a method as in any of examples 61-73. Example 76 is a system including one or more processors and memory in electronic communication with the one or more processors storing instructions executable by the one or more processors to cause the system or apparatus to implement a method as in any of examples 61-73. Aspects of these examples may be combined with aspects or embodiments disclosed in other implementations.

Aspects of these examples may be combined with aspects or embodiments disclosed in other implementations.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
receiving, from a serving cell, indicators of a configuration for measurement reporting;
performing cell measurements for a set of neighboring cells based at least in part on the configuration;
transmitting a periodic measurement report indicating the cell measurements for the set of neighboring cells to the serving cell;
receiving an indicator of a subset of the set of neighboring cells based at least in part on the periodic measurement report and one or more of the configuration or the cell measurements;

performing beam measurements for the subset of the set of neighboring cells based at least in part on the configuration; and reporting the beam measurements for the subset of the set of neighboring cells to the serving cell.

2. The method of claim 1, further comprising:
receiving one or more thresholds from the serving cell; and
identifying the subset of the set of neighboring cells based at least in part on the one or more thresholds.

3. The method of claim 2, further comprising:
identifying the subset of the set of neighboring cells based at least in part on a signal strength of the subset of the set of neighboring cells satisfying the one or more thresholds.

4. The method of claim 2, further comprising:
identifying the subset of the set of neighboring cells based at least in part on a signal strength of the subset of the set of neighboring cells satisfying a first threshold and a signal strength of the serving cell satisfying a second threshold.

5. The method of claim 2, further comprising:
identifying the subset of the set of neighboring cells based at least in part on a standard deviation of beam level quality satisfying the one or more thresholds.

6. The method of claim 1, further comprising:
receiving an indicator that identifies the subset of the set of neighboring cells based at least in part on the cell measurements.

7. The method of claim 1, further comprising:
identifying an order for the subset of the set of neighboring cells based at least in part on one or more of a cell level quality or a cell load.

8. The method of claim 1, further comprising:
receiving a threshold from the serving cell; and
identifying a trigger for reporting the cell measurements based at least in part on a difference between a neighbor cell signal quality and a serving cell signal quality satisfying the threshold.

9. The method of claim 1, further comprising:
receiving a threshold from the serving cell; and
identifying a trigger for reporting the cell measurements based at least in part on a neighbor cell signal quality satisfying the threshold.

10. The method of claim 1, further comprising:
receiving one or more thresholds from the serving cell; and
identifying a trigger for reporting the cell measurements based at least in part on a neighbor cell signal quality satisfying a first threshold and a serving cell signal quality satisfying a second threshold.

11. The method of claim 1, further comprising:
receiving a threshold from the serving cell; and
identifying a trigger for reporting the cell measurements based at least in part on a neighbor cell signal quality not satisfying the threshold, wherein a neighbor cell is removed from the subset of the set of neighboring cells based at least in part on reporting the cell measurements.

12. The method of claim 1, further comprising:
receiving a threshold from the serving cell; and
identifying a trigger for reporting the cell measurements based at least in part on a difference between a neighbor cell signal quality and a serving cell signal quality not satisfying the threshold, wherein a neighbor cell is removed from the subset of the set of neighboring cells based at least in part on reporting the cell measurements.

13. The method of claim 1, further comprising:
receiving one or more thresholds from the serving cell; and
identifying a trigger for reporting the cell measurements based at least in part on a neighbor cell signal quality not satisfying a first threshold or a serving cell signal quality not satisfying a second threshold, wherein a neighbor cell is removed from the subset of the set of neighboring cells based at least in part on reporting the cell measurements.

14. The method of claim 1, wherein performing the cell measurements for the set of neighboring cells comprises:
measuring one or more of a synchronization signal block (SSB) or a channel state information reference signal (CSI-RS) for each cell of the set of neighboring cells.

15. A method for wireless communication at a network device, comprising:
transmitting, to a user equipment (UE), indicators of a configuration for measurement reporting;
receiving a periodic measurement report indicating cell measurements for a set of neighboring cells from the UE based at least in part on the configuration;
selecting a subset of the set of neighboring cells based at least in part on the cell measurements;
transmitting an indicator of the subset of the set of neighboring cells based at least in part on the periodic measurement report and one or more of the configuration or the cell measurements; and
receiving beam measurements for the subset of the set of neighboring cells from the UE based at least in part on the configuration.

16. The method of claim 15, further comprising:
configuring the UE with one or more thresholds; and
identifying the subset of the set of neighboring cells based at least in part on the one or more thresholds.

17. The method of claim 16, further comprising:
identifying the subset of the set of neighboring cells based at least in part on a signal strength of the subset of the set of neighboring cells satisfying the one or more thresholds.

18. The method of claim 16, further comprising:
identifying the subset of the set of neighboring cells based at least in part on a signal strength of the subset of the set of neighboring cells satisfying a first threshold and a signal strength of the network device satisfying a second threshold.

19. The method of claim 16, further comprising:
identifying the subset of the set of neighboring cells based at least in part on a standard deviation of beam level quality satisfying the one or more thresholds.

20. The method of claim 15, further comprising:
selecting the subset of the set of neighboring cells based at least in part on the cell measurements for the set of neighboring cells; and
transmitting an indicator that identifies the subset of the set of neighboring cells to the UE.

21. The method of claim 15, further comprising:
indicating an order for the subset of the set of neighboring cells based at least in part on one or more of a cell level quality or a cell load.

22. The method of claim 15, further comprising:
transmitting a threshold to the UE; and
configuring the UE with a trigger for reporting the cell measurements based at least in part on a difference between a neighbor cell signal quality and a serving cell signal quality satisfying the threshold.

23. The method of claim 15, further comprising:

transmitting a threshold to the UE; and configuring the UE with a trigger for reporting the cell measurements based at least in part on a neighbor cell signal quality satisfying the threshold.

24. The method of claim 15, further comprising:

transmitting one or more thresholds to the UE; and configuring the UE with a trigger for reporting the cell measurements based at least in part on a neighbor cell signal quality satisfying a first threshold and a serving cell signal quality satisfying a second threshold.

25. The method of claim 15, further comprising:

transmitting a threshold to the UE;

configuring the UE with a trigger for reporting the cell measurements based at least in part on a neighbor cell signal quality not satisfying the threshold; and removing a neighbor cell from the subset of the set of neighboring cells based at least in part on the reported cell measurements.

26. The method of claim 15, further comprising:

transmitting a threshold to the UE;

configuring the UE with a trigger for reporting the cell measurements based at least in part on a difference between a neighbor cell signal quality and a serving cell signal quality not satisfying the threshold; and removing a neighbor cell from the subset of the set of neighboring cells based at least in part on the reported cell measurements.

27. An apparatus for wireless communication at a user equipment (UE), comprising:

a processor;

memory in electronic communication with the processor; and instructions stored in the memory executable by the processor to cause the apparatus to:

receive, from a serving cell, indicators of a configuration for measurement reporting;

perform cell measurements for a set of neighboring cells based at least in part on the configuration;

transmit a periodic measurement report indicating the cell measurements for the set of neighboring cells to the serving cell;

receive an indicator of a subset of the set of neighboring cells based at least in part on the periodic measurement report and one or more of the configuration or the cell measurements;

perform beam measurements for the subset of the set of neighboring cells based at least in part on the configuration; and report the beam measurements for the subset of the set of neighboring cells to the serving cell.

28. An apparatus for wireless communication at a network device, comprising:

a processor;

memory in electronic communication with the processor; and instructions stored in the memory executable by the processor to cause the apparatus to:

transmit, to a user equipment (UE), indicators of a configuration for measurement reporting;

receive a periodic measurement report indicating cell measurements for a set of neighboring cells from the UE based at least in part on the configuration;

select a subset of the set of neighboring cells based at least in part on the cell measurements;

transmit an indicator of the subset of the set of neighboring cells based at least in part on the periodic measurement report and one or more of the configuration or the cell measurements; and receive beam measurements for the subset of the set of neighboring cells from the UE based at least in part on the configuration.

* * * * *